(12) United States Patent
Fisher et al.

(10) Patent No.: US 12,207,668 B2
(45) Date of Patent: Jan. 28, 2025

(54) DEVICE AND METHOD FOR DOSING CRYOGENIC LIQUID

(71) Applicant: SMITTEN VENTURES, INC., San Francisco, CA (US)

(72) Inventors: Robyn Sue Fisher, San Francisco, CA (US); Whitfield Janes Fowler, Santa Clara, CA (US)

(73) Assignee: SMITTEN VENTURES, INC., San Francisco, CA (US)

( * ) Notice: Subject to any disclaimer, the term of this patent is extended or adjusted under 35 U.S.C. 154(b) by 0 days.

(21) Appl. No.: 17/195,326

(22) Filed: Mar. 8, 2021

(65) Prior Publication Data
US 2021/0274805 A1 Sep. 9, 2021

Related U.S. Application Data

(60) Provisional application No. 62/986,958, filed on Mar. 9, 2020.

(51) Int. Cl.
| | |
|---|---|
| A23G 9/06 | (2006.01) |
| A23G 9/12 | (2006.01) |
| A23G 9/22 | (2006.01) |

(52) U.S. Cl.
CPC ............... *A23G 9/06* (2013.01); *A23G 9/12* (2013.01); *A23G 9/224* (2013.01); *A23G 9/228* (2013.01)

(58) Field of Classification Search
CPC .... A23F 9/06; A23F 9/12; A23F 9/224; A23F 9/228
See application file for complete search history.

(56) References Cited

U.S. PATENT DOCUMENTS

| | | | |
|---|---|---|---|
| 1,762,081 | A | 6/1930 | Schleicher |
| 2,115,742 | A | 5/1938 | Newton |
| 2,404,380 | A | 7/1946 | Thormod |
| 2,409,067 | A | 10/1946 | Reed |

(Continued)

OTHER PUBLICATIONS

Shunt Calibration of Strain Gage Instrumentation, Vishay Percision Group, Tech Note TN-514, [online] Feb. 2013, retrieved Sep. 26, 2022. Retrieved from the Internet: URL :<http://www.vishaypg.com/docs/11064/tn514.pdf>.*

(Continued)

*Primary Examiner* — Lyle Alexander
*Assistant Examiner* — Chaim A Smith
(74) *Attorney, Agent, or Firm* — KNOBBE, MARTENS, OLSON & BEAR LLP

(57) ABSTRACT

Systems and methods of producing a frozen food product include dosing ingredients with a liquefied gas while mixing the ingredients using self-cleaning interlocking beaters. A system can include a container mount rotatable in a clockwise and counterclockwise direction, a coolant dosing system configured to provide coolant to ingredients in a container coupled to the container mount, at least one beater to mix ingredients in the container, and a controller to control the rotation of the container mount and the beaters, the controller performing a mixing process that includes rotating the beaters and the container mount in opposite directions for a first time period, rotating the beaters and the container mount in the same directions for a second time period, and rotating the beaters and the container mount in opposite directions for a third time period.

17 Claims, 33 Drawing Sheets

(56) References Cited

U.S. PATENT DOCUMENTS

| | | |
|---|---|---|
| 2,795,235 A | 7/1957 | Hoyt |
| 3,061,281 A | 10/1962 | Koch |
| 3,068,105 A | 12/1962 | Morrison |
| 3,314,660 A | 4/1967 | Arbiter |
| 3,412,573 A | 11/1968 | Pauliukonis |
| 3,503,757 A | 3/1970 | Rubenstein |
| 3,656,718 A | 4/1972 | Cairelli |
| 3,797,514 A | 3/1974 | Byers |
| 4,089,367 A | 5/1978 | Weitzel |
| 4,219,581 A | 8/1980 | Dea |
| 4,403,867 A | 9/1983 | Duke |
| 4,453,831 A | 6/1984 | Mahon |
| 4,640,323 A | 2/1987 | Norica |
| 4,664,529 A | 5/1987 | Cavalli |
| 4,697,929 A | 10/1987 | Muller |
| 4,716,822 A | 1/1988 | O'Brien |
| 4,859,715 A | 8/1989 | Dubrow |
| 4,919,539 A | 4/1990 | Drocco |
| 4,946,287 A | 8/1990 | Barnard |
| 4,993,238 A | 2/1991 | Inagaki |
| 5,098,732 A | 3/1992 | Inagaki |
| 5,472,276 A | 12/1995 | Ratermann |
| 5,566,732 A | 10/1996 | Nelson |
| 5,692,392 A | 12/1997 | Swier |
| 5,758,571 A | 6/1998 | Kateman |
| 6,233,966 B1 | 5/2001 | Delpuech |
| 6,510,890 B1 | 1/2003 | Paskach |
| 6,517,057 B1 | 2/2003 | Aichinger |
| 6,588,930 B2 | 7/2003 | Wilson |
| 6,758,047 B1 | 7/2004 | Giles |
| 6,796,706 B2 | 9/2004 | Wilson |
| 6,925,816 B2 | 8/2005 | Anderson |
| 7,455,868 B2 | 11/2008 | Kennedy |
| 7,754,266 B2 | 7/2010 | Waletzko |
| 7,938,061 B2 | 5/2011 | Timmons |
| 8,679,566 B1 | 3/2014 | Hancock |
| 8,778,436 B2 | 7/2014 | Waletzko |
| 8,857,197 B1 | 10/2014 | Fisher |
| 9,433,230 B1* | 9/2016 | Fisher ...................... A23G 9/20 |
| 2003/0024401 A1 | 2/2003 | Zetterlund |
| 2003/0035877 A1 | 2/2003 | Best |
| 2003/0098314 A1 | 2/2003 | Phelps |
| 2003/0129289 A1* | 7/2003 | Henriksen .............. A23G 9/222 |
| | | 426/524 |
| 2004/0107844 A1 | 6/2004 | Kennedy |
| 2004/0251270 A1 | 12/2004 | Davis |
| 2006/0110515 A1 | 5/2006 | Waletzko |
| 2009/0053375 A1 | 2/2009 | Johnson |
| 2012/0113741 A1* | 5/2012 | Filipitsch ................ B01F 27/13 |
| | | 366/104 |

OTHER PUBLICATIONS

The Australian National University, the BOC Liquid Nitrogen Show, Online Article located at www.questacon.edu/au/html/assets/pdf/Liquid_nitrogen.pdf, Commonwealth of Australia 2001, 6 pages.

Nicholas Kurti and Herve This-Benckhard, Chemistry and Physics in the Kitchen, Scientific Amerian, Apr. 1994, pp. 66 and 71 (4 pages).

Brian P. Coppola, et al., I Scream, You Scream . . . A New Twist on the Liquid Nitrogen Demonstrations, Journal of Chemical Education, Dec. 1994, vol. 71, No. 12, p. 1080 (2 pages).

David A. Katz, Liquid Nitrogen Ice Cream, http://www.chymist.com/Liquid%20N%20ice%20cream.pdf (accessed Apr. 28, 2008).

H. Henry Rieke IV, Cooking with Chemistry, http://www.poisci.wvu.edu/Henry/Icecream/Icecream.html (accessed Apr. 25, 2008).

Peter Barham, The Science of Cooking, ISBN 3-540-67466-7, Springer-Verlag, Berlin, Heidelberg, New York, p. 143 (3 pages).

Liquid Nitrogen Ice Cream, available at http://www.schnozzle.org/~paulh/recipes/icevream.pdf and http://www.ed.sc.edu/ipd/high/icebream-nitrogen.pdf, undated (3 pages).

Anne Marie Helmenstine, PH.D., How to Make Liquid Nitrogen Ice Cream?, Helpscience Technology, http://helpscience.com/know_chem5.htm (Acessed Apr. 24, 2008) (2 pages).

Student Affiliates, American Chemical Society, Department of Chemistry, University of Maine, located at http://www.chemistry.umeche.maine.edu/Department/ACS.html, dated May 3, 2005 ( Accessed Apr. 24, 2008) (6 pages).

Sam Barros, Liquid Nitrogen Ice Cream!, Copyright 2000-2002 (Accessed Apr. 17, 2008) (2pages).

"Liquid Nitrogen Ice Cream,"available at http://www.everything2.com/index.pl?node_id+466728, dated Mar. 25, 2000 (Accessed Apr. 17, 2008).

Carmen Cerra, Ben and Jerry, meet Tom and Will, Iowa State Daily, Liquid Nitrogen Ice Cream a cool Idea—Science & Tech, Jan. 31, 2002 (8 pages).

DocBug: Liquid-Nitrogen Ice Cream, Liquid-Nitrogen Ice Cream, dated Nov. 26, 2004, available at http://www.dogbug.com/blog/archives/000233.html (Accessed Apr. 17, 2008) (6 pages).

Jefferson Lab , Odds-n-Ends From Jefferson Lab's BEAMS Program, Liquid Nitrogen Ice Cream, available at http:/web.archive.org/web/20020601205541/http://education.jlab.org/beamsactivity/other/In2icebream/ 1 pg. 2002.

* cited by examiner

US 12,207,668 B2

DEVICE AND METHOD FOR DOSING CRYOGENIC LIQUID

BACKGROUND

Field of Inventions

The invention is in the field of generating frozen mixtures, and in some embodiments in the field of ice cream manufacture.

Related Art

Ice cream, one of many frozen confections, is a well-known and favorite desert of millions of people. It is commonly prepared by mixing ingredients such as milk, dairy products, sugar, emulsifying agents, stabilizers, colorants and flavoring agents, sometimes in admixture with solid ingredients that are to be dispersed through the final product, agitating the ingredients while they are chilled and then freezing the mixture.

Ice cream is generally available in two varieties: hard packed and soft serve. Hard packed is the traditional ice cream that can be purchased in containers and stored in a freezer and then dispensed, usually by scooping the product with a scoop. Soft serve ice cream is the type that may be dispensed from a machine and has a softer, creamier consistency.

While soft serve ice cream is very popular, traditional hard packed ice cream is still appealing to many people. However, much of the ice cream sold at a café or an ice cream shop is supplied to the shop in a big batch from a bulk supply produced days before a customer's order. Shops that make their own ice cream often do so well prior to a customer's order. Therefore, ice cream may be hours or days old by the time it is served. Additionally, while a variety of toppings may be available, the flavors of the ice cream product are predetermined and the production of customized flavored ice cream is not possible.

Further the consistency of both soft serve and hard packed ice cream varies greatly. The consistency of the soft serve is dependent on the volume being produced and the consistency of the hard pack depends greatly on the temperature at which the product is stored. Thus, it is typically not possible for a consumer to dictate the required consistency in the confectionery product.

SUMMARY

Various embodiments of the invention include systems and methods of creating ice cream using a liquefied gas to rapidly cool the ingredients. Rapid cooling produces desirable characteristics in ice cream.

An exemplary embodiment includes a system for reproducibly providing doses of liquid nitrogen to ice cream ingredients. The amount of liquid nitrogen provided can be controlled by pre-measuring a quantity of liquid nitrogen, by measuring viscosity of the cooling ingredients, measuring the amount of cooling achieved, or any combination of these approaches.

Various embodiments of the invention include a system comprising a container mount configured to support a container, a first motor configured to rotate the container mount, a container configured to hold ingredients and to temporally attached to the container mount, a liquid nitrogen dosing system configured to provide a controlled amount of liquid nitrogen to the ingredients in the container such that the ingredients freeze, and interlocking beaters configured to mix the ingredients in the container and configured to be self-clearing to each other, the interlocking beaters being disposed to pass within $\frac{1}{16}^{th}$ of an inch of each other without contacting each other, the self-cleaning being sufficient to remove the frozen ingredients from the interlocking beaters.

Various embodiments of the invention include a method of making ice cream, the method comprising: placing ingredients in a container; mixing the ingredients using at least two interlocking beaters disposed such that the interlocking beaters are within $\frac{1}{8}^{th}$ of an inch of each other but do not touch each other; rotating the container in a direction opposite a rotation of a member of the beaters closest to a side of the container; freezing the ingredients during the steps of mixing and rotating by adding a controlled amount of a coolant to the ingredients, the coolant optionally includes a liquefied gas.

Various embodiments of the invention include a system comprising: a container configured to hold ingredients and to rotate; at least two interlocking beaters configured to mix the ingredients in the container and configured to be self-clearing from each other and to clean a side and/or bottom surface of the container; a liquid nitrogen dosing system configured to provide a controlled amount of cooling from a liquid nitrogen source to the ingredients; a temperature sensor configured to measure the controlled amount of cooling; and a controller configured to regulate the delivery of liquid nitrogen from the liquid nitrogen source in response to the measurement of the controlled amount of cooling.

Another innovation includes a system comprising a container mount rotatable in a clockwise and counterclockwise direction, a coolant dosing system configured to provide a controlled amount of coolant to ingredients in a container coupled to the container mount, the container having a bottom and sides configured to hold ingredients, the container configured to attach to the container mount, at least one beater configured to mix the ingredients in the container; and a controller operable to control the rotation of the container mount and the at least one beater, the controller further operable to perform a mixing process that includes rotating the at least one beater and the container mount in opposite directions for a first time period, rotating the at least one beater and the container mount in the same directions for a second time period, and rotating the at least one beater and the container mount in opposite directions for a third time period. Embodiments of such systems can have one or more additional features. In some embodiments, the at least one beater includes a first beater and a second beater. In some embodiments, first time period is between 30 seconds and 2 minutes, and the second time period is between 1 second and 30 seconds. In some embodiments, the second time period occurs at least once every two minutes during a portion of the mixing process. In some embodiments, the second time period occurs at least once every minute during a portion of the mixing process. In some embodiments, the controller is further operable to actuate the mixing apparatus to perform a purge during a startup operation. In some embodiments, the controller is further operable to actuate the mixing apparatus to perform a calibration of the resistance of the rotation of the beaters during a startup operation. In some embodiments, the controller includes a user interface to receive a viscosity level input indicative of the viscosity of ingredients initially used in the mixing process, and wherein the controller is operable to perform the mixing process based at least in part on the viscosity level input. In some embodiments, the controller includes a user interface to receive a size input indicative of a quantity of the ingredients used for a specific batch, and wherein the controller is operable to perform the mixing process based at least in part on the size input.

Another innovation includes a method of making a frozen confections, the method comprising rotating a container mount, and rotating at least one beater extending into a container coupled to the container mount to mix ingredients in the container, in opposite directions for a first time period, dosing the ingredients with a controlled amount of coolant during the first time period, rotating the at least one beater and the container mount in the same direction for a second time period, and rotating the at least one beater and the container mount in opposite directions for a third time period. Embodiments of such systems can have one or more additional features. In some embodiments, the container mount is rotated in a clockwise direction during the first time period and the third time period, and in a counter-clockwise direction during the second time period, and wherein the at least one beater is rotated in a counter-clockwise direction during the first time period, the second time period, and the third time period. In some embodiments, the container mount is rotated in a counter-clockwise direction during the first time period and the third time period, and in a clockwise direction during the second time period, and wherein the at least one beater is rotated in a clockwise direction during the first time period, the second time period, and the third time period. In some embodiments, the method further comprises dosing the ingredients with a controlled amount of coolant during the third time period. In some embodiments, the method further comprises dosing the ingredients with a controlled amount of coolant during the second time period. In some embodiments, the at least one beater includes a first beater and a second beater. In some embodiments, the first time period is between 30 seconds and 2 minutes, and the second time period is between 1 second and 30 seconds. In some embodiments, the second time period occurs at least once every two minutes during a portion of the mixing process. In some embodiments, the second time period occurs at least once every minute during a portion of the mixing process. In some embodiments, the method further comprises performing a purge operation of the dosing system during a startup operation. In some embodiments, the method further comprises performing a calibration of the resistance of the rotation of the beaters during a startup operation. In some embodiments, the method further comprises receiving an input from a user interface indicative of viscosity of the ingredients initially used in the mixing process, and performing a mixing process to mix the ingredients during the first, second and third time periods based at least in part on the viscosity level input. In some embodiments, the method further comprises receiving an input from a user interface indicative of a size input of a quantity of the ingredients used for a specific batch of ingredients, and performing a mixing process to mix the ingredients during the first, second and third time periods based at least in part on the size input.

DETAILED DESCRIPTION OF CERTAIN INVENTIVE ASPECTS

Figure 1:
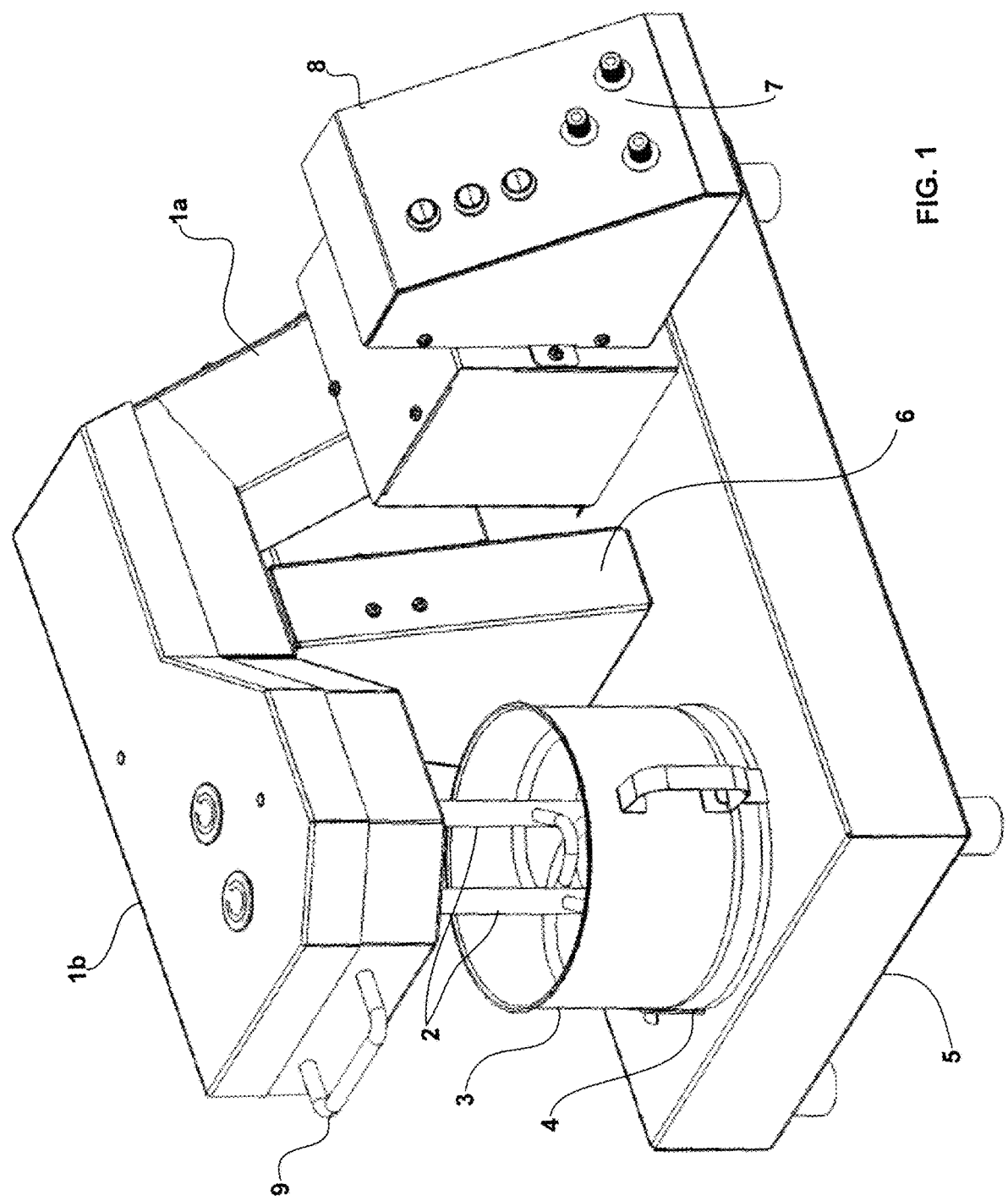
FIG. 1 illustrates a general perspective view of an ice cream production device, according to various embodiments of the invention.
Figure 24:
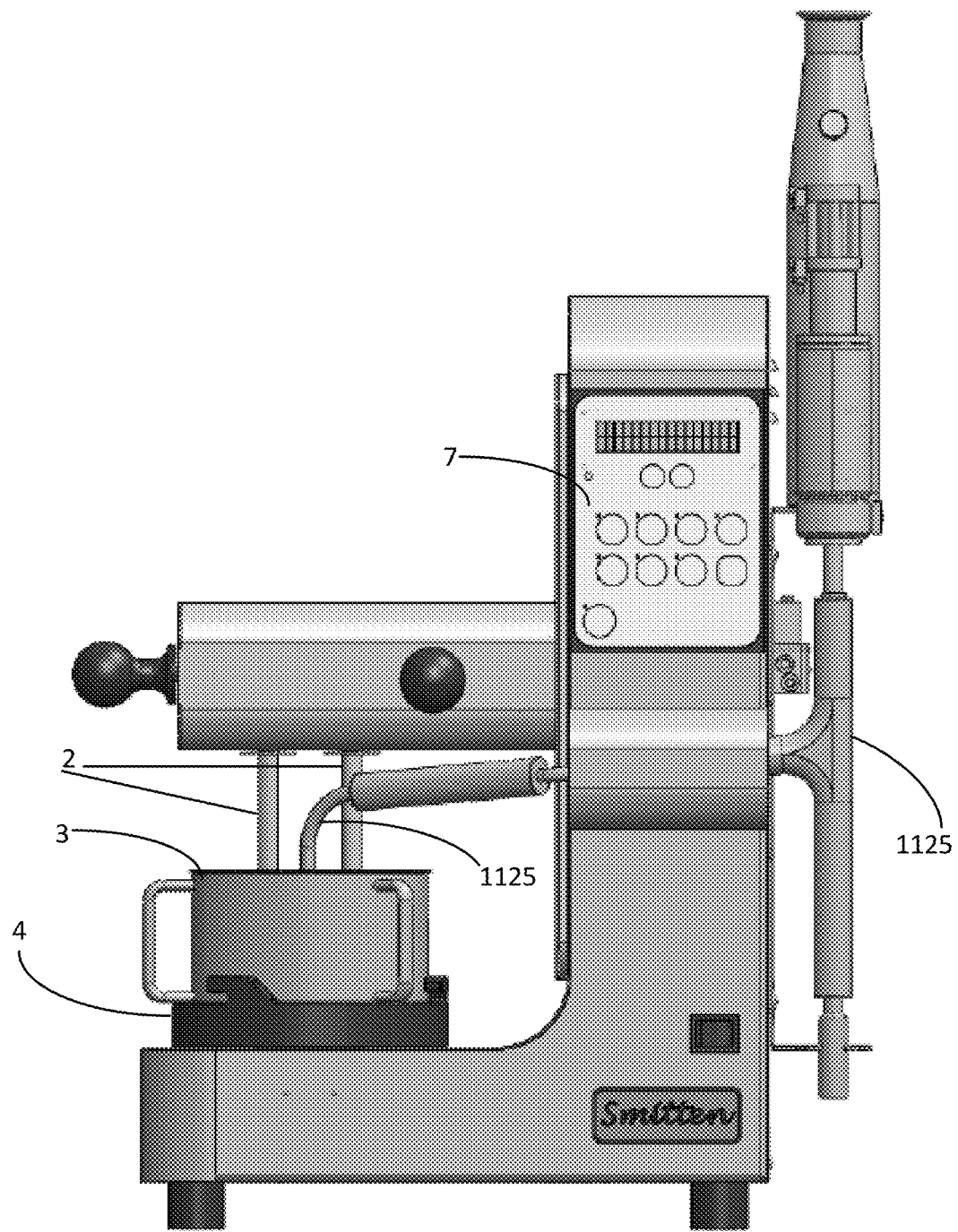
FIG. 24 illustrates another example of an ice cream production device, according to some embodiments.

FIG. 1 illustrates a general perspective view of an ice cream production device, according to various embodiments of the invention. FIG. 24 illustrates another example of an ice cream production device that performs the same functionality as the example shown in FIG. 1. FIG. 1 illustrates a mixer-like body with arm 1a that attaches to mixer head 1b. Extending down from the mixer head are two or more beaters (e.g., agitators or mixing arms) 2. Beneath the beaters is a container 3. The container clips or locks into place atop a container mount 4. The container mount is optionally heated and sits atop body 5. The mixer head may or may not have supporting structure 6. The device may be controlled by on/off switch or lever, or by a more detailed control panel 7. The wiring and components for the device may or may not have protected casings 8. The mixer arm 1a is designed such that the container can be removed and inserted under the beaters 2. In this embodiment, the mixer arm can move from the production position (shown) to an upright position, wherein the head 20 tilts up and back. Additionally, the mixer head may or may not have handle 9, which can be used to move the mixer head to and from the production position. In alternative embodiments the mixer up may move up or to the side to clear the container 3.

Figure 2:
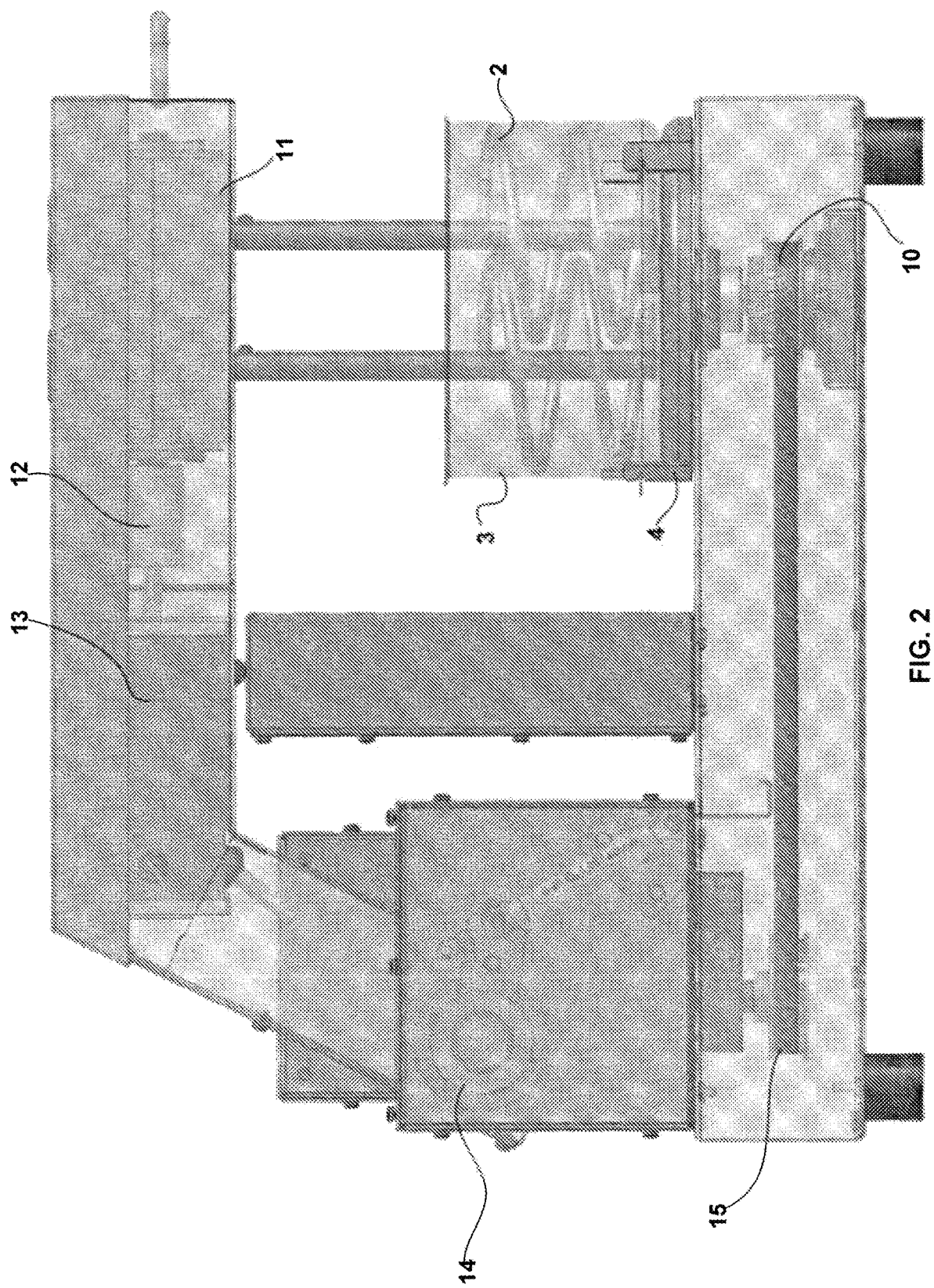
FIG. 2 illustrates the interior components of the system illustrated in FIG. 1, according to various embodiment of the invention.

FIG. 2 shows an example of a container mount 4 connected to a belt drive 10 and powered with a mount motor (or combination of transmission and motor) 15. Container 3 is optionally connected to container mount 4 by a spindle (not shown). The spindle can be concentric or non-concentric with container 3. Beaters 2 are driven by transmission 11, which is connected to motor 13 (also visible is shaft coupler 12). In some embodiments, the transmission 11 and/or motor 13 can rotate the beaters 2 in a clockwise direction, and/or rotate the beaters in a counter-clockwise direction. In this embodiment, mixer arm is raised using e.g. gas spring 14. In some implementations, the transmission and/or motor 15 can be configured to rotate the container mount 4 (and a container coupled to the container mount 4) in a clockwise direction, and also rotate the container mount 4 in a counter-clockwise direction. For example, in some embodiments the motor can be driven to rotate the container mount 4 clockwise or counterclockwise. In some embodiments, the motor rotates in a direction and the transmission can be actuated to rotate the container mount 4 clockwise or counterclockwise.

In operation, and as further described below in reference to FIG. 3C-3F, the rotation of the container mount 4 can be controlled separately from the rotation of the beaters 2. For example, in one or more portions (e.g., periods of time) of a mixing process, the rotation of the beaters 2 and the container mount 4 can be controlled such that only the beaters 2 rotate, only the container mount 4 rotates, or both the beaters 4 and the container mount 4 rotate. In one or more portions of a mixing process, the rotation of the beaters 2 can be in the same direction (clockwise or counter-clockwise) as the rotation of the container mount 4. In one or more portions of a mixing process, the rotation of the beaters 2 can be in the opposite direction as the rotation of the container mount 4. For example, the beaters 2 can be rotated clockwise or counter-clockwise, and the container mount 4 can be rotated in a direction opposite the beaters 2 rotation, in a corresponding counter-clockwise or clockwise direction. In various mixing processes, the rotation of the container mount 4 and the beaters can each be controlled to rotate clockwise or counterclockwise in accordance with a particular mixing process.

Figure 3A:
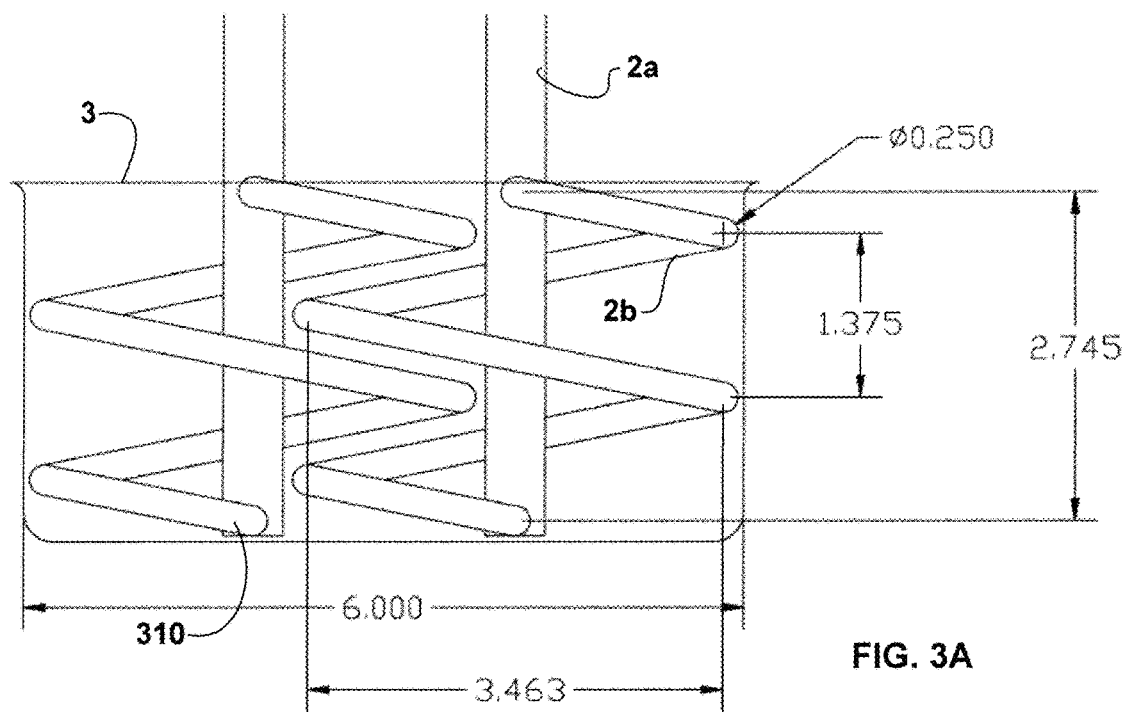
FIGS. 3A and 3B illustrate the interconnectivity of the beater and container design, according to various embodiments of the invention.
Figure 3B:
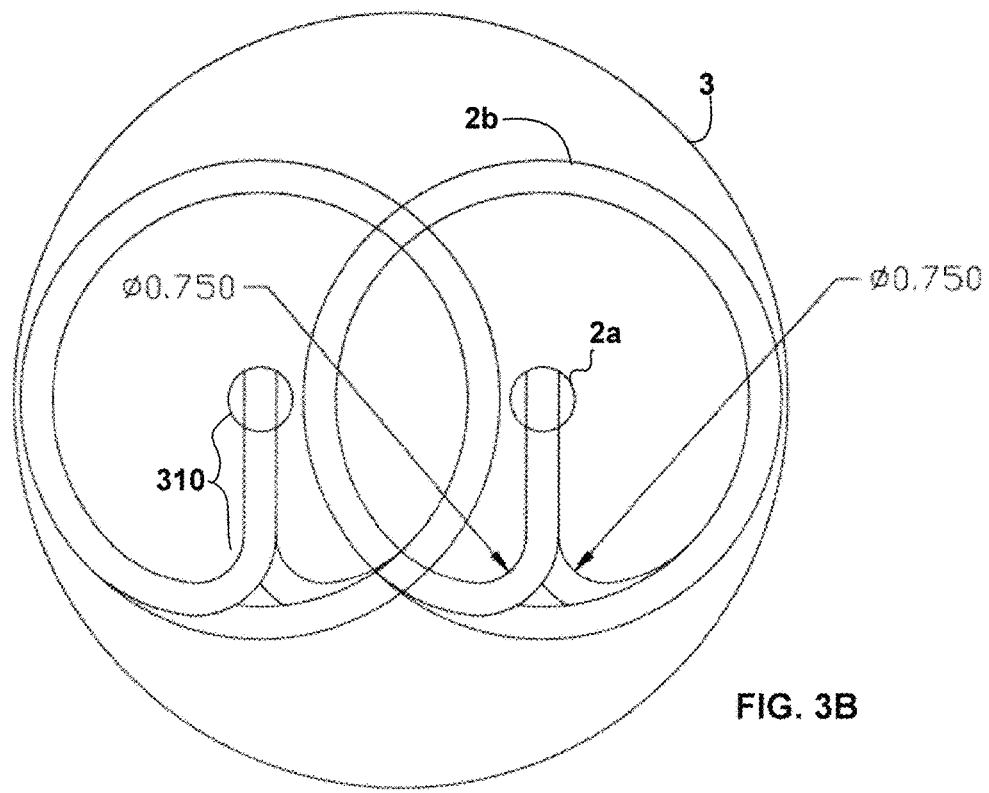

FIGS. 3A and 3B show one embodiment of the interconnectivity of the beaters 2 and container design. Each beater 2 has a shaft 2a and a helical spiral 2b. The beaters 2 are matched such that, when they are paired together and inserted into the mixer head 1b, the spirals fit 2b inside each other without touching the other spiral 2b or the other beater 2a shaft but within very close proximity of both. Specifically, the diameter of the spiral 2b and center shaft 2a as well as the wire diameter (i.e., thickness of the spiral) is such that the outer edge of one beater's spiral almost comes into contact with the shaft of the other beater. In various embodiments this distance can be less than $1/4$, $3/16^{th}$, $1/8^{th}$, or $1/16^{th}$ inches. In addition, the pitch, diameter, spacing and wire diameter is such that, at the center intersection of the installed beaters 2, the high side of one spiral is directly under the low side of the other. Because the helical spirals 2b of the beaters 2 overlap and part of one of the helical spirals 2b is always close to part of the other of the helical spirals 2b as they turn, the beaters 2 are considered to be "interlocked." As used herein, the term "interlocked beaters" is defined to include these features. Furthermore, the high side of one spiral 2b is almost in contact with the low side of the other at the front proximity point and the low side of that same spiral is almost in contact with the high side of the other at the rear proximity point (no actual contact but can be less than $1/16^{th}$, $1/8^{th}$ or $3/16^{th}$ inch apart in various embodiments). Representative measurements are shown in FIGS. 3A and 3B. These measurements are for illustrative purposes only and are not meant to be limiting. This design is scalable vertically and scalable in size. There are many possible cross-sectional designs for the spirals, including, elliptical, rectangular, circular, etc.

In this embodiment of the beater and container design, the beaters 2, when installed into the mixer head, are sized to closely fit the interior walls of the container 3, such that the outer edge of each spiral is in very close proximity with the interior wall of the container. For example, in various embodiments, separation between helical spirals 2b and the side of container 3 is less than $1/16^{th}$, $1/8^{th}$ or $3/16^{th}$ inch. While this close fitting container 3 was found to be the advantageous, a larger container 3 would also be possible, as long as the diameter of the collective beaters 2 is longer than the radius of the container (See, for example, FIGS. 8A-C). Additionally, an off-center container mount 4 could be used. Regardless, the taper of the helical spirals 2b should match that of the container 3—for example, if the helices do not taper, as shown in this variation, then the container 3 is straight-sided and flat-bottomed, such that the bottom of the helical spirals 2b are able to be within very close proximity to the interior bottom of the container 3.

A region 310 of helical spirals 2b is optionally parallel to a bottom of container 3 and is optionally straight. Region 310 is at the part of helical spirals 2b closest to the bottom. In various embodiments all or most of Region 310 is less than $1/16^{th}$, $1/8^{th}$ or $3/16^{th}$ inch from the bottom of container 3. As such, in some embodiments, essentially all of the bottom is cleaned by the relative motion of container 3 and beaters 2.

Ingredients are placed into the container in a non-frozen state (e.g., a liquid) and during mixing they are dosed with liquid nitrogen, freezing the ingredients while being mixed. Changes in physical properties of the ingredients can change the interaction between the ingredients, the container sides and the beaters. For example, as the ingredients freeze into a frozen or semi-frozen mixture, portions of the mixture can rise up inside certain portions of the container due in part to interactions of the mixture with the sides of the container and the beaters, forming "pillars" that can overflow the container. In addition, the viscosity of the ingredients changes significantly from the start of the mixing process to the end, which can affect the speed to best mix the ingredients at any one point in the mixing process.

To address these issues, the mixing apparatus can be operated such that, during a mixing process, the rotational movement of the container and the beaters can be controlled to minimize formation of "pillars" and to take into account the change in viscosity, resulting in a more efficient process that yields better results. During a process where ingredients are placed in a container coupled to the container mount and they are mixed while providing liquid nitrogen to the ingredients, the beaters can be operated to move in one direction (clockwise or counter-clockwise). For example, when the beaters are rotating clockwise (as viewed from above) the container coupled to the container mount moves in the other direction (in this situation, let's assume counter-clockwise) as the standard default mechanism of the machine, at pre-set intervals of time during the cycle, the bowl (or the beaters) counter-rotate, moving in the same direction as the beaters (or the bowl) momentarily and then switch back to moving in the opposite direction again. This momentary counter-rotation causes any buildup of ingredients within the container to be pulled back into the mixture to aid in the formation of an exceptionally smooth and consistent product.

FIGS. 3C-3F illustrate examples of rotating at least one beater 2 in a first direction and rotating a container 3 for holding ingredients in a second direction. The rotation of the beaters and the container 3 (e.g., rotated by the rotation of the container mount 4) can be done in various directions and for various amounts of time, depending for example on a mixing process that is being run by the mixing apparatus. In various implementations, the first direction and the second direction can be either clockwise or counter-clockwise. The first direction and the second direction can be in the same direction (e.g., clockwise or counter-clockwise), or the first direction the second direction can be in the opposite direction (that is, either the first or second direction being clockwise and the other of the first or second direction being counterclockwise). FIGS. 3C-3F, show specific examples of the rotation of at least one beater 2 and a container 3, which is rotated correspondingly to the rotation of a container mount 4 (not shown in FIGS. 3C-3F) by a mixing apparatus. The examples illustrated in FIGS. 3C-3F include two beaters 2. Other examples can include one beater, or more than two beaters.

Figure 3C:
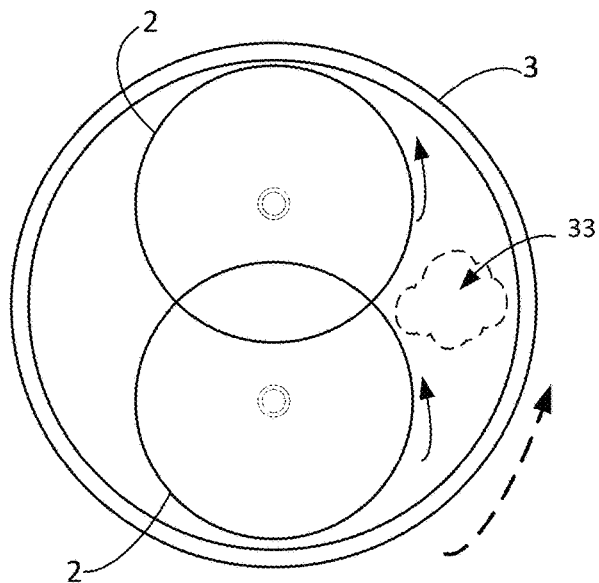
FIGS. 3C-3F illustrate examples of rotating at least one beater in a first direction and rotating a container for holding ingredients in a second direction. Various methodologies can be employed for rotating the container (e.g., via the rotation of a container mount) in different portions of time during a mixing process. The first direction can be clockwise or counter-clockwise. The second direction can be clockwise or counter-clockwise. The first direction and the second direction can be in the same direction (e.g., clockwise or counter-clockwise), or the first direction and the second direction can be in the opposite direction (either the first or second direction being clockwise and the other of the first or second direction being counterclockwise).
Figure 3D:
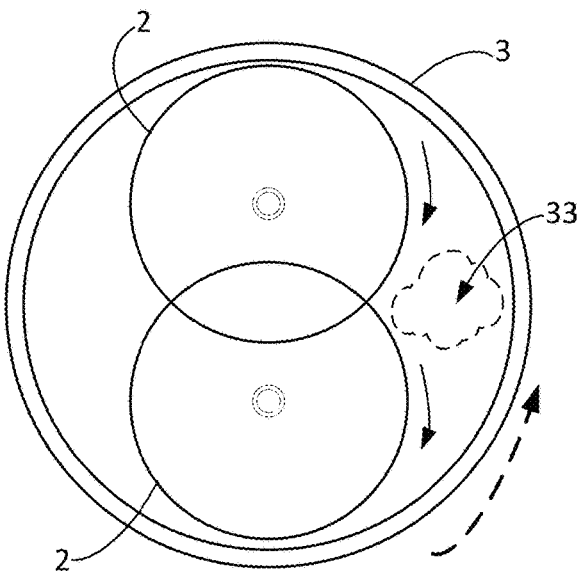

In the example illustrated in FIG. 3C, the beaters 2 are rotated by a mixing apparatus in a counterclockwise direction (as indicated by the small solid arrows) and the container 3 is rotated by the mixing apparatus in a counterclockwise direction. In the example illustrated in FIG. 3D, the beaters 2 are rotated in a clockwise direction and the container 3 is rotated in a counterclockwise direction. In the example illustrated in FIG. 3E, the are rotated in a counterclockwise direction in the container 3 is rotated in a clockwise direction. In the example illustrated in FIG. 3F, the beaters 2 are rotated in a clockwise direction in the container 3 is also rotated in a clockwise direction. As described further below, during a mixing process or during different portions or stages of mixing process, the mixing apparatus can move the beaters 2 in the container 3 in the one or more directions of any of the examples illustrated in FIGS. 3C-3F.

Figure 3E:
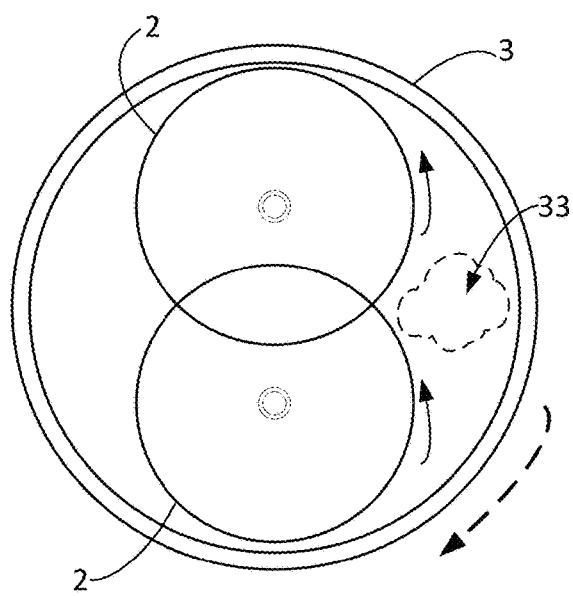
Figure 3F:
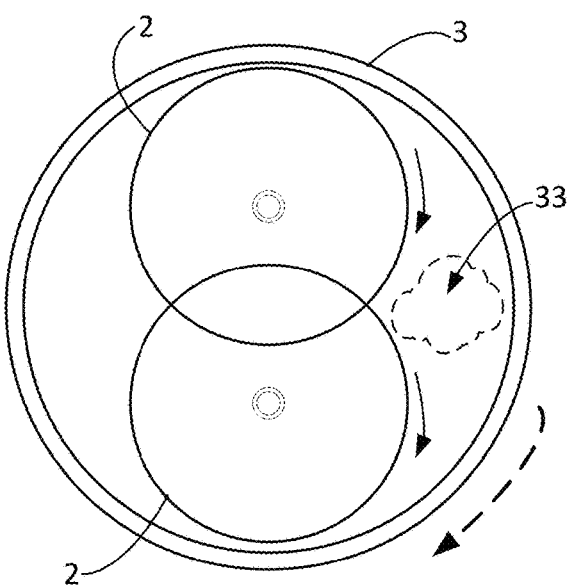

For example, in one portion of a mixing process the mixing apparatus can rotate the container 3 in a clockwise direction and the beaters 2 in a counterclockwise direction (as illustrated in FIG. 3E) for a first period of time. The mixing apparatus can change the rotation of the container 3 in another portion of the mixing process such that the container 3 is rotated in a counterclockwise direction while the beaters 2 are also rotated in a counterclockwise direction (as illustrated in FIG. 3C) for a second period of time. Then the mixing apparatus can again change the relative motion of the container 3 and the beaters 2, and rotate the container 3 in a clockwise direction and the beaters 2 in a counterclockwise direction (as illustrated in FIG. 3E) for a third period of time. Such changes of rotation of the beaters 2 and the mixing container 3 can continue throughout a mixing process. The time periods that the mixing apparatus may rotate the beaters 2 and the container 3 in various directions can be different, and may change throughout a mixing process. For example, using the example above, any of the first, second and third time period may be between one second and one or more minutes. For example, the first time period may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 37, 48, 49, 51, 52, 53, 54, 55, 56, 57, 58, 59, or 60 seconds, or more than one minute. In an example, the second time period may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 37, 48, 49, 51, 52, 53, 54, 55, 56, 57, 58, 59, or 60 seconds, or more than one minute. In an example, the third time period may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 37, 48, 49, 51, 52, 53, 54, 55, 56, 57, 58, 59, or 60 seconds, or more than one minute. In a more specific but non-limiting example, the first period of time may be a period of time between 20 seconds and one or more minutes, the second time period may be a period of time between 1 second and 20 seconds, and the third time period may be a period of time between 20 second and one or more minutes.

The mixing apparatus can rotate the beaters 2 and the container 3 in opposite directions, and then iteratively for at least for a portion of time, the mixing apparatus rotates the beaters 2 and the container 3 in the same direction. In an example, the mixing apparatus rotates the beaters 2 and the container 3 in opposite directions, and then at least for one second every minute the mixing apparatus rotates the beaters 2 and the container 3 in the same direction. In another example, the mixing apparatus rotates the beaters 2 and the container 3 in opposite directions, and then at least for 1-20 seconds per minute the mixing apparatus rotates the beaters 2 and the container 3 in the same direction. In some embodiments, the time period(s) for rotating the container in certain directions and the time period(s) for rotating the beaters in certain directions are programmed into a computer controller, which controls the rotation of the beaters and the container for predetermined time periods associated with a certain mixing process. The predetermined time periods can take into account the expected changes in the physical properties of the ingredients which may necessitate changing the frequency and/or the time period of rotating the container during the mixing process. For example, a mixing process can be used (e.g., selected by the user) for mixing a particular batch of ingredients, where the mixing process may be tailored for thin viscosity ingredients, medium viscosity ingredients, or thick viscosity ingredients. In some embodiments, the mixing apparatus may sense the viscosity of the ingredients during the mixing process, and use the sensed information to determine when to change the direction of the container (or the beaters) and/or for how long of a duration to change the direction of the container (or the beaters).

FIGS. 3C-3F also illustrate and example of a location 33 within a container 3 where liquid nitrogen can be added (during "dosing") during a mixing process, according to some embodiments. The location 33 is a certain space between the two beaters and a wall of the container 3, as illustrated in FIGS. 3C-3F. Providing the liquid nitrogen onto ingredients in this area allows the immediate interaction of the portion of the ingredients that are directly receiving the liquid nitrogen with the beaters and the inside wall of the container.

Figure 4:
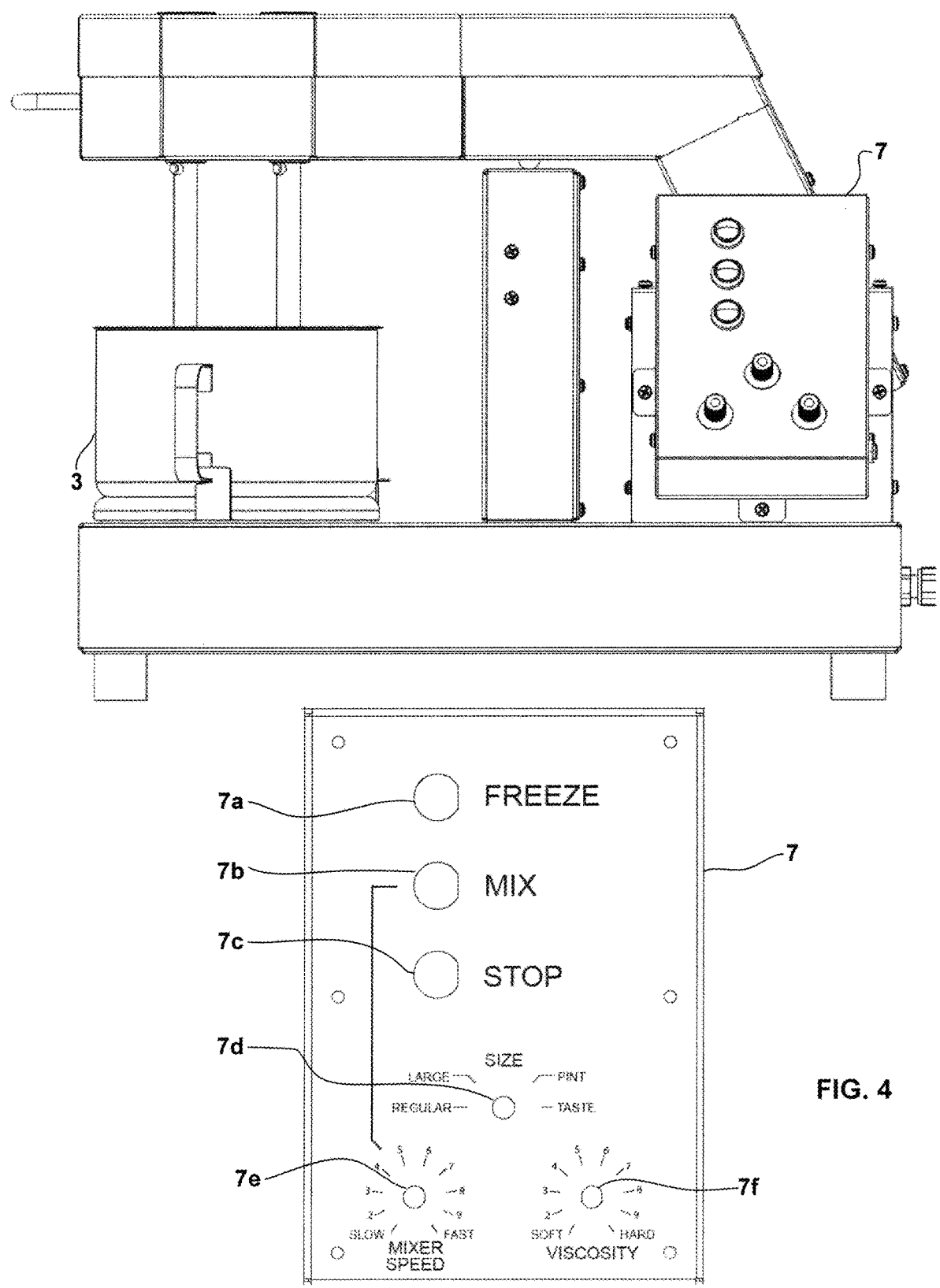
FIG. 4 illustrates a control panel, according to various embodiments of the invention.

FIG. 4 shows an exemplary embodiment of a detailed control panel 7 when this embodiment is used for preparing a frozen product using liquid nitrogen—one of many potential applications of this invention. In this example, there is a freeze button 7a (which could be removed if the embodiment was not used for frozen applications), a mix button 7b, and a stop button 7c. This example also includes a size knob 7d, which can be used to select various serving sizes (regular, large, pint, taste). This variation also includes a mixer Speed knob 7e, which ranges from slow to fast. This example also includes a viscosity knob 7f, which ranges from soft to hard. The viscosity knob 7f is configured to control the viscosity of the final product, which may be determined by measuring actual viscosity or some other parameter as discussed elsewhere herein. The interior of this variation of control panel could include a printed circuit board with wiring connections. Mixer Speed knob 7e can be configured to control the speed of beaters 2 and/or container mount 4. In addition to viscosity selection, control inputs may be configured for a user to select between various recipes as some ingredient combinations and/or products require greater or lesser cooling than others. The different recipes may include different ingredient ratios and/or different total quantities of ingredients. For example, an input may be configured for selection between small, medium and large quantities (sizes) of product. In some implementations, a mixing process that controls the time duration of mixing periods during which the beaters and the container mount are rotated, and the direction of the rotation of the beaters and the container mount (e.g., such that periodically the beaters and the container/container mount are rotated in the same direction) is based at least in part on the selected size.

In some implementations, the machine operator selects a "viscosity level" to indicate the thickness (or lack thereof) of the ingredients placed into the container. In some implementations, a mixing process that controls the direction of the rotation of the container mount and the beaters can be based on, at least in part, the viscosity level selection. In some implementations, a mixing process that controls the duration of the rotation of the container mount and the beaters can be based on, at least in part, the viscosity level selection. In some implementations, a mixing process that controls the time duration of mixing periods during which the beaters and the container mount are rotated, and the direction of the rotation of the beaters and the container mount (e.g., such that periodically the beaters and the container/container mount are rotated in the same direction) is based at least in part on the selected viscosity level. In an example, let's assume that Viscosity 10=extremely thick (e.g., very high fat chocolate ganache ice cream) and Viscosity 1=extremely thin (e.g., sorbet). In some examples, the machine operator enters a product associated with the ingredients and the controller associates the product with the dosing required for that product, based on the viscosity of the product. Depending on the viscosity level that is selected, the machine will dose liquid nitrogen at different quantities and intervals. For example, the controller of the mixing apparatus can use pre-determined information stored in memory that correlates the viscosity (or the product) entered by the operator to the amount of dosing to make a product. The "thresholds" set for each viscosity level can differ, with the lower/thinner viscosity levels having lower thresholds that indicate a certain point in the freezing cycle has been reached. The dosing of liquid nitrogen (quantity and interval of dosing) changes at each threshold within each viscosity level's settings.

In some embodiments, the controller can perform a calibration process as part of a startup operations, or at a time selected by an operator. In an example, at machine power on, the mixing machine self-calibrates itself to effectively "tare" itself to the default resistance that the bowl motor and the beater motor "feel" without any ingredients in the bowl. This can be based on, for example, determining the current used to drive the beaters motor, or by using another sensor. In some embodiments, when the mixing machine is turned on, the mixing machine does not let the operator use the buttons without first accepting/pressing "Calibration" so that the viscosity algorithms are assured to work. In some embodiments, this calibration lasts for 30 seconds and can be done at the start of every day. This step ensures that the thresholds programmed into the machine software work, effectively triggering the machine to progress in the freezing cycle when the motors "feel" the proper resistance of the ice cream. The calibration therefore rules out slight differences in machine construction, alterations due to repair and maintenance (e.g., if there is a tighter transmission or belt post repair), and wear and tear of machines over time.

In some embodiments, the controller can perform a "purge" function as part of a start-up process, during certain portions of a mixing process, or when selected by an operator. A "purge" effectively pushes or allows nitrogen gas or air to blow through the liquid nitrogen dosing mechanism (and potentially the cryogenic piping/plumbing attached to the dosing mechanism). This "purge" pushes accumulated moisture and condensation out of the interworking of the dosing mechanism (and potentially the piping as well). Without the purge step, the condensation within the system can cause ice balls that block the inner nozzle of the doser, effectively clogging the doser so that no liquid nitrogen can be released and freezing of the frozen dessert is prevented. The length of time necessary for the purge function to be effective depends on the size and type of the system the machines are attached to. In some examples, the purge occurs for between 20 seconds and 2 minutes. In some preferred examples, the purge occurs for more than a minute.

In some embodiments, the controller can be configured to operate based in part on a "size" input provided by a machine operator. A machine operator can select, from a pre-set number of options, the quantity or size of batch. In an example, let's assume 8 oz, 12 oz or 16 oz. If the 8 oz size is selected, the thresholds between stages of viscosity sensing will be lower than the 12 oz or 16 oz sizes, as more liquid nitrogen is needed to freeze more liquid ingredients and, if too much liquid nitrogen is added, the ingredients will become over-frozen. Once the machine operator selects the viscosity level (described above) and the size, the machine operator can press start and the automatic freezing cycle will begin. With the correct viscosity level and size of the ingredients, the automatic cycle can freeze the frozen dessert to the desired consistency, temperature and/or texture.

Figure 5:
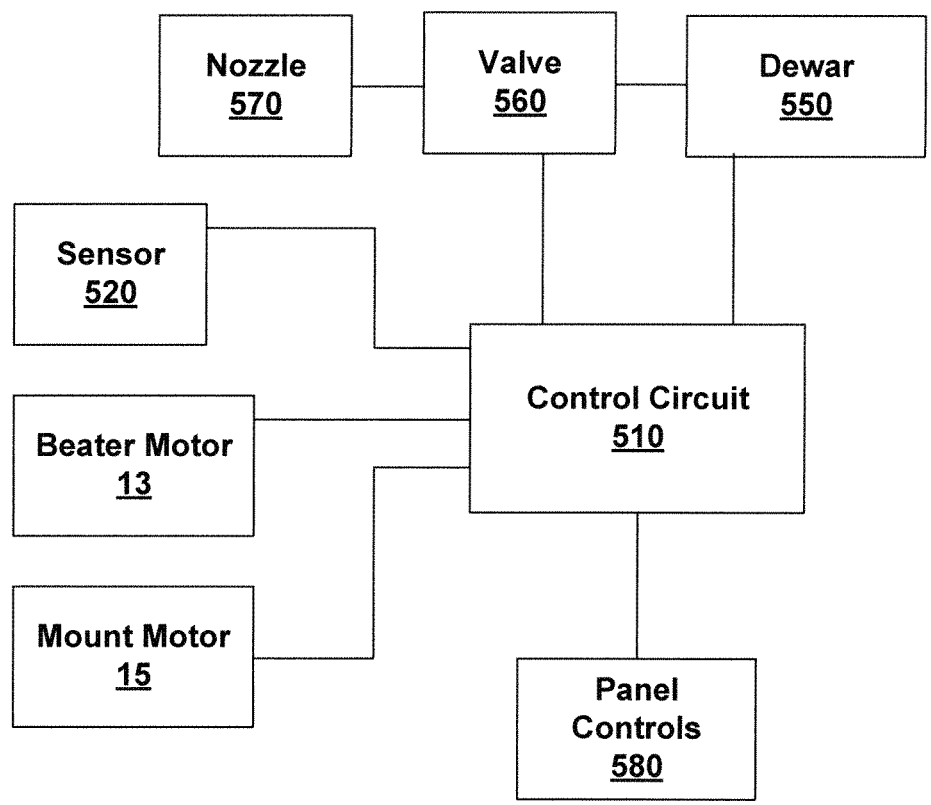
FIG. 5 illustrates a block diagram of the control panel illustrated in FIG. 4, according to various embodiments of the invention.

FIG. 5 shows an example of a block diagram of a control circuit 510 and other components of the system associated with the control panel 7 shown in FIG. 4. Wiring from control circuit 510 connects to various components of the device, including to the panel controls 580, mount motor 15 and beater motor 13. For example, Control Circuit 510 may be connected to one or more valves 560 configured to control the flow of liquid nitrogen from a Dewar 550 to a Nozzle 570. Nozzle is typically disposed adjacent to container 3 such that the liquid nitrogen that flows from the nozzle reaches the ice cream ingredients. Valve 560 is optionally replaced by a scoop or other device configured for sampling a controlled amount of liquid nitrogen. Control Circuit 510 is optionally connected to a level sensor within Dewar 550. Beater Motor 13 is configured to rotate beaters 2. Mount motor 15 is configured to rotate container mount 4.

Sensor 520 is configured to detect properties of the frozen ingredients during the freezing process. In some embodiments, sensor 520 is configured to detect a viscosity of the ingredients. For example, sensor 520 may be configured to detect a load on beater motor 13 or mount motor 15. In this case sensor 520 can include strain, current or voltage sensor configured to detect the torque or power needed to drive the motor 13 or mount motor 15. In some embodiments, sensor 520 includes a temperature measurement device, such as a thermocouple. The thermocouple can be connected to beaters 2, container 3, and/or nozzle 570. In various embodiments the thermocouple is disposed in the stream of liquid nitrogen as it leaves nozzle 570, to measure the temperature of the output pipe 1125, and/or to measure the temperature of the ingredients as they are being mixed and cooled. In addition to the thermocouple, sensor 520 can include a metallic or non-metallic probe (e.g., a copper plate) whose temperature is changed by the liquid nitrogen and is measured by the thermocouple. Some embodiments include more than one sensor 520. The output of sensor 520 is optionally processed using circuits and/or computing instructions executed within control circuit 510, to perform various functions described herein.

One or more viscous substances is/are placed in container 3. For example, if the method is being used to make a frozen dessert, such ingredients may include unfrozen ice cream or custard mix, or pureed fruit for sorbet, or yogurt, or milk or cream, or a non-dairy substitute for milk or cream. Additional ingredients/accompaniments/toppings (e.g., in the case of a frozen dessert: cookies, fresh fruit, or nuts) may also be added to the container prior to or during the process of mixing (and, in this case, freezing). Substance/ingredients may either be placed into the container before or after the container is placed on the container mount.

When the Mix button 7b on control panel 7b is pressed, beater transmission 11, driven by its accompanying motor 13, rotates the beaters, with each beater rotating in the same direction and speed of rotation as the other beater. In some embodiments, the spirals of the beaters move in a downward direction such that the spiral helices 2b are pushing the substance/ingredients downward into the container. At the same time, belt drive 10 powered by its accompanying gear-motor 15 rotates the container 3 at an asynchronous speed relative to the beaters. In some embodiments, the container 3 rotates (typically but not necessarily in the opposite direction as the collective beaters 2 and turns at such a speed with non-small integer ratios such that essentially all of the container's side is scraped by the beaters (again, the beaters 2 not quite touching the side of container 3. In other embodiments the container 3 does is fixed and does not rotate. In these embodiments motor 15 and the associated drive system elements are optional. To demonstrate the rotating container embodiment, in FIG. 3A, spiral helices 2b move counter-clockwise, while container 3 moves clockwise. Due to the beaters' helical shape and movement, in practice, the beaters 2 act to scrape the ingredients from each other's surface and to propel the ingredients down into the container. The ability to remove frozen ingredients from each other makes the beaters 2 jointly self-cleaning. Additionally, because the beaters 2 are designed to fit the container 3 and the container 3 is rotating at an asynchronous speed relative to the collection of beaters 2, the beaters 2 also act to scrape the ingredients off of the sides of the container 3. Due to the asynchronous movement between the collective beaters 2 and the container 3, the collective beaters 2 are, in essence, orbiting together around the interior surface of the container 3, such that most interior sides of the container are scraped by the collective beaters 2. If pitch, diameter, spacing and wiring gauge are all correct, most of the surfaces are close to a scraping action.

The underlying purpose of this beater-container design is to ensure that the substance in the container is evenly mixed (and, in the case of making a frozen product, frozen) throughout and that all ingredients are incorporated into the mixing (and, in the case of making a frozen product, freezing) process. Additionally, the collective helical beater design minimizes crushing of additive by allowing their escape from between moving parts, using a wiping rather than a crushing motion at intersections. This beater-container design is especially effective for making frozen product using liquid nitrogen as the freezing agent because the formation of small ice crystals has a significant impact on the texture of the frozen product (e.g., ice cream). Some embodiments of the invention ensure the creation of an exceptionally high quality frozen novelty product—the formation of exceptionally small ice crystals—because of the even distribution of the ingredients, the constant scraping of ingredients off surfaces, and the downward motion of the spirals. Note that in some embodiments the container 3 is moved while the beater(s) 2 is(are) stationary.

The control circuit 510 can be programmed to run the motors for a number of seconds every time the mix button is pressed and then to stop running the motors after that time is up. Alternatively, the control circuit 510 can be programmed to run the motors continuously, in which case Stop button 7c can be pressed to halt the motors. There may or may not be a mixer speed knob 7e, which moves the beaters 2 and/or the container 3 faster and slower depending on its position. Additionally, if desired, the control circuit 510 can be programmed to read Size knob 7d (such that the device mixes for a longer time depending on the amount of ingredients placed in the container); Viscosity knob 7f (such that the device mixes until the desired viscosity has been reached), and/or a recipe knob (not shown) to select between different recipes. The knob inputs illustrated in may be replaced by digital inputs such as a computer touchscreen interface, membrane switches, a graphical user interface, and/or the like.

Embodiments may or may not have viscosity measurement capabilities, i.e. the viscosity knob 7f on the control panel 7. When this capability is included, the entire device can be integrated and the entire mixing (and, in the case of making a frozen product, freezing) process can be completely automated, without requiring the watchful eye of a machine operator. For example, in some embodiments, control circuit 510 is programmed to read the torque of either the beater motor or the container motor and control the dosing of coolant depending on the measured torque and the viscosity knob 7f setting. Generally, the beater torque has a lot of noise in it, so in one approach is to use the measurement of the container motor torque and to use a small motor, which can give a good indicator of how viscous the substance is. Because the collective beaters optionally have asynchronous movement relative to the container, the motors driving the container and beaters are, in essence, working against each other to some degree. For instance, in the aforementioned example, the container is moving in the opposite direction as the collective beaters such that the collective beaters are working "against" the container. As such, when the substance or ingredients is/are thickening, the motors have to work harder and harder. By setting the desired viscosity, the operator is indicating how hard the motor should work before stopping and, in essence, before the substance/product is done and ready for removal from the container (or ready for the next step in its mixing process). The control circuit 510 can be programmed to take into account momentary increases in torque as a result of the beaters working through chunks (e.g., in the case of making a frozen dessert, these chunks may be nuts or chocolate chips). For instance, logic on control circuit 510 can be set to shut down the system (and stop coolant introduction) when the system exceeds a certain torque for a number of seconds in a row. As such, momentary increases in torque are ignored. This logic can include hardware, firmware and/or software stored on a computer readable medium.

In the case of making a frozen product using liquid nitrogen, liquid nitrogen can either be added manually or through a dosing system, which would typically be connected to a liquid nitrogen supply—an example of this supply is shown as Dewar 550 in FIG. 5. If the liquid nitrogen is added manually, then the freeze button 7a on control panel 7 acts the same as mix button 7b. In this case, there need only be one button or lever, in essence Mix/Freeze, which activates the device. Note that the mix button 7b is optional. Mixing can occur manually outside of the container 3.

Figure 6:
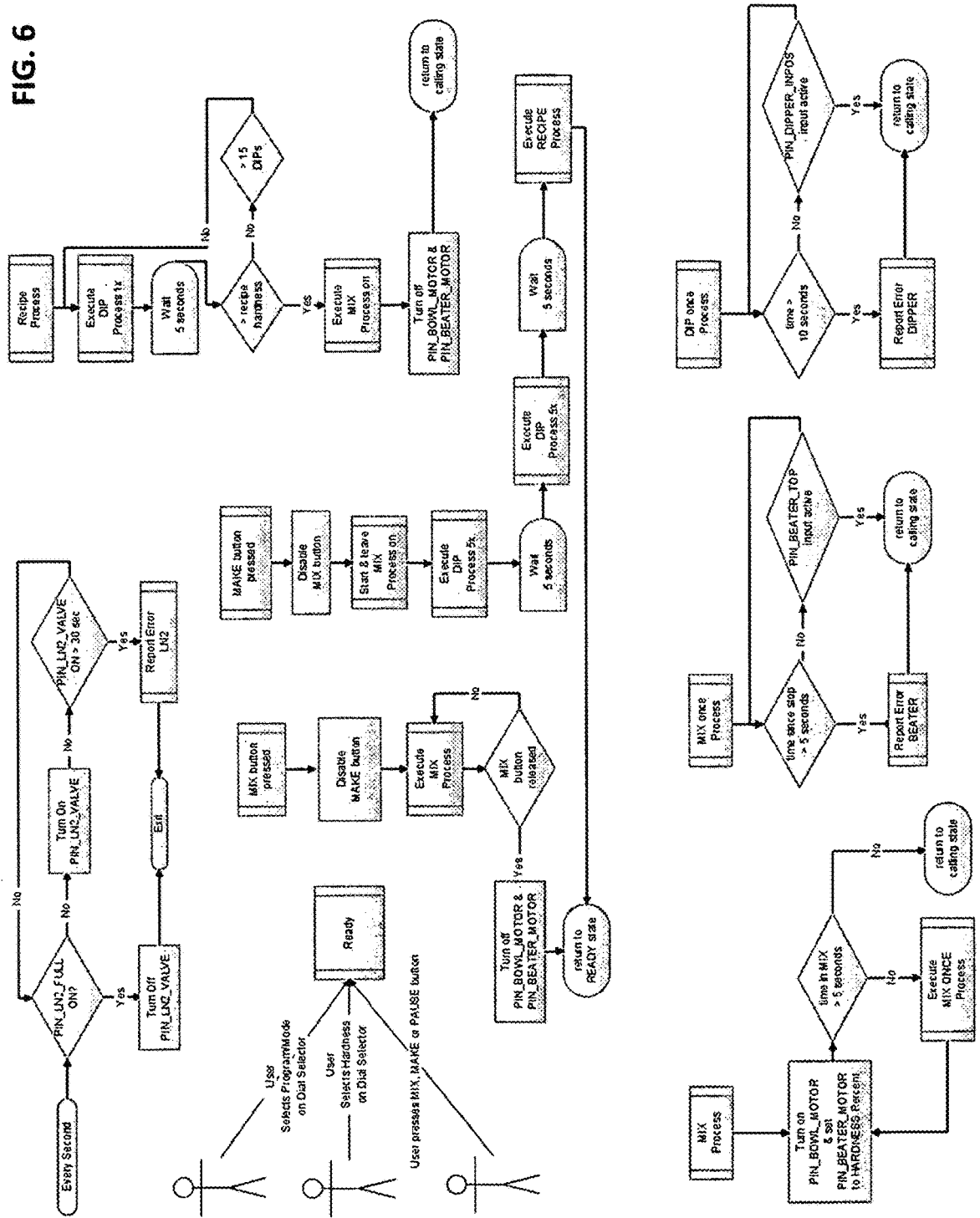
FIG. 6 illustrates a flow chart of an example algorithm for dispensing of liquid nitrogen, according to various embodiments of the invention.

If the device is hooked up directly to a liquid nitrogen supply and accompanying dosing system, then the freeze button 7a in FIG. 4 optionally has additional functionality. For example, the freeze button 7a may cause control circuit 510 to start and stop the dispensing of the liquid nitrogen into the container 3. In essence, the control circuit 510 can have a connection point to the dosing system such that the freeze button 7a activates some sort of valve (e.g., valve 560, depending on the selected dosing system), such as a needle valve or a solenoid valve, which releases liquid nitrogen into the container 3. The control circuit 510 may also have a connection point for a level sensor, which would ensure that the liquid nitrogen supply is sufficient. The dosing system may also have a phase separator such that a known quantity of liquid can be added. The software associated with the Freeze button can be programmed to have different liquid nitrogen dispensing algorithms for different sizes or variations of frozen novelty products. An example algorithm is shown in FIG. 6. In this variation, Size knob 7d can be used to select which liquid nitrogen dispensing algorithm is used. For instance, a large size requires more liquid nitrogen dispensed than a regular size. The algorithms may be based on a combination of the following factors: quantity of liquid nitrogen, time, output of sensor 520 (a viscosity or temperature measurement), and torque/load of the motor(s). The liquid nitrogen, when added manually or through the integrated dosing system, can be added in one bulk pouring or in multiple releases over a period of time. Typical dispensing times are under two minutes for a 4-10 ounce batch size.

FIG. 6 illustrates several methods that may be performed using control circuit 510. These include a) determining at regular intervals if more or less liquid nitrogen should be added and turning on or off valve 560 accordingly; b) monitoring an amount of cooling that has been provided to the ingredients and turning on or off valve 560 accordingly; c) detecting which of panel controls 580 have been activated; starting and stopping motors 13 and/or 15; and monitoring viscosity of the frozen ingredients and turning on or off valve 560 accordingly.

Figure 7:
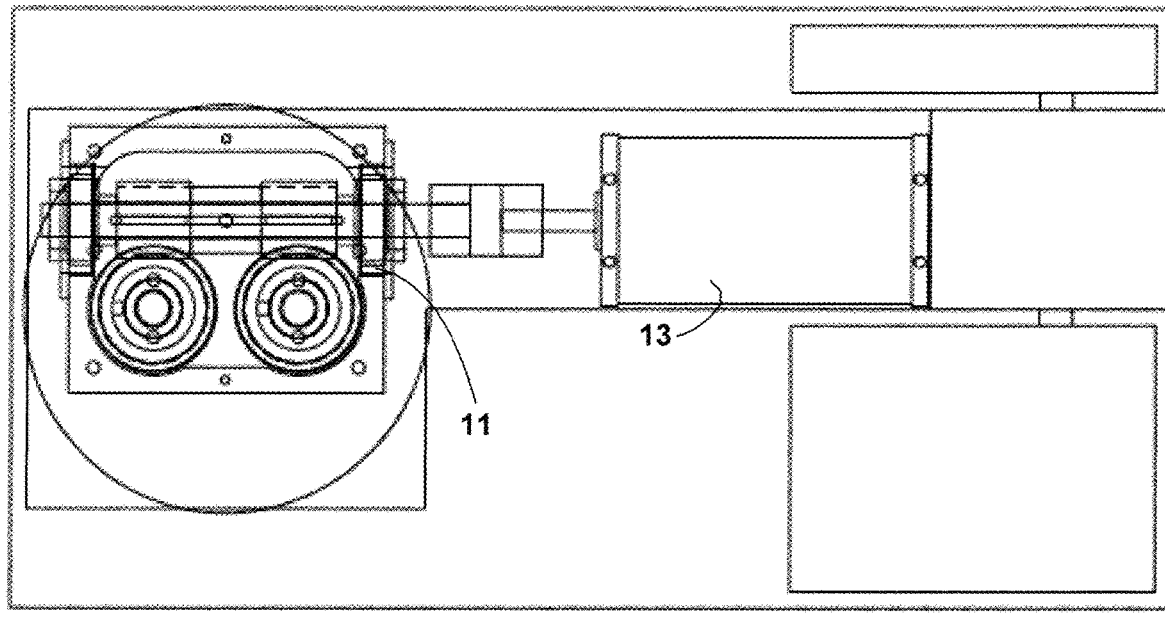
FIG. 7 illustrates the beater drive system, according to various embodiments of the invention.
Figure 7:
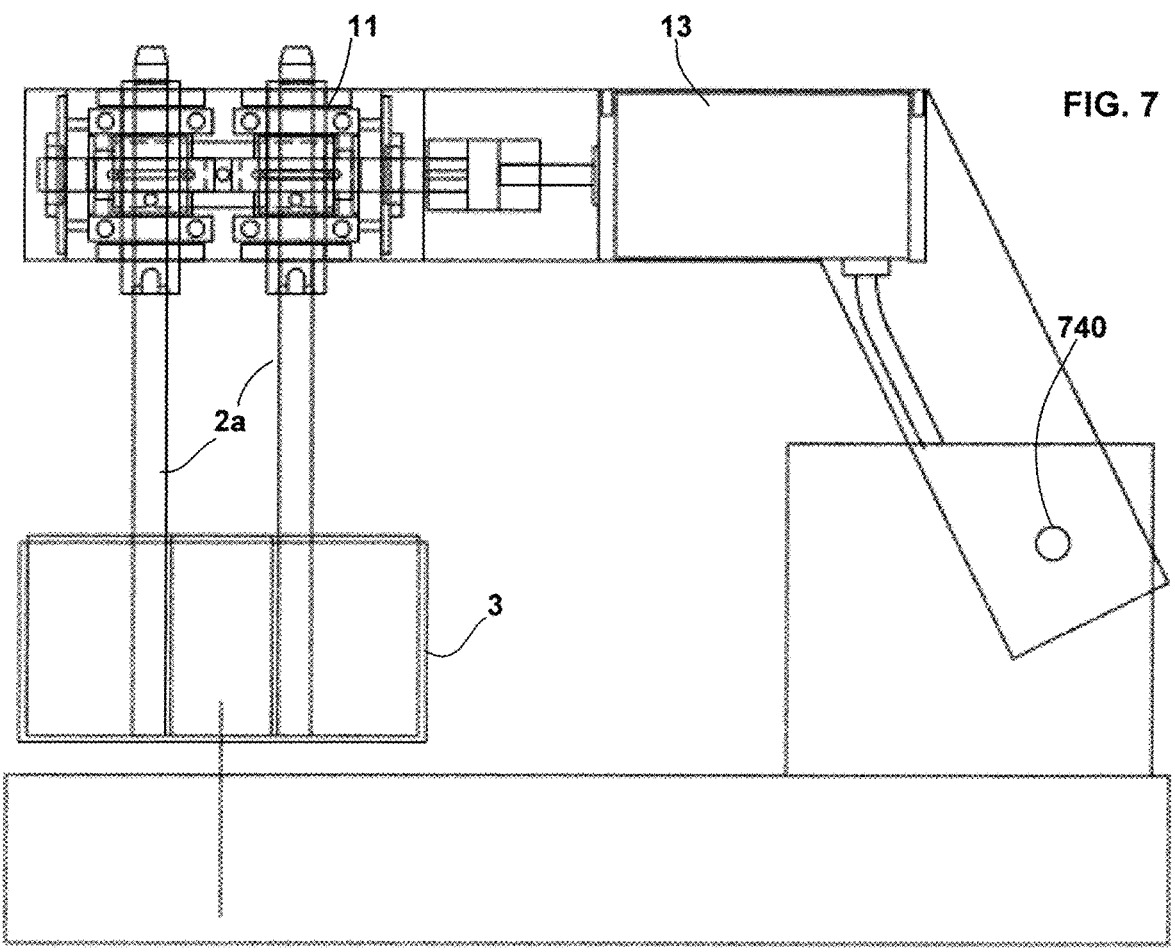

FIG. 7 shows the beater drive system, according to various embodiments of the invention. The beater drive system includes a beater motor 13, mechanically coupled to transmission 11 and drive shafts 2a configured to turn the beaters 2. The beater motor 13 optionally includes sensor 520 configured to measure motor speed or current drawn by one or more of the motors 13 or 15. The beater drive system typically includes a hinge 740 configured such that the beaters 2 can be lifted from the container 3. Hinge 740 is optionally motorized and controlled by control circuit 510. In alternative embodiments, the same motor is configured to rotate any combination of beaters 2, hinge 740, and/or container 3. The beater drive system is optionally configured to rotate beaters in the same direction, and optionally configured to rotate at least one of beaters 2 in a direction opposite the rotation of container 3. Beater motor 13 is optionally disposed in alternative positions.

Figure 8A:
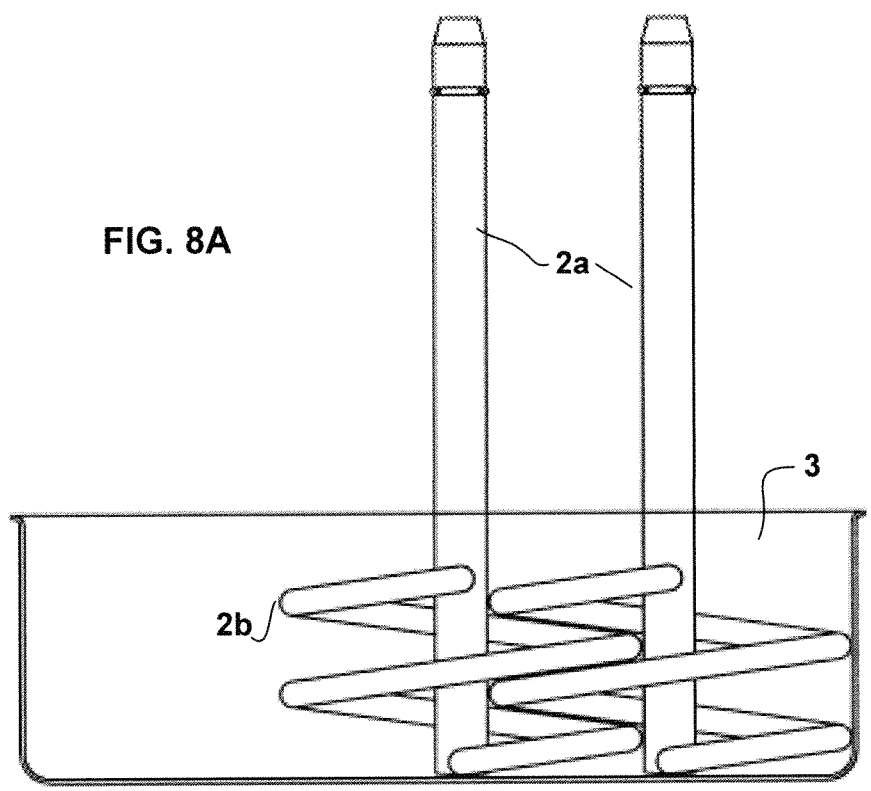
FIGS. 8A-C illustrates helical beaters in a container, according to various embodiments of the invention.
Figure 8B:
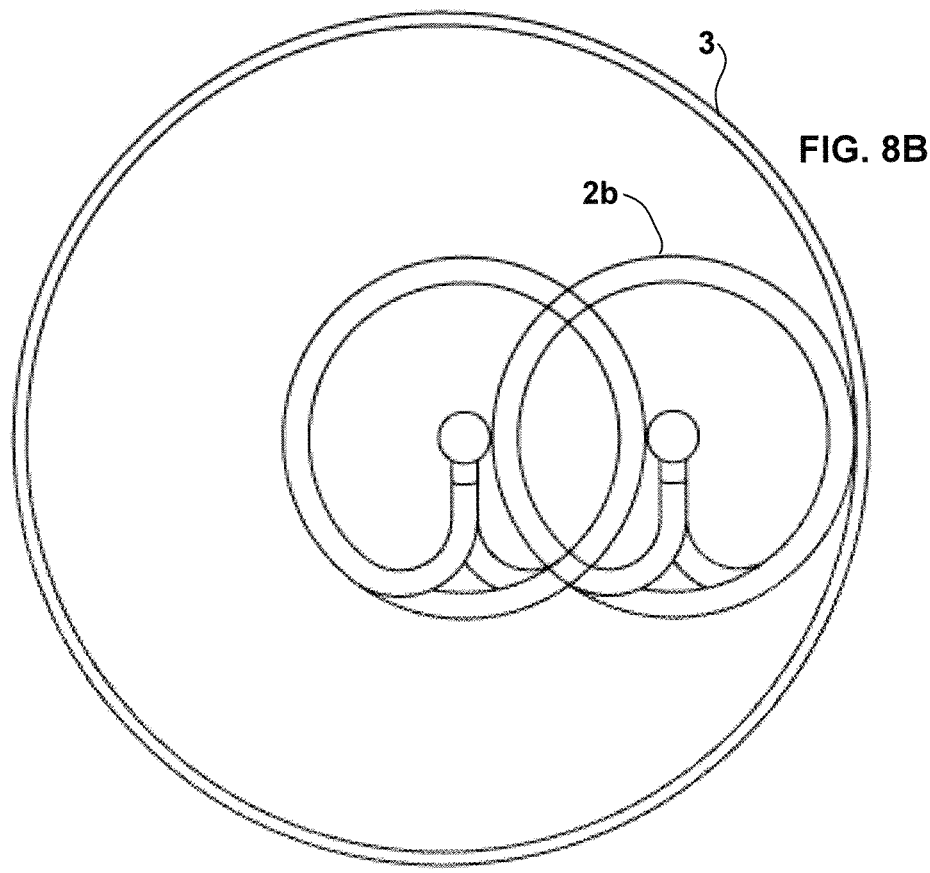

FIGS. 8A and 8B show examples of helical beaters 2 in a container 3, according to various embodiments of the invention, in these examples the helical beaters 2 are disposed such that one of the beaters 2 is closer to a side surface 810 of the container 3 relative to a second of the beaters 2. In various embodiments the distance between the closer beater 2 and side surface 810 is less than $\frac{1}{4}$, $\frac{3}{16}^{th}$, $\frac{1}{8}^{th}$, or $\frac{1}{16}^{th}$. However, in typically embodiments the closer beater is disposed such that it does not touch side surface 810. Similar positioning between side surface 810 and beaters may be found in embodiments wherein beaters 2 are symmetrically disposed within container 3. Either of these positions allows beaters 2 to clean frozen product from side surface 810. If the beaters 2 rotate in opposite directions, then that beater closest to side surface 810 is rotated in a direction counter to side surface 810. Otherwise, the rotations are such that at least one of beaters 2 is disposed next to side surface 810 and rotates in a direction opposite to the direction side surface 810 is rotated.

Figure 8C:
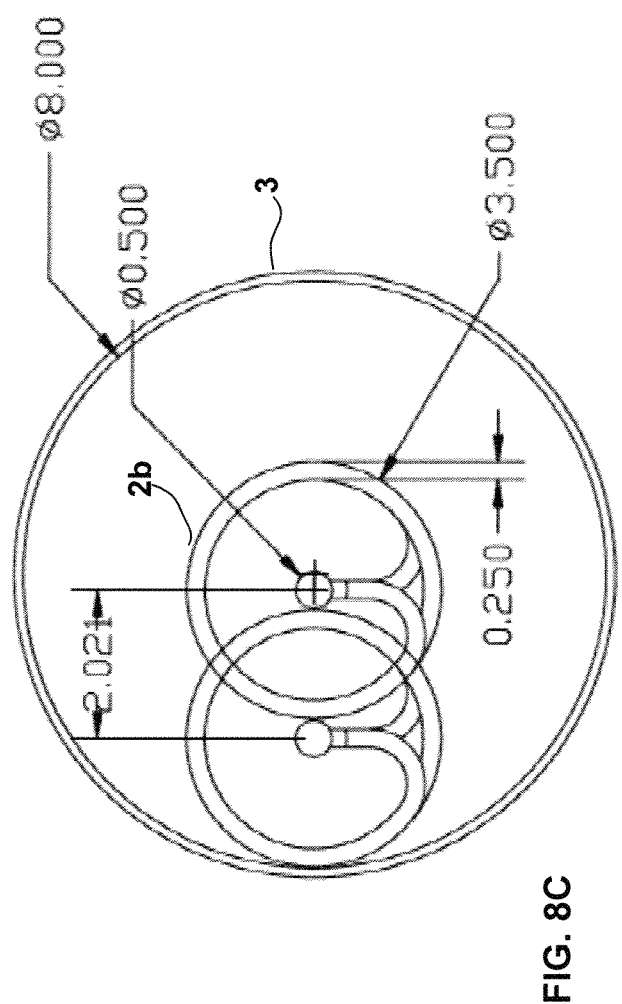

FIG. 8C illustrates one example of a top view of beaters 2 and container 3. The distances are shown in inches and degrees, and are meant to be non-limiting examples.

Figure 9:
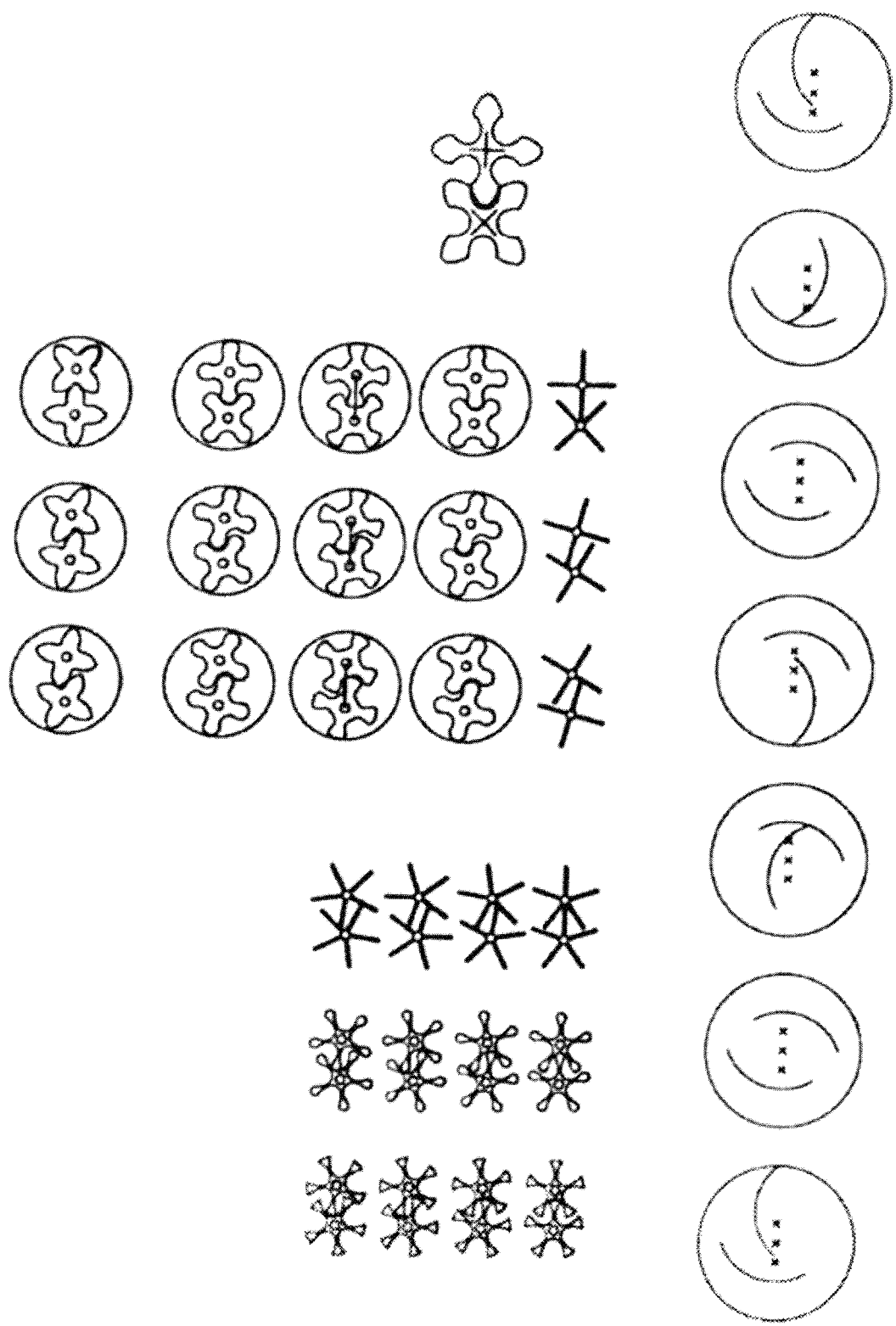
FIG. 9 illustrates alternative beater/agitator designs, according to various embodiments of the invention.

FIG. 9 illustrates various alternative beater 2/agitator designs, according to various embodiments of the invention. One feature common to most of these designs is that they are self-cleaning. In each example the beaters 2 rotate so as to remove frozen product from each other and/or from surfaces of the container 3.

Figure 10:
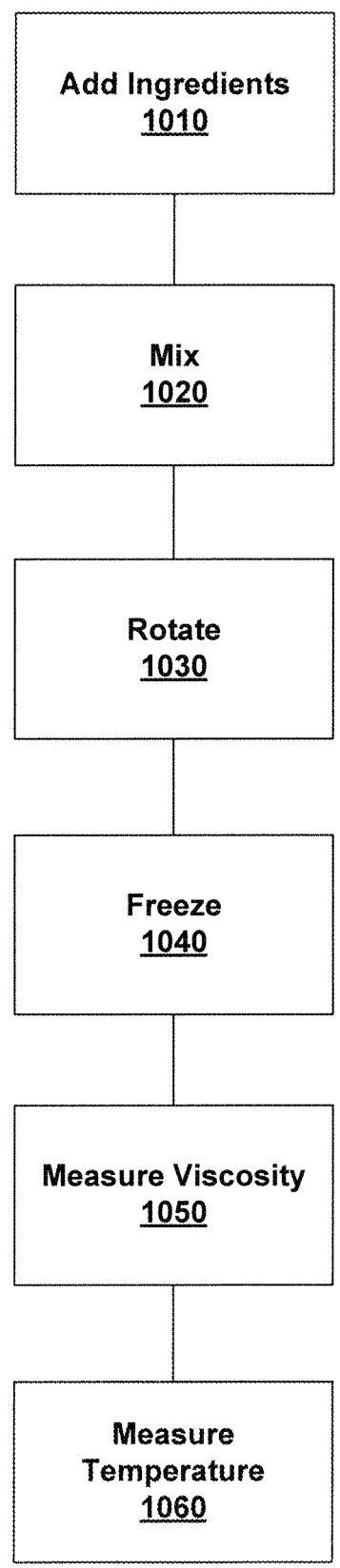
FIG. 10 illustrates a method of making frozen ice cream, according to various embodiments of the invention.

FIG. 10 illustrates a method of making frozen ice cream, according to various embodiments of the invention. In an add ingredients step 1010 ice cream ingredients are added to container 3. As described herein the ingredients can include a wide variety of food stuffs including cream, yogurt, sugar, flavoring, and the like. The addition is optionally automated.

In a mix step 1020 the ingredients are mixed using two or more interlocking beaters 2. In various embodiments, the beaters 2 are disposed to within less than $\frac{1}{4}$, $\frac{3}{16}^{th}$, $\frac{1}{8}^{th}$, or $\frac{1}{16}^{th}$ inches of each other. Typically the beaters 2 do not touch each other. At these distances the beaters operate to be self-cleaning, e.g., they clean frozen (ice cream) product from each other. Mixing occurs by rotating the interlocking beaters 2.

In an optional rotate step 1030, the container 3 is rotated. Typically this rotation occurs in a direction that is opposite the rotational direction of a member of the beaters 2 that is in close proximity to a side of the container. For example, the member of the beaters 2 that is closest to a side surface of the container. The container 3 can be rotated using the same or a different motor than is used to rotate the beaters 2.

In a freezing step 1040, a coolant is added to the ingredients in the container 3. The coolant is typically a liquefied gas such as liquid nitrogen, and is delivered in a control manner. For example, in some embodiment a controlled amount (volume or mass) of coolant is added. In some embodiments, the coolant is added for a specific length of time, until a measured viscosity of the ingredients is achieved, and/or until a desired temperature drop is achieved. Control can be achieved by opening and closing a valve or by collecting a specific amount of fluid from a reservoir.

The freezing step 1040 is optionally performed in parallel with a measure viscosity step 1050. In measure viscosity step 1050 the viscosity of the ingredients is measured using sensor 520 as the coolant is added. As discussed elsewhere herein, viscosity can be measured by monitoring current consumed by the motor 13 or 15, monitoring the speed of motor 13 or 15, and/or the like. If the viscosity is measured, then the delivery of the coolant to the ingredients can be controlled responsive to this measurement.

The freezing step 1040 is optionally performed in parallel with a measure temperature step 1060. In measure temperature step 1060 the temperature of the ingredients is measured using and embodiment of sensor 520 as the coolant is added. These embodiments of sensor 520 can include, for example, a thermocouple or an optical sensor. The measured temperature could be that of the ingredients themselves, part of beaters 2, part of container 3, part of a nozzle used to deliver the coolant, or of a metallic (or non-metallic) object placed in the stream of the coolant. If the temperature is measured then the delivery of the coolant to the ingredients can be controlled responsive to this measurement. Optionally, both temperature and viscosity are measured using separate embodiments of sensor 520.

Figure 11:
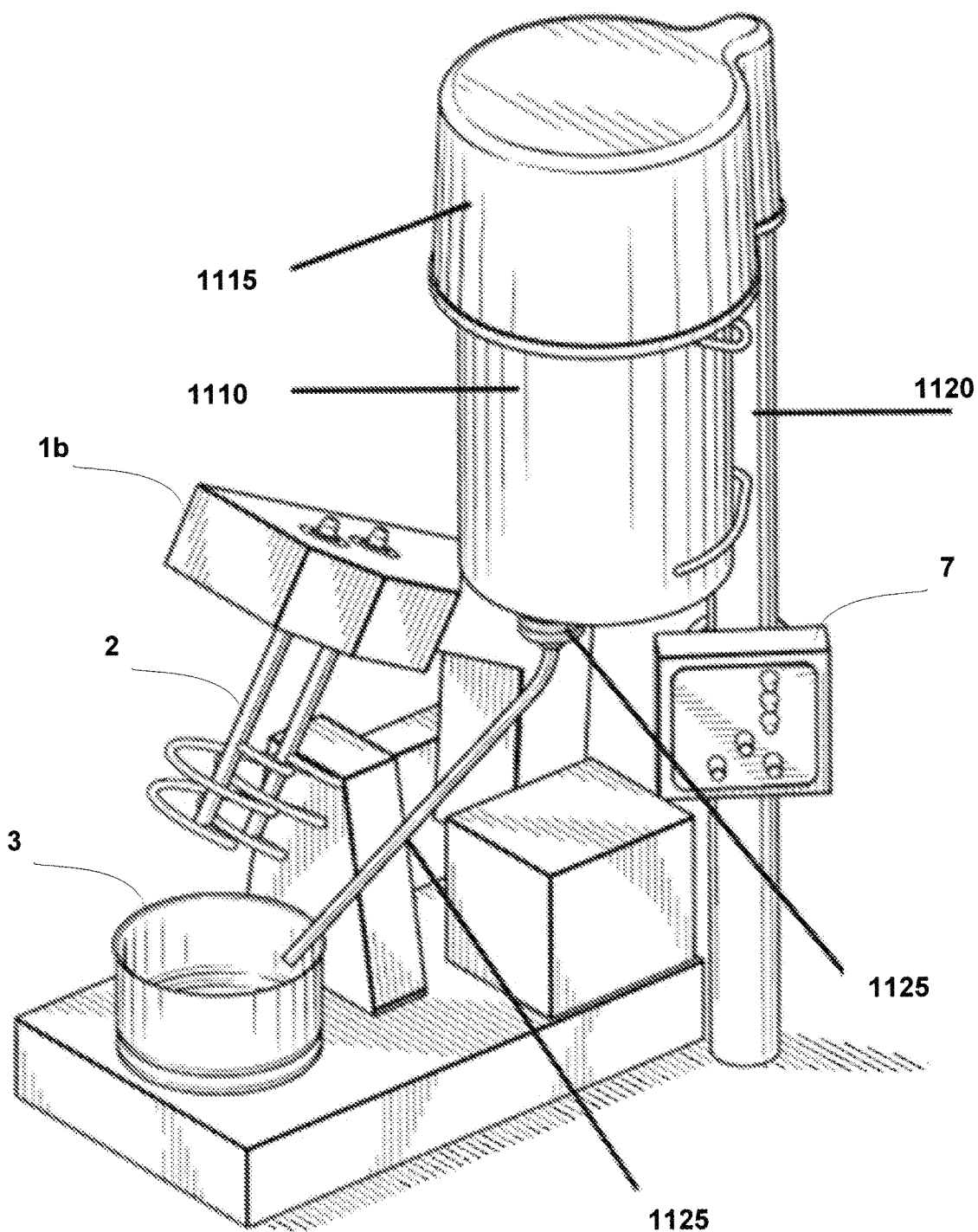
FIG. 11 illustrates the ice cream production system of FIG. 1 further comprising a liquid nitrogen dosing system, according to various embodiments of the invention.

FIG. 11 illustrates the ice cream production system of FIG. 1 further comprising a liquid nitrogen dosing system 1110, according to various embodiments of the invention. The liquid nitrogen dosing system 1110 is optionally controlled via control panel 7 and/or Control Circuit 510, and is configured to provide reproducible doses of liquid nitrogen or another cryogenic liquid to container 3 via an output pipe 1125. The liquid nitrogen dosing system 1110 may be manually filled or may be connected to a pressurized reservoir (not shown) of liquid nitrogen. In order to provide reproducible doses of liquid nitrogen, liquid nitrogen dosing system 1110 is configured to store a volume of liquid nitrogen and to release one or more dose of the liquid nitrogen to container 3 from a bottom of liquid nitrogen dosing system 1110. The dose is reproducible, in part, because by sampling from the bottom the dose includes primarily liquid rather than gas phase nitrogen. Liquid nitrogen dosing system 1110 optionally includes embodiments of Nozzle 570, Valve 560 and Dewar 550. Liquid nitrogen dosing system 1110 optionally includes a cover 1115 and a support structure 1120.

Figure 12:
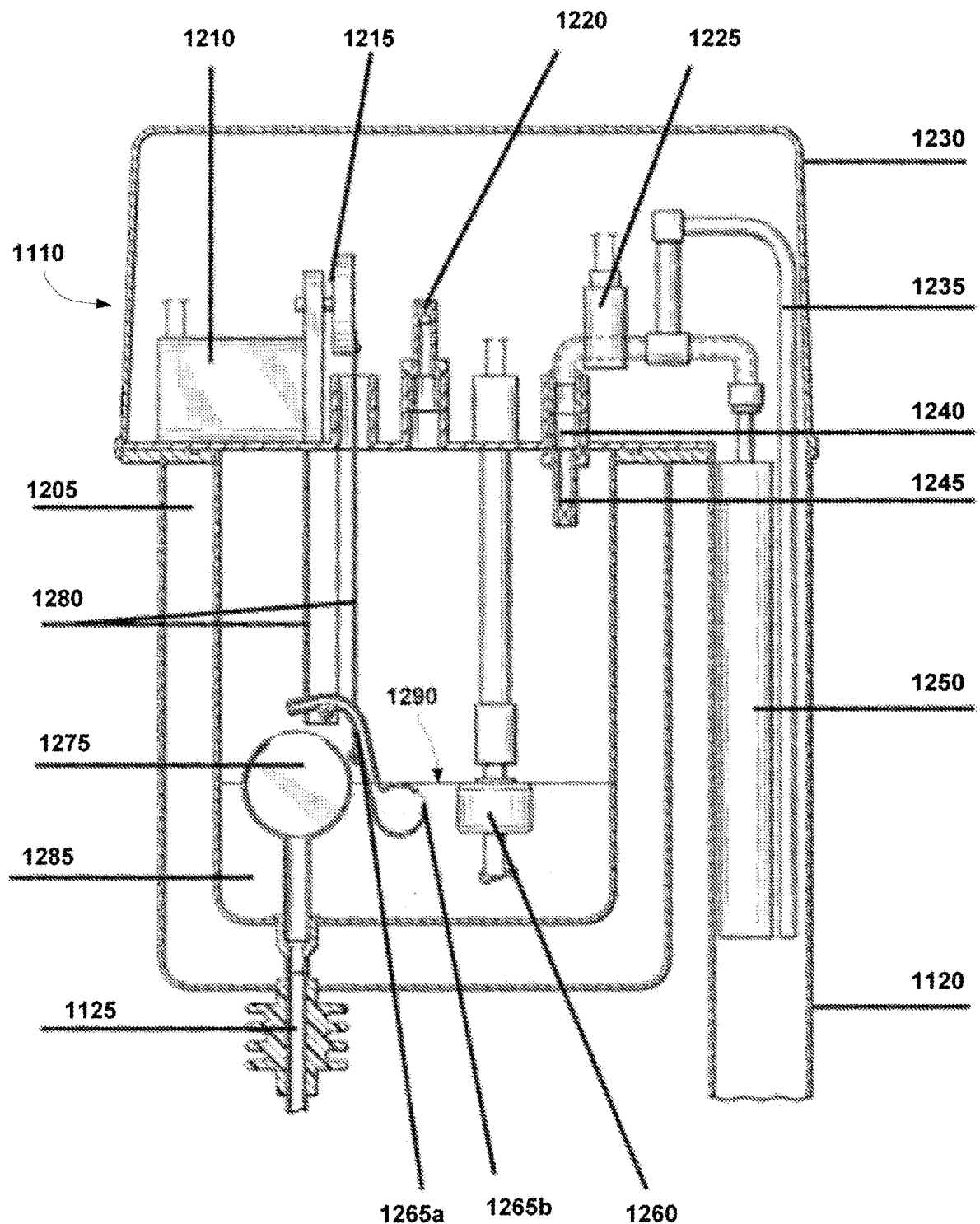
FIG. 12 illustrates a cross-sectional view of a liquid nitrogen dosing system, according to various embodiments of the invention.

FIG. 12 illustrates a cross-sectional view of liquid nitrogen dosing system 1110, according to various embodiments of the invention. The liquid nitrogen dosing system 1110 includes a container with vacuum jacketed walls 1205 and an optional relief vent 1220. An actuator 1210 is connected to a lifting mechanism 1215 (e.g. a cam or lever arm). The actuator 1210 can be manually actuated, or can be connected to a control system (e.g., a button or switch) that is configured to run the lifting mechanism 1215 through one or more cycles of lifting, or can be connected to a more complex control system such as control circuit 510 and/or control panel 7.

Extending from the lifting mechanism 1215 is a wire or other connector 1280 that attaches to a dipper mechanism 1265*a*. One side of the dipper mechanism 1265*a*, referred to as the "head" of the dipper mechanism, extends down into a reservoir 1285 of cryogenic liquid. The head of the dipper mechanism has a scoop 1265*b* of a desired size such that, when the dipper mechanism 1265*a* is raised by the lifting mechanism 1215, a controlled quantity of cryogenic liquid is transported to a delivery port or funnel 1275. The delivery port or funnel 1275 is attached to the interior of the liquid nitrogen dosing system 1110. The top of the delivery port or funnel 1275 is disposed above a bottom of reservoir 1285 such that it is above a normal operational liquid level 1290 of cryogenic liquid. The delivery port or funnel 1275 is funnel or tube connected to output pipe 1125 such that liquid nitrogen introduced into the funnel 1275 flows by action of gravity to container 3.

Typically, the interior of liquid nitrogen dosing system 1110 is at or near atmospheric pressure. As such, the flow is liquid nitrogen into container 3 is gravity fed and any excess pressure within liquid nitrogen dosing system 1110 does not cause significant variation in the volume of liquid nitrogen provided per dose. Note that when not filled with liquid nitrogen, delivery port or funnel 1275 is typically open to both the atmosphere (adjacent to container 3) and the volume within liquid nitrogen dosing system 1110 that contains gas phase (evaporated) nitrogen. As a result, the evaporation of liquid phase nitrogen within liquid nitrogen dosing system 1110 causes a net flow of cold nitrogen gas out through funnel 1275 and output pipe 1125. This results in precooling and/or purging of output pipe 1125, prior to delivery of liquid doses of nitrogen.

Liquid nitrogen dosing system 1110 may be filled with liquid nitrogen (and the liquid level 1290 approximately maintained) either manually or automatically. In those embodiments that include automatic filling, liquid nitrogen dosing system 1110 includes a sensor 1260 configured to detect the level or quantity of liquid nitrogen in liquid nitrogen dosing system 1110. In some embodiments, the sensor 1260 includes a float level sensor that extends down from the top of liquid nitrogen dosing system 1110.

However, in alternative embodiments, sensor 1265 includes a mass sensor or scale or other mechanism configured to measure a changing quantity of cryogenic liquid within the liquid nitrogen dosing system 1110. Sensor 1265 can be mechanical or electronic. In either case, sensor 1265 is configured to control an actuating valve 1225.

In embodiments including an electronic sensor 1265, sensor 1265 is configured to communicate an electronic signal via wiring, such as Control circuit 510, to actuation valve 1225.

The actuating valve 1225 is typically coupled to a cryogenic liquid delivery pipe 1250 external to the vacuum jacketed walls 1205. Delivery pipe 1250 is configured to transfer liquid nitrogen from an external (liquid nitrogen) supply tank (not shown). The delivery pipe 1250 and the external supply tank are optionally pressurized such that when actuating valve 1225 is open liquid nitrogen flows into liquid nitrogen dosing system 1110. Optionally, a diffuser 1245 is used to minimize the splash of the cryogenic liquid as it enters the reservoir 1285. The diffuser 1245 may be attached at an end 1240 of the delivery pipe 1250 that is inserted into the container. The cryogenic liquid collects in the reservoir 1285.

Control circuit 510 is optionally configured to control actuator 1210 and actuating valve 1225. This control can be in response to a predetermined dosing algorithm, to a batch size, to a desired viscosity, to a temperature measurement, to an identity of the ingredients being mixed, and/or the like.

If a sensing mechanism 1260 is used, then the sensing mechanism 1260 senses the increased quantity of cryogenic liquid within reservoir 1285. The sensing mechanism 1260 can produce a signal that indicates the reservoir 1285 is at capacity and/or that the reservoir 1285 requires more cryogenic liquid in order to provide repeatable doses of cryogenic liquid. A computerized control system (e.g., Control Circuit 510) can be used to take the signal from the sensing mechanism 1260, interpret this signal, and then send a signal to close or shut-off the actuating valve 1225 when the reservoir 1285 reaches the maximum desired quantity of cryogenic liquid. Whenever the sensing mechanism 1260 indicates to the control system that the liquid level 1290 within reservoir 1285 of cryogenic liquid has slipped below its minimum level, the control system opens the actuating valve 1225 to fill the reservoir 1285 again, until the desired quantity of cryogenic liquid is reached. In the case of the embodiment shown in FIG. 12, the desired liquid level 1290 is in the range wherein the liquid level 1290 is beneath the opening of the delivery funnel 1275 but above the level of the scoop in the head of the dipper mechanism 1265*b*.

The components of liquid nitrogen dosing system 1110 illustrated in FIG. 12 optionally have a protective covering 1115. Similarly, wiring for the actuating valve 1225 and/or wiring for the actuator 1210 that moves the lifting mechanism 1215, and the cryogenic liquid delivery pipe 1250 (if present) may be encased in another pipe/covering 1120 such that the unit is smooth and cleanable from the outside.

To dispense cryogenic liquid from the container, the actuator 1210 (which is actuated manually, or by a simple control switch/lever/system, or by a more complex/computerized control system) activates the lifting mechanism 1215. The lifting mechanism 1215 pulls the wire/connector 1280, which raises the dipper head 1265*b*. The cryogenic liquid that has collected in the scoop of the dipper head 1265*b* is then dispensed into the delivery funnel 1275. The scoop/dose of cryogenic liquid then exits the container through the output pipe 1125. This invention is scalable—i.e., the container, the dipper mechanism, the scoop in the dipper head 1265*b*, the delivery funnel 1275, etc. can be built to whatever size is preferable for the application.

Figure 13A:
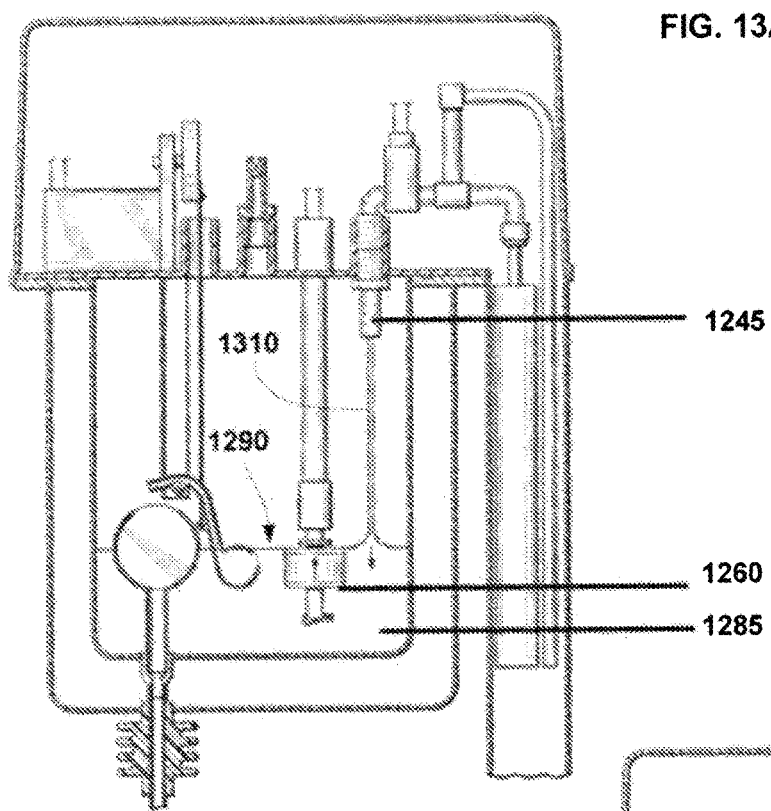
FIGS. 13A and 13B illustrate the embodiments of a liquid nitrogen dosing system illustrated in FIG. 12 at two steps in a dosing process, according to various embodiments of the invention.
Figure 13B:
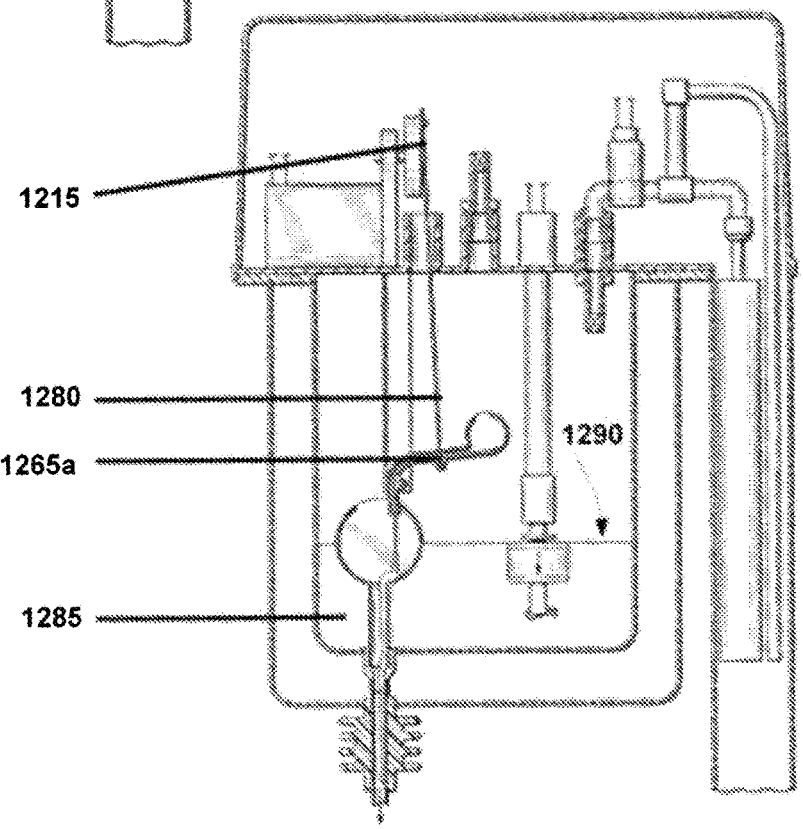

FIGS. 13A and 13B illustrate the embodiments of liquid nitrogen dosing system 1110 illustrated in FIG. 12 at two steps in a dosing process. FIG. 13A shows a stream 1310 of cryogenic liquid (e.g. liquid nitrogen) coming through the diffuser 1245, as controlled by actuating valve 1225. As a result of liquid entering the container, the sensing mechanism 1260, which in this case is a float level sensor, senses that the level of cryogenic liquid in the reservoir 1285 has gone up. FIG. 13B shows the dipper mechanism 1265*b* being lifted up and above the liquid level 1290 by the wire/connector 1280 being pulled by the lifting mechanism 1215. As a result of the dipper mechanism 1265*b* transfers a portion of cryogenic liquid from the reservoir to the funnel 1275. The sensing mechanism 1260 senses a resulting drop in the liquid level 1290. If the drop is sufficient, then further cryogenic liquid is added to liquid nitrogen dosing system 1110 as illustrated in FIG. 13A.

Figure 14:
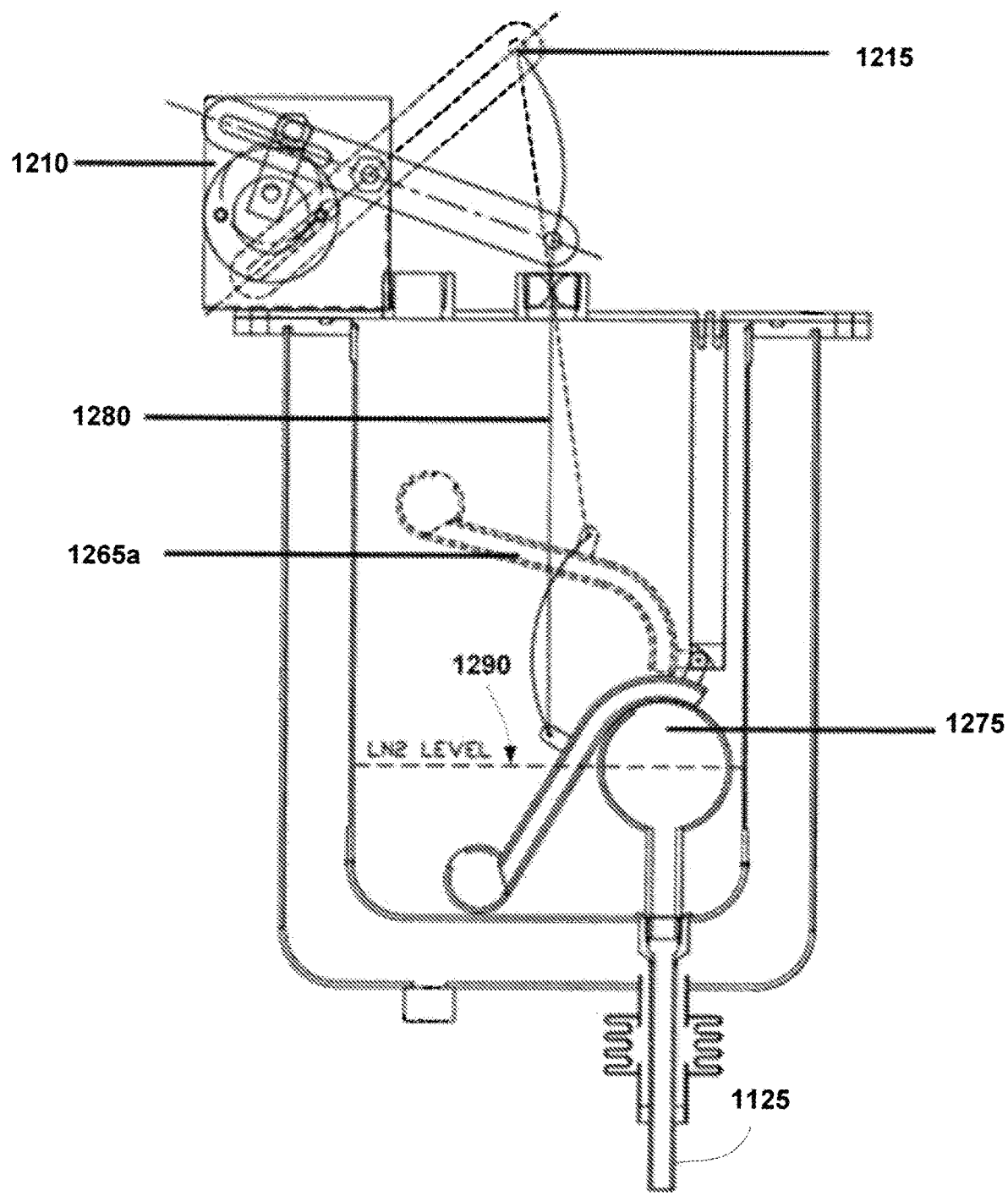
FIG. 14 illustrates an embodiment of a lifting mechanism, according to various embodiments of the invention.

FIG. 14 illustrates an embodiment of the lifting mechanism 1215, which includes a lever arm 1410. The lever arm 1410 is connected to actuator 1210. When actuated, the lever arm 1410 pulls up the wire/connector 1280, which lifts the dipper mechanism 1265*a*. The lifting of the dipper mechanism 1286*a* results in the transport of a dose of cryogenic liquid from the reservoir to the delivery funnel 1275. The interior of dipper mechanism 1265*a* is optionally hollow, such that, when the dipper mechanism 1265*a* pivots, cryogenic liquid can flow from scoop in the dipper head 1265*b* through the dipper "tail" and into the delivery funnel 1275.

FIGS. 15A-H illustrate alternative embodiments of liquid nitrogen dosing system 1110 including different structures for delivering cryogenic liquid from the bottom of liquid nitrogen dosing system 1110. In some of the illustrated embodiments actuating valve 1225 is above the cryogenic liquid to minimize heat transfer and allow for easier cleaning. Note that liquid nitrogen introduction elements such as sensor 1260 and actuating valve 1225 are not shown in these figures for clarity.

Figure 15A:
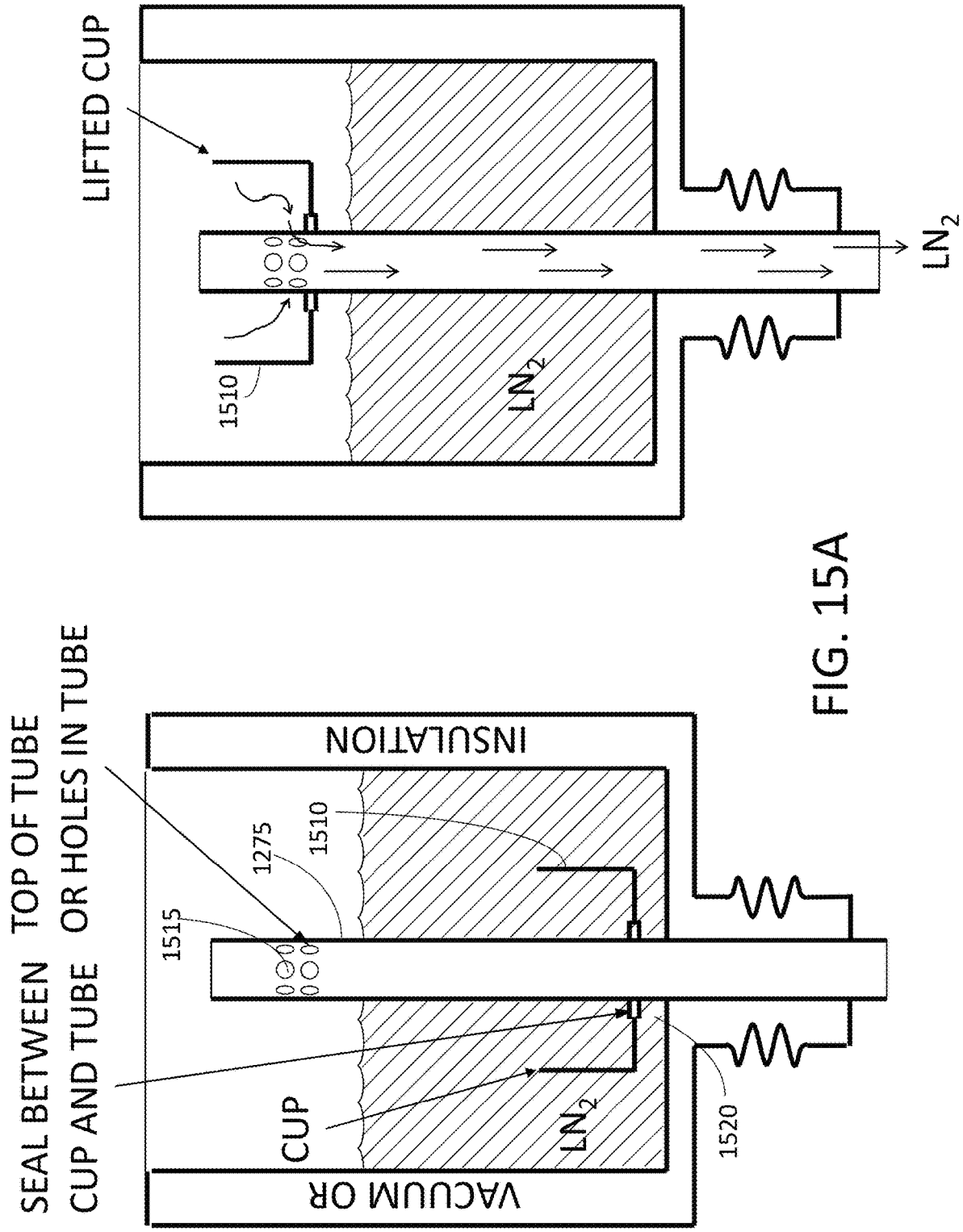
FIGS. 15A-15G illustrate alternative embodiments of a liquid nitrogen dosing system.

In the embodiments illustrated by FIG. 15A a cup 1510 of cryogenic liquid is emptied into funnel 1275 by being raised up and down. The funnel 1275 optionally includes holes 1515 through which the cryogenic liquid can flow. A seal 1520 is optionally used to close an opening between the cup 1510 and funnel 1275.

Figure 15B:
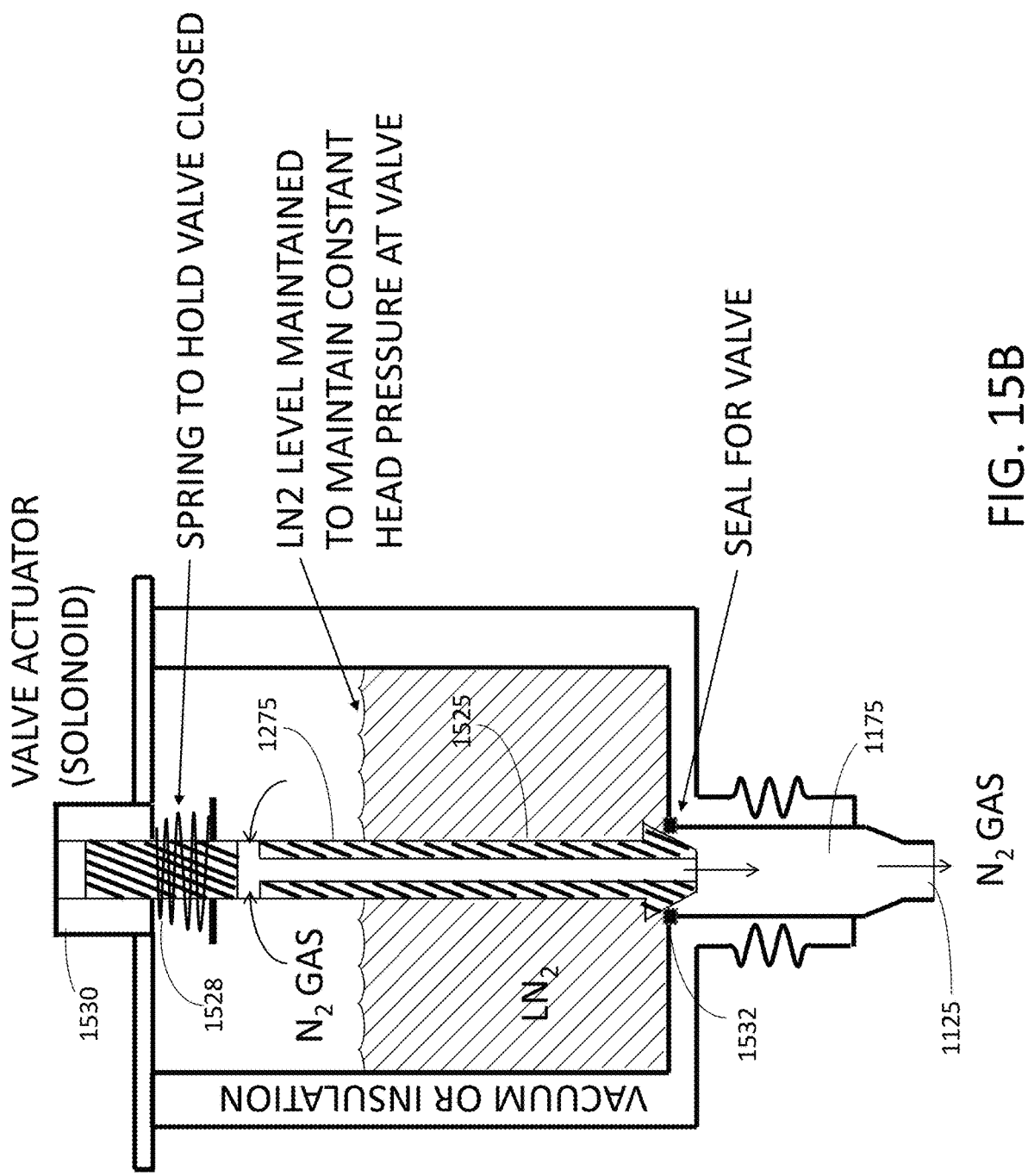

In the embodiments illustrated by FIG. 15B a hollow valve shaft 1525 is used to control flow of cryogenic liquid into funnel 1275. The hollow valve shaft 1525 is configured to allow gas evaporated from the cryogenic liquid to enter the funnel 1275 when the valve is closed. This keeps the interior of the system at near atmospheric pressure and can also serve to purge and/or precool output pipe 1125. A spring 1528 is configured to hold the hollow valve shaft 1525 down (closed to liquid but open to gas) in a default position. The hollow valve shaft 1525 rests in a seal 1532 at the bottom of liquid nitrogen dosing system 1110. The hollow valve shaft 1525 is optionally open at both ends such that gas can vent in both directions. The valve is opened to liquid flow by activation of a solenoid 1530 connected to the hollow valve shaft 1525.

Figure 15C:
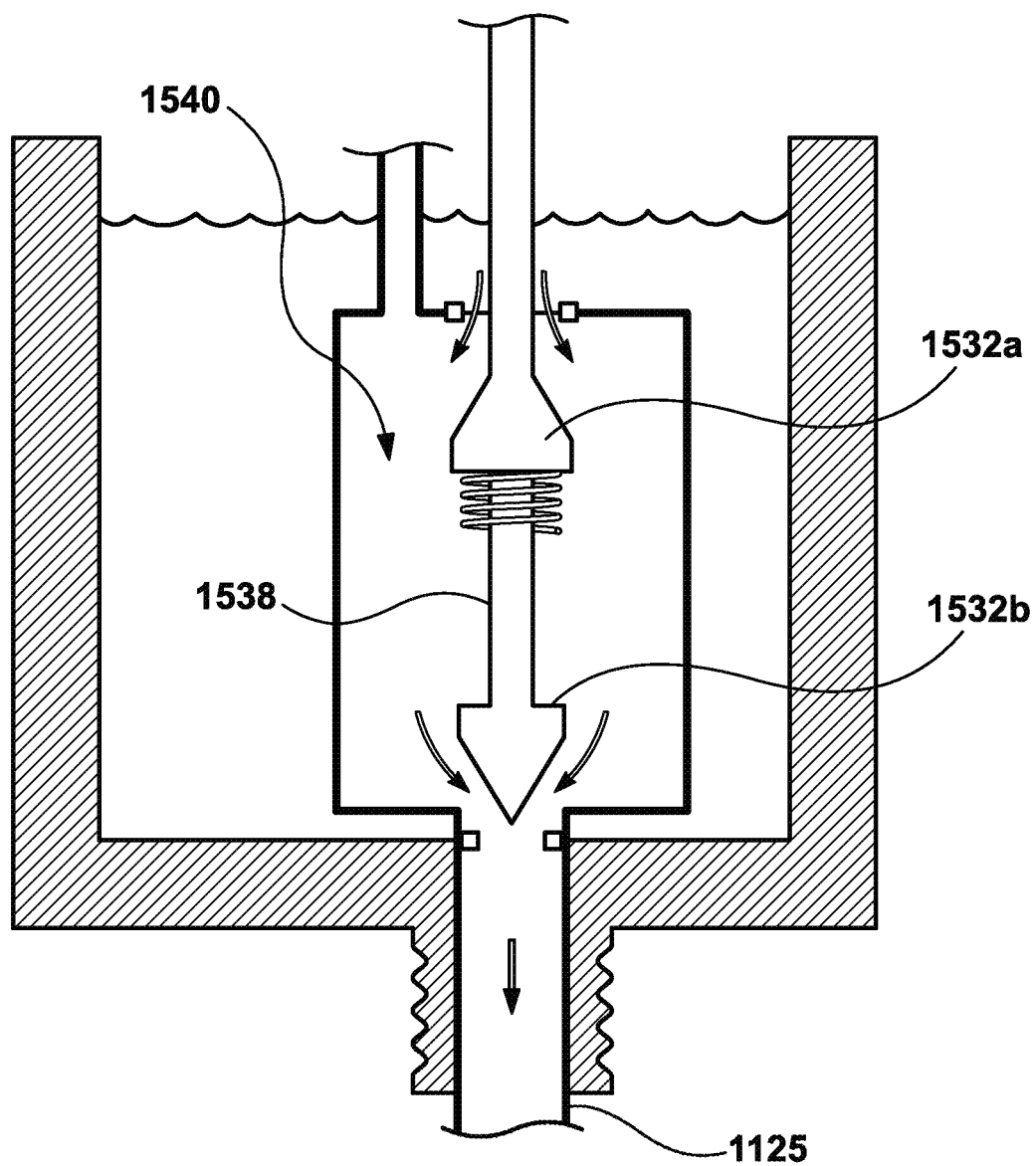

FIG. 15C illustrates an embodiment including two valves 1535*a* and 1535*b* on a single shaft 1538. When shaft 1538 is lowered valve 1535*a* is opened and valve 1535*b* is closed. This allows a controlled volume of cryogenic liquid to flow into a container 1540. The container 1540 is vented to the atmosphere and thus near atmospheric pressure. When the shaft 1538 is raised valve 1538*a* is closed and valve 1535*b* is opened. This allows the controlled volume to flow into funnel 1275 under the force of gravity.

Figure 15D:
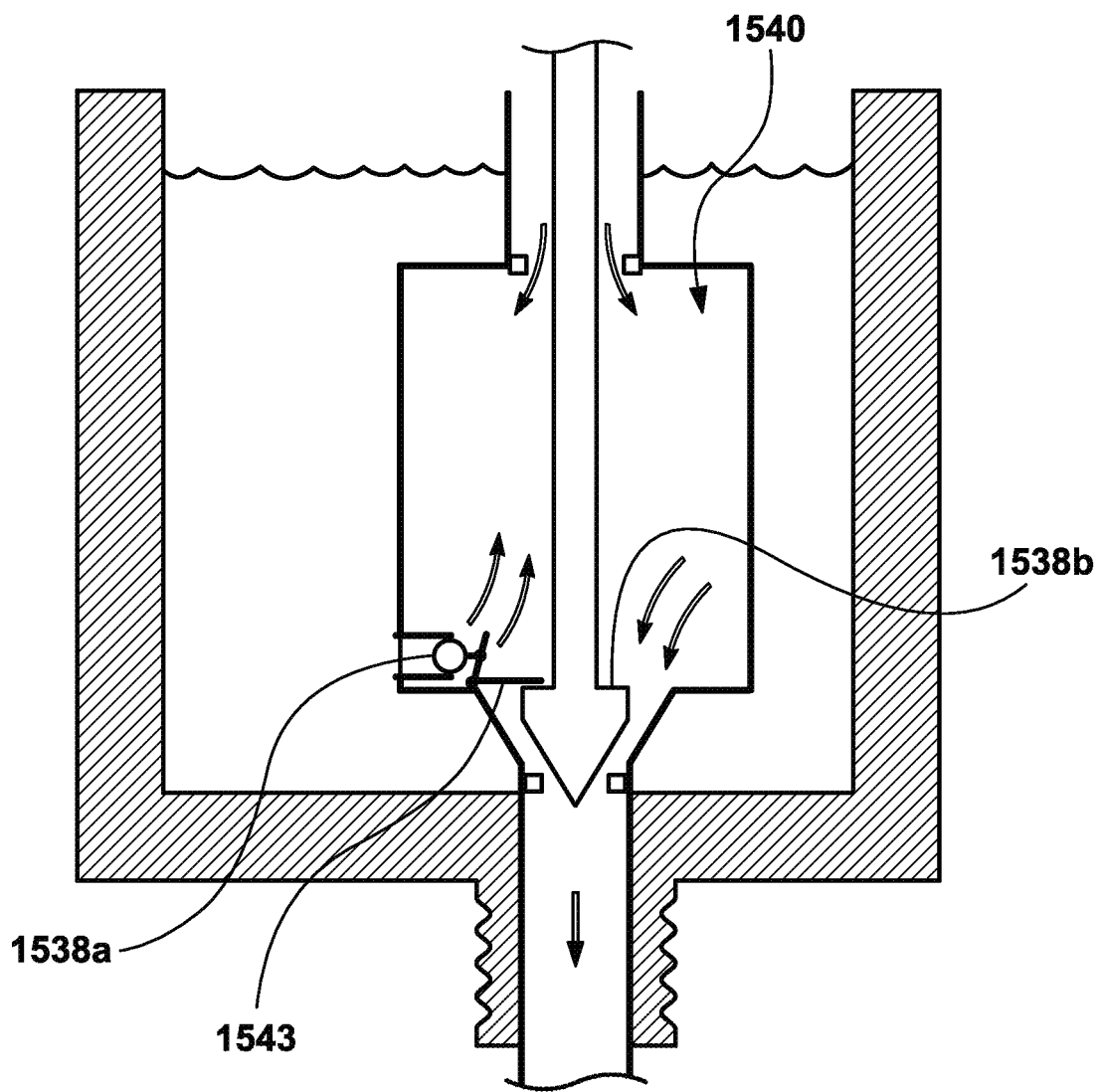

FIG. 15D illustrates an embodiment including two different valves 1538*a* and 1538*b*. When valve 1538*b* is closed, valve 1538*a* is opened allowing cryogenic liquid to fill container 1540. The opening and closing of valve 1538*b* is controlled by a trigger 1543 coupled to the shaft of valve 1538*a*. Valve 1538*b* is opened by raising shaft 1525, for example using lifting mechanism 1215. Opening valve 1538*b* allows the cryogenic liquid to flow of container 1540 to funnel 1275, and also closes valve 1538*a*.

Figure 15E:
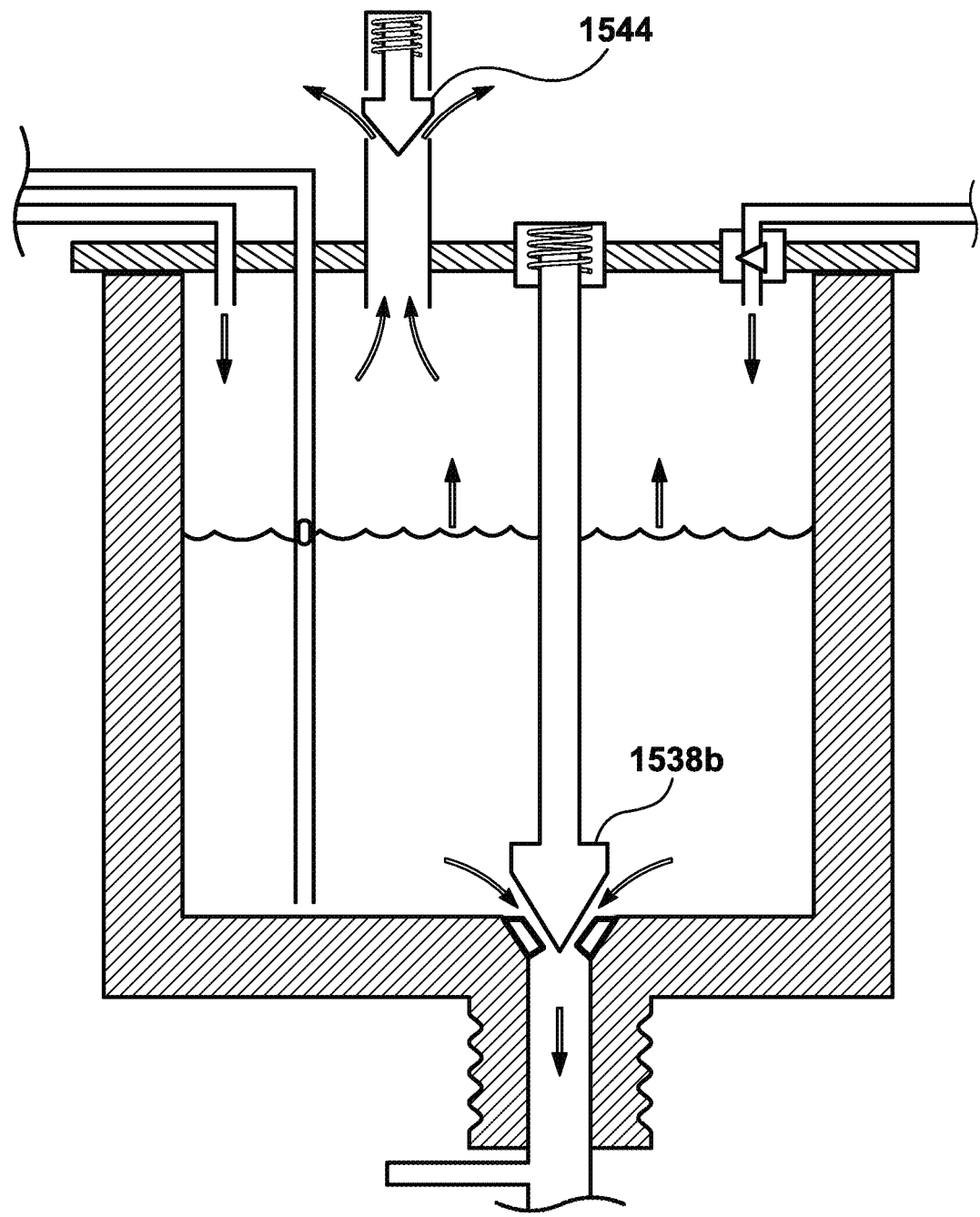

FIG. 15E illustrates embodiments in which the interior of liquid nitrogen dosing system 1110 is maintained at above atmospheric pressure, and this pressure facilitates flow of cryogenic cooling liquid through output pipe 1125 to container 3. These embodiments include a pressure relief valve 1544 configured to maintain a steady pressure within the interior of liquid nitrogen dosing system 1110. Because this pressure is maintained, the flow of cryogenic cooling liquid to funnel 1275 when valve 1538*b* is opened is reproducible. In various embodiments pressure relief valve 1544 is configured to maintain pressures of less than or equal to 5, 10 or 15 psi above atmospheric pressure. In some embodiments pressure relief valve 1544 is adjustable. Gas released from pressure relief valve 1544 is optionally routed to outlet pipe 1125 for cooling and/or purging.

Figure 15F:
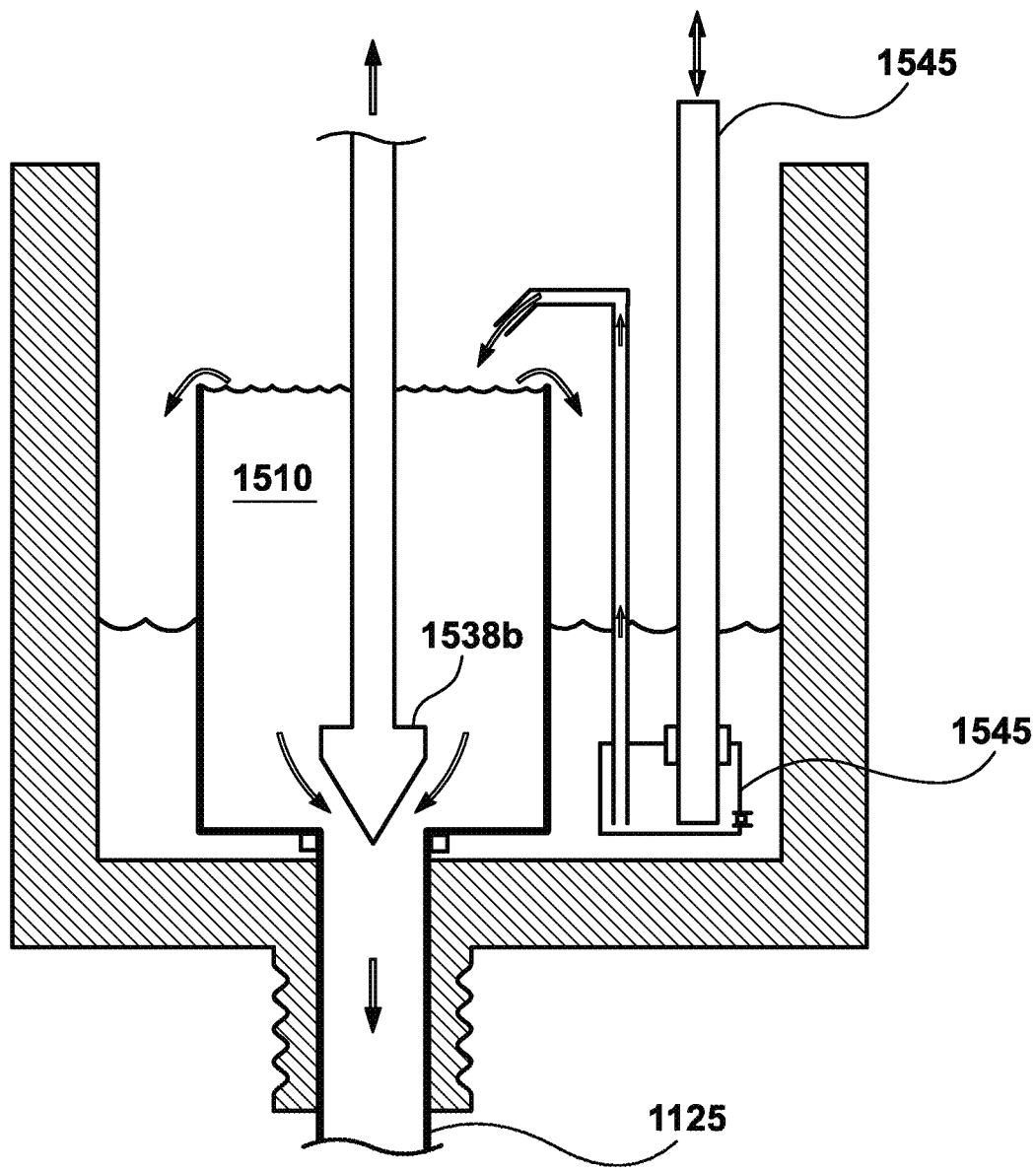

FIG. 15F illustrates embodiments which cup 1510 is filled to overflowing. As a result when valve 1538*b* is opened a volume of cryogenic liquid equal to the volume of cup 1510 is transferred to output pipe 1125. All or part of this volume can be provided in a sequence of doses by opening and closing valve 1538*b*. Because the cup is at approximately atmospheric pressure and the flow is gravity fed, the volume of each dose is proportional to a length of time valve 1538*b* is open. Cup 1510 is filled using a pump 1545 such as the piston pump illustrated in FIG. 15F. The delivery of additional cryogenic liquid into cup 1510 is avoided when the cup 1510 is being emptied.

Figure 15G:
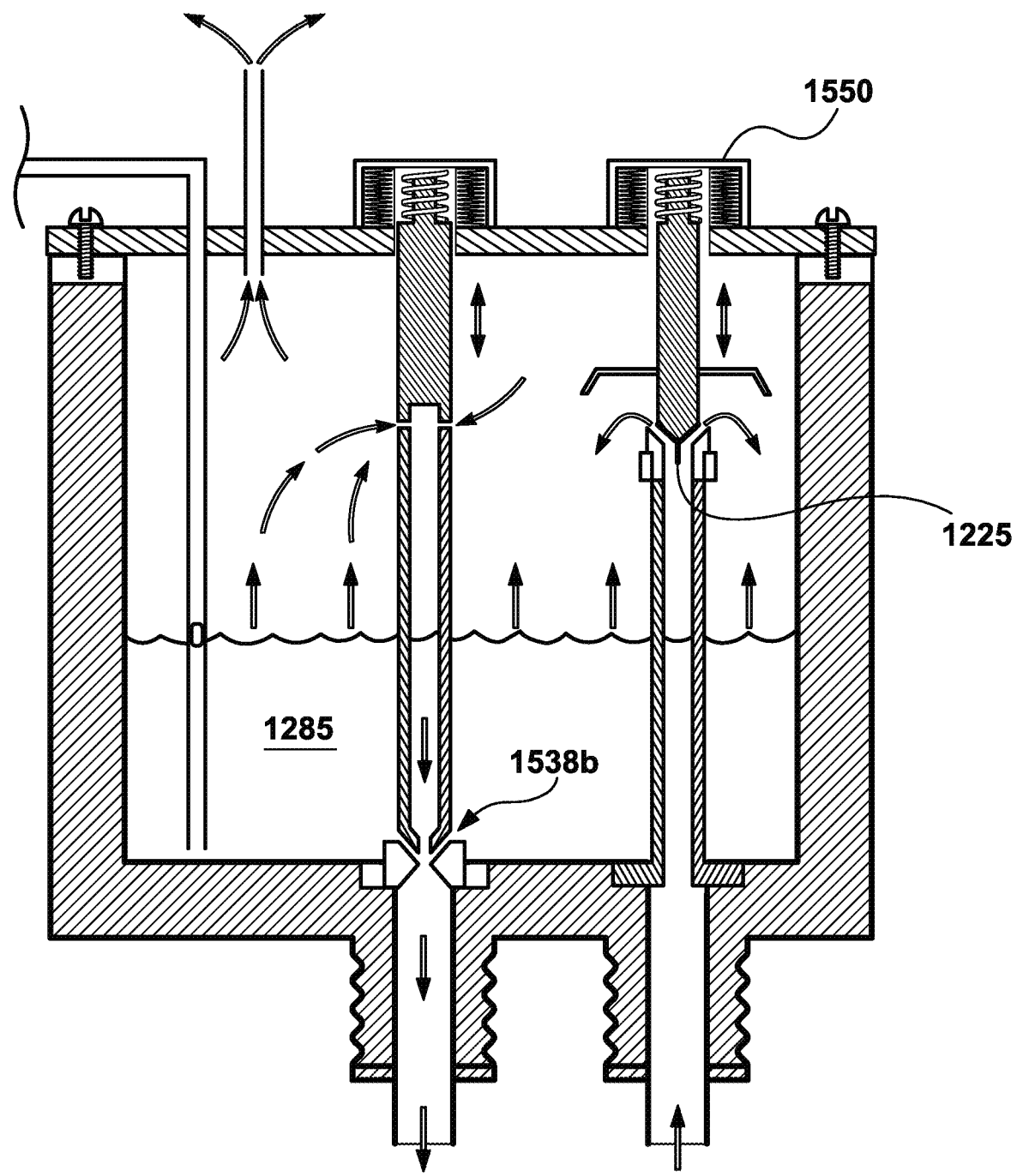

FIG. 15G illustrates embodiments including an actuating valve 1225 disposed within the interior of liquid nitrogen dosing system 1110, e.g. within reservoir 1285. Having actuating valve 1225 inside and exposed to the vapor of the liquid nitrogen reduces warming and boiling of the cryogenic liquid as the liquid passes though the valve. Actuating valve 1225 is opened and closed using a solenoid 1550. In the embodiments illustrated valve 1538*a*, configured to release cryogenic liquid to outlet pipe 1125, includes the structures illustrated in FIG. 15B. However, other embodiments of valve 1538*a* discussed herein may be used in combination with the actuating valve 1225 illustrated in FIG. 15G. Solenoid 1550, and the other solenoids illustrated herein, optionally includes a bellows to separate electronic components of solenoid 1550 from the cryogenic liquid and vapor thereof.

Figure 16:
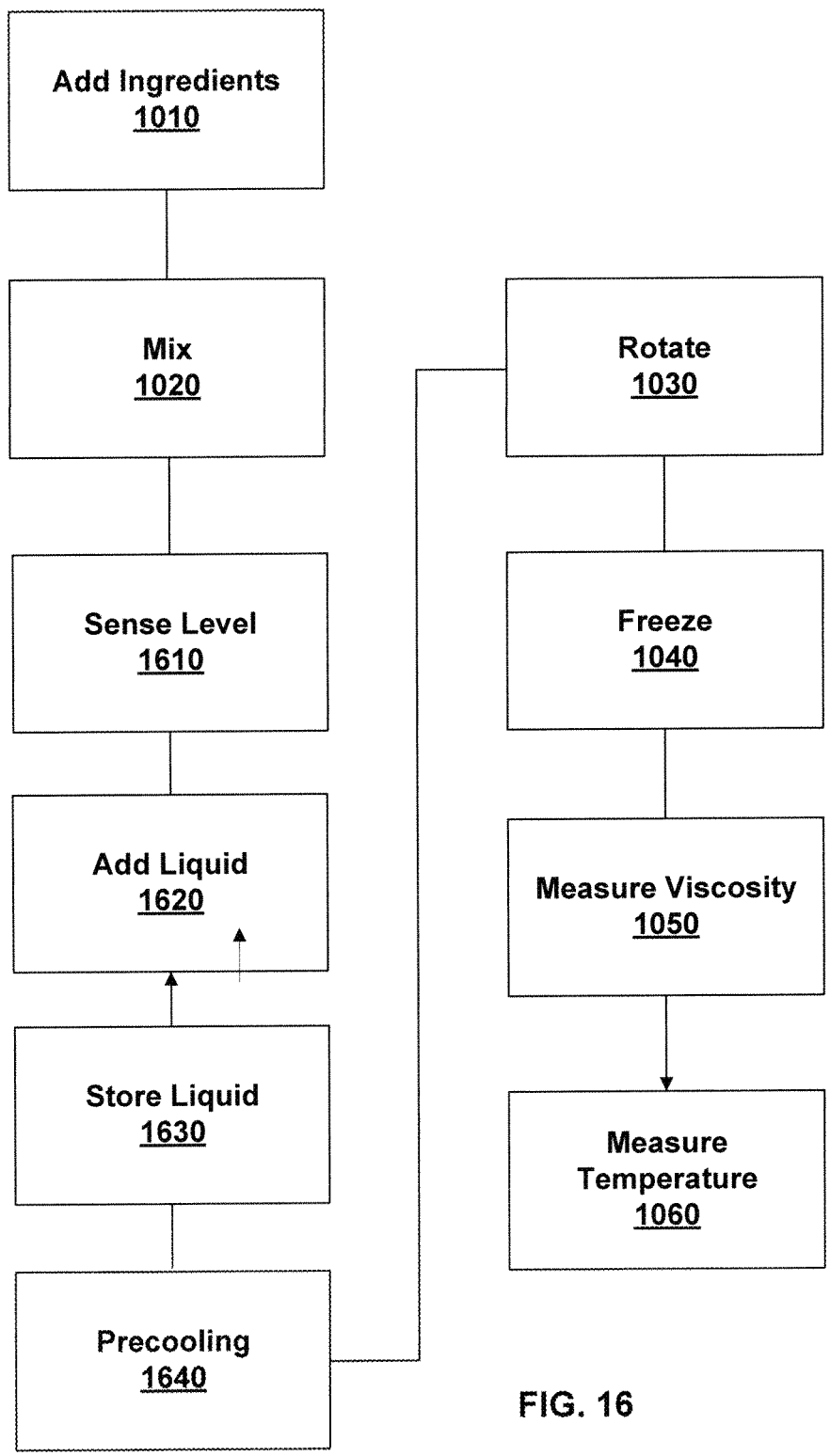
FIG. 16 illustrates methods of making ice cream, according to various embodiments of the invention.

FIG. 16 illustrates methods of making ice cream, according to various embodiments of the invention. These methods are optionally performed using the embodiments illustrated by FIG. 11, and are optionally performed at part of the methods illustrated in FIG. 10. Add ingredients step 1010, in which placing ingredients in container 3, is discussed elsewhere herein. Mix step 1020 is also discussed elsewhere herein. In Mix step 1020 the ingredients are mixed using one or more beaters 2 disposed within the container 3.

In a sense level step 1610, a level of liquid nitrogen or another cryogenic liquid within a liquid nitrogen dosing system 1110 is sensed using level sensor 1260.

In an add liquid step 1620, liquid nitrogen or other cryogenic liquid is added to the liquid nitrogen dosing system 1110 from a pressurized liquid supply. The addition is optionally controlled by actuating valve 1225 and responsive to the level sensor 1260.

In a store liquid step 1630 the liquid nitrogen or other cryogenic liquid is stored in the reservoir 1285 of liquid nitrogen dosing system 1110. This storage may be at approximately atmospheric pressure or at a controlled pressure. The pressure is optionally controlled by a relief valve 1544.

In an optional precooling step 1640, output pipe 1125 is precooled. This is optionally accomplished using a gas of the liquid nitrogen or other cryogenic liquid stored in the liquid nitrogen dosing system 1110. Precooling step 1640 may be a continuous process in which the gas flows through output pipe 1125 to both cool and purge.

Rotate Step 1030, is discussed elsewhere herein, and includes rotating container 3 and/or one or more of beaters 2.

Dispense step 1650 includes dispensing the added liquid nitrogen from the liquid nitrogen dosing system 1110 into the container 3 in a controlled amount. Dispense step 1650 can occur during Mix Step 1020, Rotate Step 1030, freeze step 1040, measure viscosity step 1050, and/or measure temperature step 1060, for example. Dispense step 1650 typically results in cooling and/or freezing of the ingredients. Dispense step 1650 optionally occurs in one or more doses as controlled by control circuit 510. The liquid dispensed in dispense step 1650 has been separated from the vapor of this liquid. This greatly improves the mass and volumetric precision of each dose. As discussed elsewhere herein, the amount of cryogenic liquid dispensed in dispense step 1650 is optionally responsive to viscosity measurement, recipe, temperature, etc.

Measure Viscosity Step 1050 and Measure Temperature Step 1060 are discussed elsewhere herein.

Certain Examples of Liquid Dosing Systems

Figure 17A:
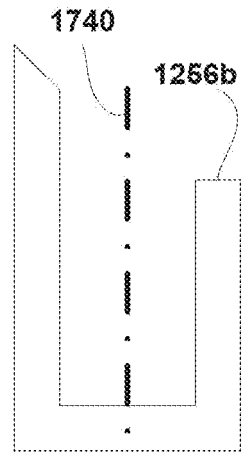
FIGS. 17A-17I illustrate various scoops that may be included in a doser, according to various embodiments of the invention.
Figure 17B:
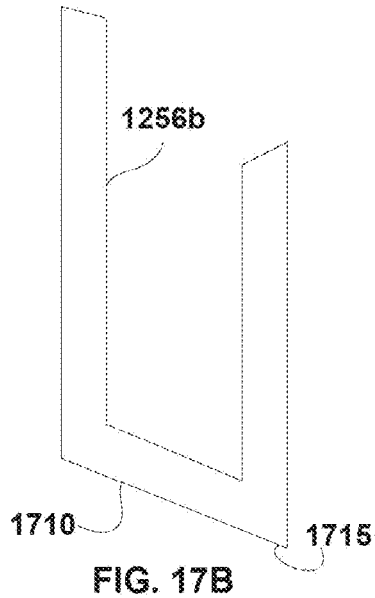
Figure 17C:
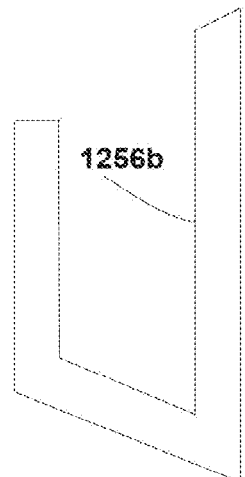
Figure 17D:
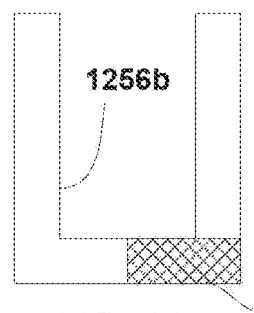
Figure 17E:
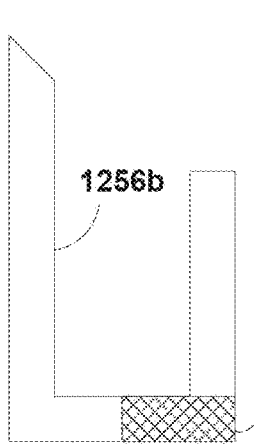
Figure 17F:
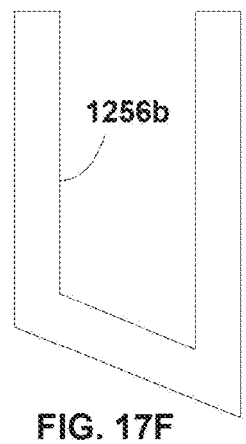
Figure 17H:
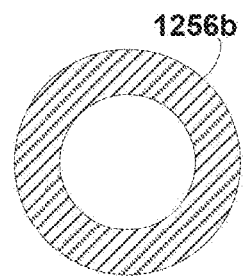
Figure 17I:
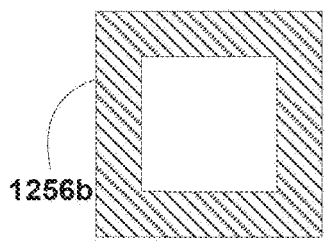
Figure 17G:
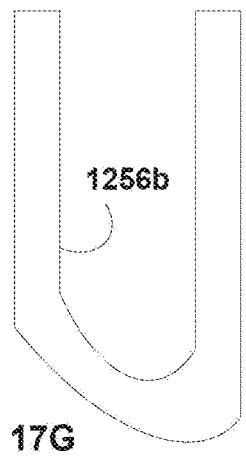
Figure 21:
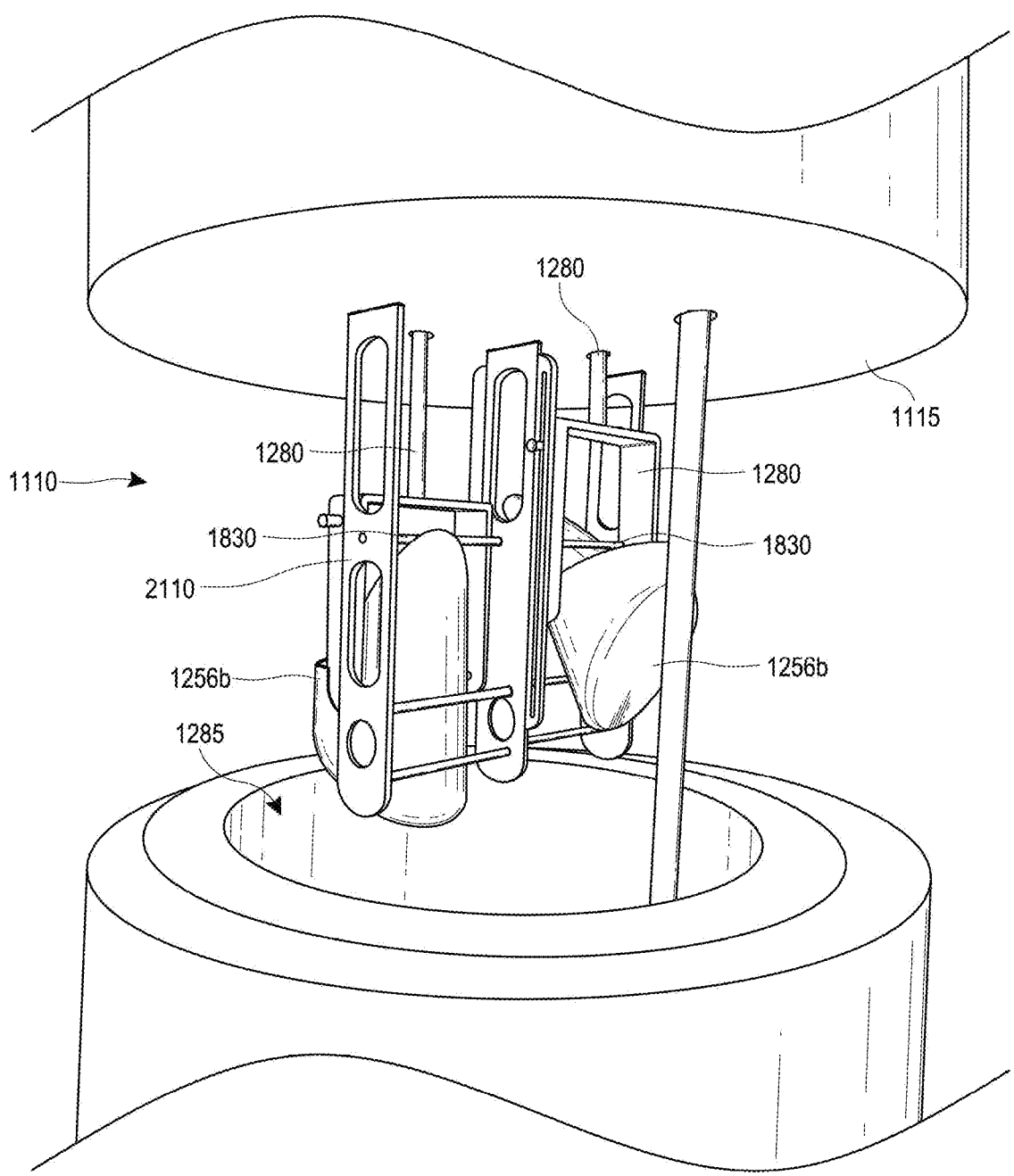
FIG. 21 illustrates the kettle of FIGS. 20A-20B in the open state, showing the dipping cups and dipping mechanisms, and level sensor.

FIGS. 17A-17I illustrate various embodiments of scoop 1256*b* that may be included in a doser 1110, according to various embodiments of the invention. FIGS. 17A-17G illustrate cross-sectional side views and FIGS. 17H and 17I illustrate top views. In various embodiments, scoop 1256*b* can have capacity to hold, for example, 25 ml to 2,500 ml of cryogenic liquid. In preferred embodiments, scoop 1256*b* can have capacity to hold 120 ml to 130 ml, for example 121 ml, of cryogenic liquid. In some embodiments, scoop 1256*b* is asymmetric. The asymmetric shape of a scoop can affect the way the scoop mechanically interacts with the liquid nitrogen due to differences in buoyancy of the portions of the scoop caused by the asymmetric structure. The asymmetric shape of a scoop can also affect the way the scoop mechanically interacts with structure that tilts the scoop to dispense liquid nitrogen carried in the scoop, as illustrated in FIG. 21. For example, when the scoop 1256*b* is lowered into the cryogenic liquid, one side of the scoop 1256*b* has a different buoyancy than the other side of the scoop 1256*b*. In some embodiments, the asymmetry of the scoop 1256*b* can refer to a height differential between portions of a lower surface of the scoop 1256*b*. In some embodiments, the difference in buoyancy causes scoop 1256*b* to rotate when it comes in contact with the cryogenic liquid. For example, scoop 1256*b* may be rotated from a vertical orientation to a horizontal orientation when lowered into cryogenic liquid. An scoop 1256*b* configured to have an asymmetric structure may can have a difference in shape between one part of scoop 1256*b* and another part of scoop 1256*b*. For example, FIG. 17B illustrates an embodiment of scoop 1256*b* in which the bottom 1710 is sloped. When lowered into cryogenic liquid, an edge 1715 of scoop 1256*b* contacts the cryogenic liquid, this tends to lift the right side of scoop 1256*b* and rotate scoop 1256*b* in a counter-clockwise direction, as viewed from FIG. 17B. FIG. 17D illustrates an example in which asymmetry in buoyancy is achieved by using a material 1720 (illustrated with cross-hatching) having a lesser or greater density than other parts of Scoop 1256b.

As illustrated, scoop 1256b can include a wide variety of shapes and structures. One of ordinary skill in the art will understand that there are many additional shapes and structures that could be used to achieve asymmetric buoyancy. For example, in addition to the circular and square shapes illustrated in FIGS. 17H and 17I, scoop 1256b could be oval, triangular, rectangular, hexagonal, etc. Scoop 1256b may be characterized by a center (long) axis 1740 illustrated by a dashed line in FIG. 17A.

Figure 18:
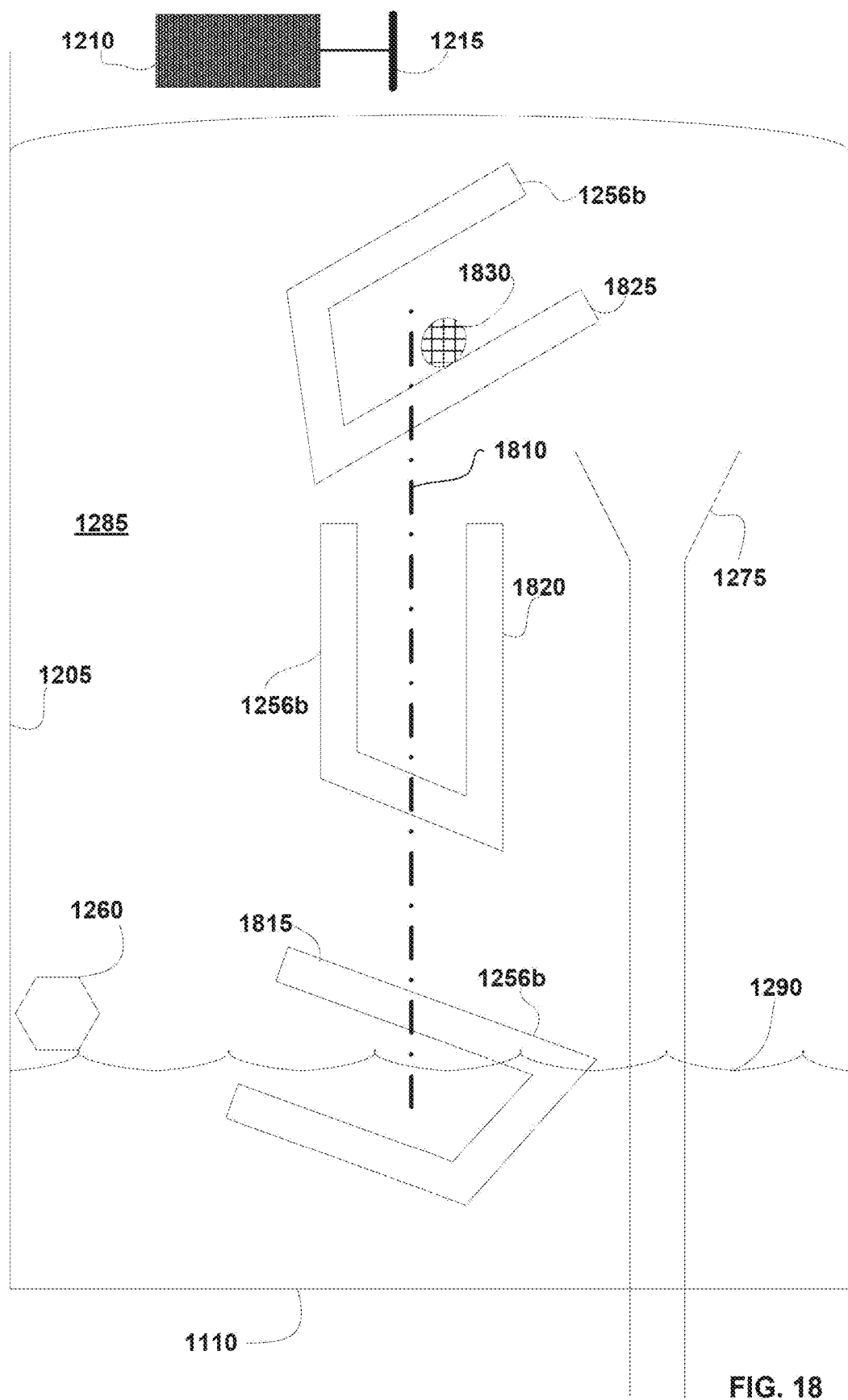
FIG. 18 illustrates a doser, according to various embodiments of the invention.
Figure 23:
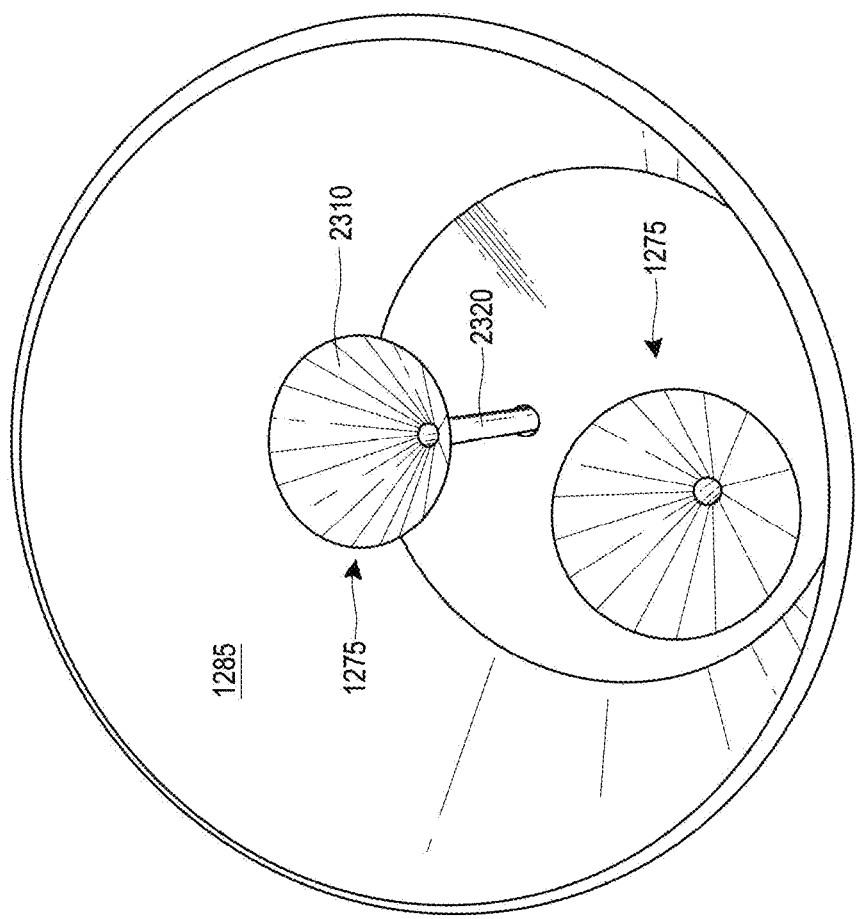
FIG. 23 illustrates another view of the kettle of FIGS. 20A-20B in the open state, showing the dipping mechanisms, funnels, and inlet orifice.

FIG. 18 illustrates a doser 1110, according to various embodiments of the invention. This doser 1110 includes one or more scoops 1256b, which is optionally a scoop 1256b having asymmetric buoyancy such as those illustrated in FIGS. 17A-17I. The illustrated embodiments of doser 1110 further include funnel 1275. As discussed elsewhere herein, funnel 1275 is an output configured to receive cryogenic liquid from the scoop 1256b and to transfer the received cryogenic liquid from the reservoir 1285 formed by walls 1205. In some embodiments, the funnel 1275 is open to the atmosphere, and the reservoir 1285 of doser 1110 is at essentially atmospheric pressure. The cryogenic liquid can be conveyed to container 3 (for example, as illustrated in FIGS. 1, 20 and 23) and may using gravity in some embodiments, or via a pump or other system in other embodiments.

Doser 1110 further includes an embodiment of level sensor 1260 configured for detecting liquid level 1290, e.g., the level of cryogenic liquid within the reservoir 1285. An actuator 1210 (e.g., motor) and lifting mechanism 1215 are configured to raise and lower scoop 1256b. Lifting mechanism 1215 may be mechanically connected to scoop 1256b via a rod, chain, belt, and/or wire, etc. In some embodiments, the lifting mechanism 1215 and the scoop 1256b are configured to pivot relative to one another. Other elements, such as those illustrated elsewhere herein, are optionally included in the embodiments of doser 1110 illustrated in FIG. 18. For example, level sensor 1260 may be configured to control actuating valve 1225 (illustrated in FIG. 12) so as to maintain liquid level 1290.

In FIG. 18 scoop 1256b is illustrated in three different positions within reservoir 1285. These are referred to as a lower position 1815, an intermediate position 1820 and an upper position 1825. In the lower position 1815, the asymmetric design of the scoop 1256b may cause the scoop to tilt from a vertical orientation to a substantially horizontal orientation as the scoop is lowered into the cryogenic liquid. The scoop 1256b may be configured to scoop up a portion of the cryogenic liquid. In the upper position, scoop 1256b is configured to dispense the cryogenic liquid into funnel 1275. Scoop 1256b may move along a transit path 1810, (illustrated by a dashed line). Transit path 1810 may be linear and/or curved. In some embodiments, the angle of a line tangent to path 1810 at any point is within 1 degree of vertical. In various embodiments, the angle of a line tangent to path 1810 at any point is within 30, 60 or 90 degrees from vertical. In various embodiments, path 1810 forms a closed loop allowing for orbital movement of scoop 1256b. In some embodiments, one or more scoops 1256b may be moved by a mechanical rotational system that moves the scoop 1256b in an orbital motion within the doser 1110. For example, the mechanical rotational system may move the scoop into the lower position 1815 where the scoop 1256b receives liquid. The scoop 1256b may then be moved to a position to transfer the liquid from the scoop 1256b into the funnel 1275.

In some embodiments, scoop 1256b may be configured to be in a vertical orientation while at the intermediate position. In some embodiments, the scoop is configured to rotate to a horizontal orientation in the upper position 1825. These rotations are measured relative to the center axis 1740 (described in FIG. 17A) of scoop 1256b and are around an axis that moves approximately along, parallel to, or offset from transit path 1810 and is roughly orthogonal to the center axis 1740 and the plane of FIG. 18. Scoop 1256b is optionally further configured to rotate into an approximately horizontal orientation in the lower position 1815. The rotations at the upper position 1825 and lower position 1815 may be in the same or different directions (e.g., counter-clockwise in the lower position 1815 and clockwise in the upper position 1825). At the lower position, one or more sections of the lip of scoop 1256b may be situated below liquid level 1290 so as to allow cryogenic liquid to flow into the scoop 1256b.

The rotations shown in FIG. 18 may be caused by one or more cams 1830, by a difference in buoyancy between different parts of scoop 1256b, and/or by other forces from the liquid. For example, as scoop 1256b is lowered from intermediate position 1820 to lower position 1815 either a cam (similar to cam 1830) or asymmetric buoyancy may cause the scoop 1256b to rotate from a vertical orientation to a substantially horizontal orientation. As the scoop 1256b is raised from the lower position 1815 to the intermediate position, the scoop 1256b is caused to rotate from a substantially horizontal orientation to a vertical orientation. In some embodiments, cam 1830 may cause the scoop 1256b to rotate from a substantially horizontal orientation to a vertical orientation as the scoop 1256b is raised from the lower position 1815 to the intermediate position. In some embodiments, this rotation is caused by the weight of the liquid and/or a predisposition of the scoop to be in a vertical orientation. In some embodiments, the rotation of the scoop 1256b between intermediate position 1820 and upper position 1825 may be caused by cam 1830. Cam 1830 may be a mechanical device configured to contact scoop 1256b and apply a rotational force thereto. One of ordinary skill in the art will understand that a cam can be structured in a variety of shapes and sizes to perform this function. For instance, in some embodiments, scoop 1256b is raised to the upper position 1825 at which point a movable cam 1830 causes the scoop 1256b to rotate to a substantially horizontal orientation. In some embodiments, the cam 1830 is stationary and is configured to contact the scoop 1256b as the scoop 1256b is raised to the upper position 1825. The higher the scoop 1256b is raised, the more horizontal the scoop 1256b becomes. Cam 1830 may include a rod, tab, gear, etc. A cam may be a rotating or sliding piece in a mechanical linkage used especially in transforming rotary motion into linear motion or vice versa. As used herein, a cam may also refer to a fixed member used to transform linear motion into rotary motion.

Scoop 1256b may not require asymmetric buoyancy in embodiments in which a cam, tab, guide, or other mechanical device is used to rotate scoop 1256b as it is lowered past or raised from the cryogenic liquid level 1290. In these embodiments, the rotation from a vertical orientation to a horizontal orientation is achieved by contact between the mechanical device and scoop 1256b or a part attached to scoop 1256b. For example, as scoop 1256b moves from the upper position to the lower position, contact with a mechanical device may rotate scoop 1256b partially around an axis.

As used herein the terms vertical orientation and horizontal orientation are meant to be relative. The "vertical orientation" being closer to vertical relative to the "horizontal orientation." In FIG. 18 the scoop 1256b is illustrated in a vertical orientation at intermediate position 1820 and in horizontal orientations in positions 1815 and 1825. Note that these orientations need not be absolutely horizontal or vertical. The designations of vertical and horizontal orientations are relative and approximate. In various embodiments, the horizontal orientations in positions 1815 and 1825 can be at least 30, 45, 60, or 90 degrees from vertical, or between 30 to 135 degrees. In a preferred embodiment, the horizontal orientations in positions 1815 and 1825 can be 90 to 95 degrees. In some embodiment, the scoop 1256b is rotated no more than 90 degrees in the lower position 1815 and no less than 90 degrees in the upper position 1825. The horizontal orientation at position 1815 is sufficient to bring a lip of scoop 1256b below the preferred level 1290 of cryogenic liquid such that cryogenic liquid is received by scoop 1256b in the lower position. In some embodiments, the scoop 1256b may be configured to remain in a vertical orientation in the lower orientation 1815 and only rotate to a substantially horizontal orientation in the upper orientation 1825.

Actuator 1210, e.g., a motor or pneumatic, is configured to move the scoop 1256b between the upper and lower positions. Actuator 1210 is optionally configured to operate lifting mechanism 1215 to move a chain, cable, rod, and/or the like connecting lifting mechanism 1215 and scoop 1256b. In various embodiments, actuator 1210 can be configured to move scoop 1256b between the upper position 1825 and the lower position 1815 at rates of at least 1, 5, 10 or 15 times per minute or any rate there between, or between 1-20 times per minute. In a preferred embodiment, the scoop 1256b can be moved between the upper position 1825 and the lower position 1815 between 6-10 times per minute. In various embodiments, scoop 1256b may only need to move between the upper position 1825 and lower position 1815 once every 5, 10, 30, 60, 100, or 300 seconds. As discussed elsewhere herein, actuator 1210 is optionally controlled by control circuit 510 and/or control panel 7 in response to viscosity measurements and/or a recipe. In some embodiments, actuator 1210 may be implemented and controlled in such a way as to deliver doses of cryogenic liquid in controlled volumes. In some embodiments, this may occur by means of controlling the angular position of scoop 1256b. The volume of each dose may range from a maximum of the inner volume of scoop 1256b, to a minimum dictated by the smallest controllable increment of the actuating mechanism. For example this volume may be $1/100^{th}$ of the volume of scoop 1256b. Each dose may be individually sized to meet the needs of the application. Several examples include embodiments where the timing and volume of each dose may be pre-programmed, determined in real time by control software, or manually controlled by an operator by means of a user interface.

In some embodiments, reservoir 1285 includes two or more of scoop 1256b and/or funnel 1275. The two or more scoops 1256b may move along parallel, symmetric, or unique transit paths 1810 and have similar orientations at the positions discussed herein. The one or more scoops 1256b may be configured to dispense cryogenic liquid into the same and/or different funnels 1275. The different funnels 1275 may be configured to provide cryogenic liquid to the same and/or different containers 3. In some embodiments, reservoir 1285 provides cryogenic liquid to one, two, or more containers 3. The one or more containers 3 may be part of the same or separate devices. Actuator 1210 may be configured to move the two or more scoops 1256b. Some embodiments may include one or more actuators 1210, each of which may be configured to move one or more scoops 1256b.

Figure 19:
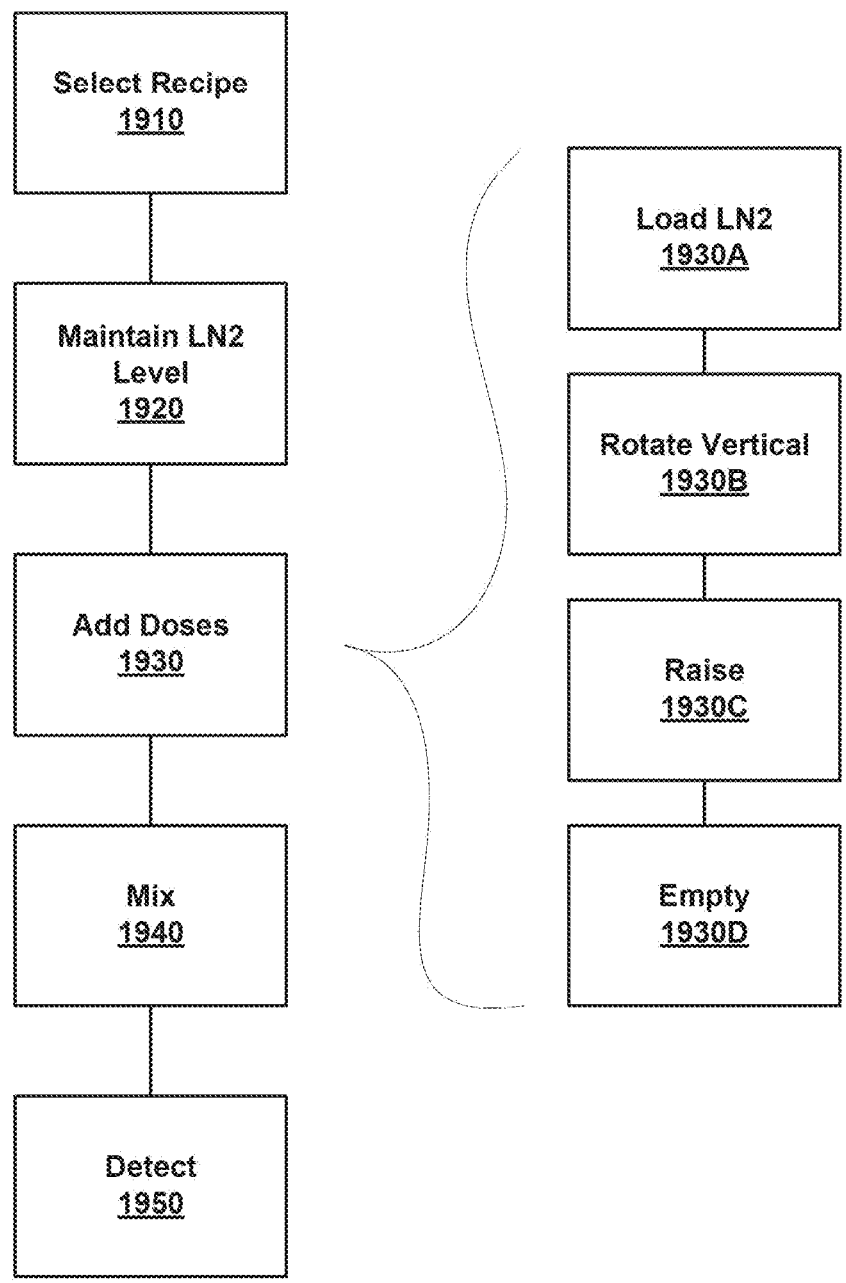
FIG. 19 illustrates a method of making a frozen confectionary, according to various embodiments of the invention.

FIG. 19 illustrates a method of making a frozen confectionary, according to various embodiments of the invention. This method includes a Select Recipe Step 1910 in which a recipe for a frozen confectionary is selected. Step 1910 optionally includes select ingredients Step 1010 (FIG. 10). Select Recipe Step 1910 is optionally performed using control circuit 510 and/or control panel 7 (FIGS. 5 and 1). Select Recipe Step 1910 optionally includes selecting an amount (e.g. volume and dosing pattern) of cryogenic liquid to add and a viscosity at which the frozen confectionary is done.

In a maintain $LN_2$ level step 1920, level sensor 1260 may be used to maintain level 1290 of cryogenic liquid in reservoir 1285 (FIG. 12). The cryogenic liquid is optionally delivered using actuating valve 1225, under the control of such as control circuit 510 and/or control panel 7.

In an add doses step 1930, doses of cryogenic liquid are added to container 3 from reservoir 1285. Step 1930 may include sub-steps load $LN_2$ step 1930A, rotate vertical step 1930B, raise step 1930C and empty 1930D. In add doses Step 1930 doses of cryogenic liquid are added to container 3 from reservoir 1285. In some applications, ingredients for the frozen confectionary are added prior to adding the cryogenic liquid. In load $LN_2$ Step 1930A, scoop 1256b is lowered into lower position 1815 and rotated to a horizontal orientation such that a lip of scoop 1256b goes below level 1290 and scoop 1256b receives cryogenic liquid. In rotate vertical step 1930B scoop 1256 is rotated to a vertical orientation and raised to intermediate position 1820. In raise step 1930C, scoop 1256b is raised to upper position 1825 while in a vertical orientation. In Empty step 1930D, cryogenic liquid is emptied from scoop 1256b into funnel 1275. This results in delivery of the cryogenic liquid into container 3. The scoop 1256b may be emptied by rotation from a vertical orientation to a horizontal orientation, although alternative methods are possible. The cryogenic liquid delivery may be at rates of at least 1, 5, 10, or 30 milliliters per second, or between 1 ml and 100 ml per second. In a preferred embodiment the cryogenic liquid delivery rate can be between 5 ml and 7 ml per second. The time between each dose signal may be as long as 60, 30, or 15 seconds, and may be as short as 0.1, 0.5, or 1 seconds, or between 0.1 seconds to 60 seconds. In a preferred embodiment the time between each dose signal can be between 1 second and 5 seconds. In step empty 1930D, the angular position of scoop 1256b may be precisely controlled to allow for delivery of cryogenic liquid in discrete doses of variable volumes, or in a continuous flow. The volume of each dose may be as large as the entire inner volume of scoop 1256b, or it may be as small as the smallest increment the control mechanism can perform. For example, one dose may be $1/10^{th}$, $1/100^{th}$, or $1/1000^{th}$ of the volume of scoop 1256b, or may be between the entire volume of the scoop (for example if the scoop is tiny and/or a large dose is desired) or $1/1000^{th}$ of the volume of scoop (for example if the scoop is large and/or a small dose is desired). In a preferred embodiment, one dose can be between $1/6^{th}$ to $1/8^{th}$ of the volume of the scoop. By means of angular position control, each sequential dose may be individually sized and tailored to the requirements of the application. In addition, the rates of rotation of scoop 1256b may be controlled over time in such a way as to provide a continuous delivery of cryogenic liquid.

In a mix step 1940, the cryogenic liquid and ingredients are mixed. Mix step 1940 optionally includes rotate step 1030 and freeze step 1040. In a detect step 1950, the viscosity of the ingredients is detected. Detect step 1950 is optionally an embodiment of measure viscosity step 1050, which is discussed elsewhere herein.

Although described in the context of cryogenic liquid, for example liquid nitrogen, the liquid dosing system of FIGS. 17-19 can be used for retrieving portions of any liquid provided within the reservoir and providing the retrieved portions to a funnel or other transportation mechanism for transport to a mixing bowl or other desired location.

Overview of Certain Example Systems Implementing a Liquid Dosing System

FIGS. 20-23 illustrate an example system having a kettle housing a liquid dosing system as described with respect to FIGS. 17-19 above. In some embodiments, the system can include one, two, or more mixing bowls having any of the beaters as described above with respect to FIGS. 1-16. The mixing bowl(s) can be positioned to receive liquid from the kettle, whereby the liquid is retrieved from a reservoir within the kettle and directed toward the mixing bowl(s) via a liquid dosing system as described herein. In some embodiments the liquid can be liquid nitrogen, and the system can be used to produce a frozen confection, for example ice cream. However, it will be appreciated that such a liquid dosing system can be used to retrieve and direct liquid for a wide variety of applications, and liquid nitrogen is provided as one non-limiting example.

Figure 20A:
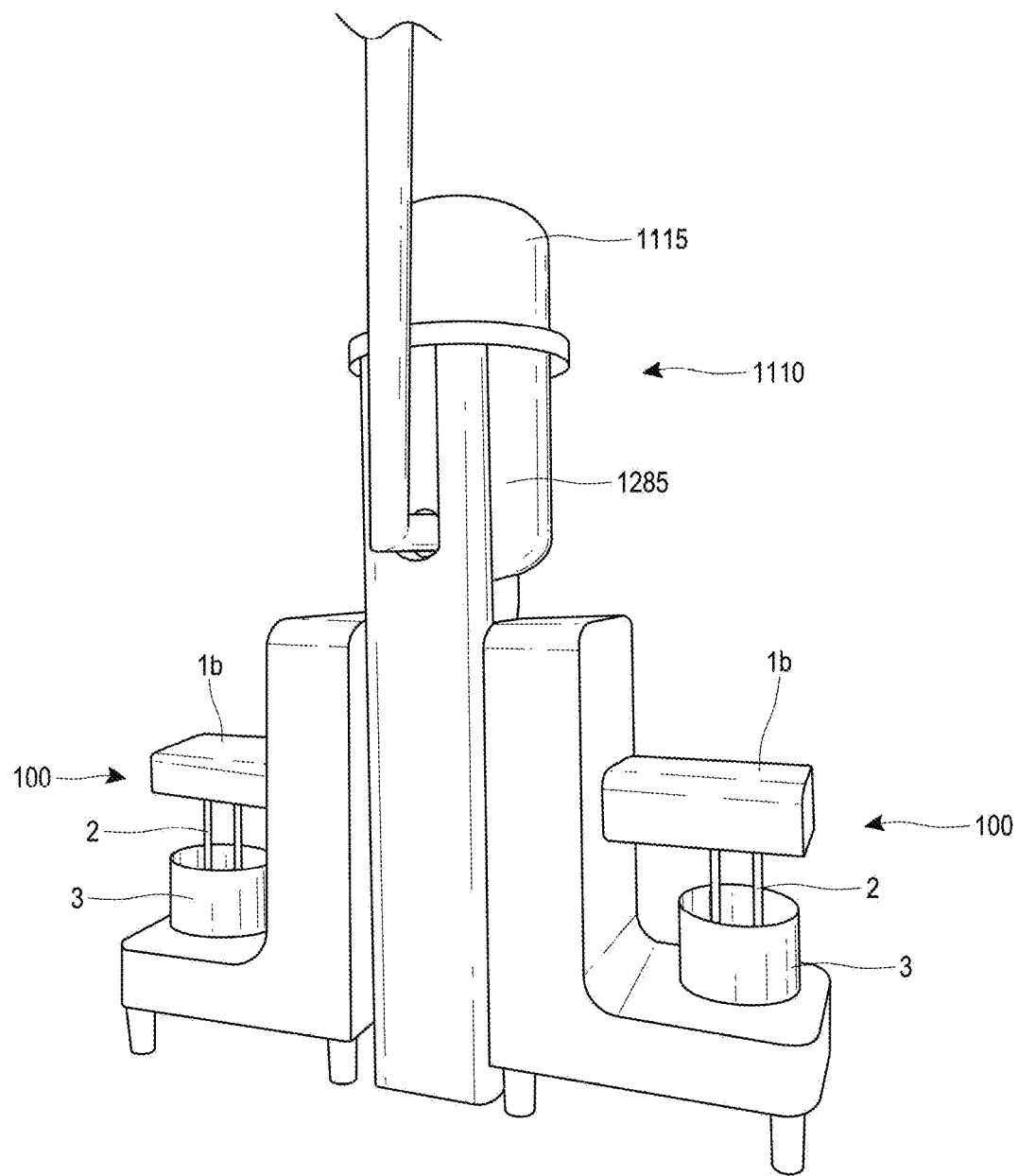
FIGS. 20A-20B illustrate views of an example of a kettle including a scoop doser situated between two example mixing machines, the kettle/scoop doser system configured to provide liquid (e.g., nitrogen) to each of the two mixing machines.
Figure 20B:
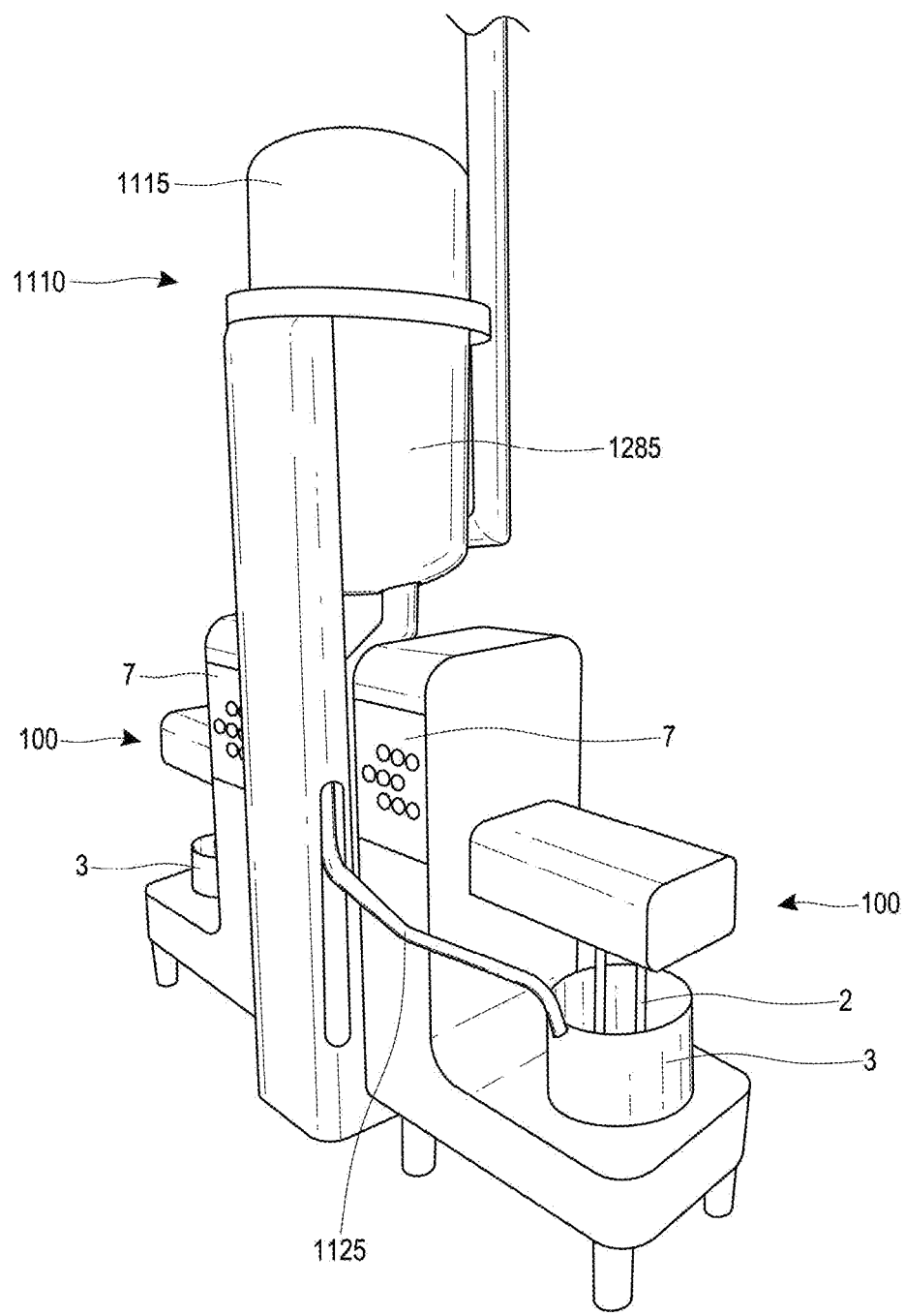

FIGS. 20A-20B illustrate an example of a kettle including a scoop doser 1110 situated between two example mixing machines 100. As illustrated the doser 1110 may be disposed in a raised position relative to the mixing machines 100 allowing for gravity to feed cryogenic liquid from the doser 1110 to the containers 3. The doser 1110 may be closed and sealed from the outside atmosphere via a cover 1115. The doser 1110 further comprises one or more output pipes 1125 (FIG. 20B) configured to direct cryogenic liquid from the reservoir 1285 to the containers 3. In embodiments with a doser 1110 situated between two mixing machines 100, there may be two separate output pipes 1125. Alternatively, there may be a single output pipe 1125 configured to adjust its position between each mixing machine 100 as needed. As is discussed in greater detail below, with reference to FIGS. 21 and 22, each mixing machine 100 may have a dedicated scoop 1256b, funnel 1275 and output pipe 1125.

FIG. 21 illustrates the kettle of FIGS. 20A-20B in an open state. FIG. 21 further illustrates the dipping cups or scoops 1256b and dipping mechanisms of the liquid dosing system, the dipping mechanisms including vertical shafts or rods 1280 and a ladder structure for tipping the scoops 1256b. As used herein, "vertical" can refer to positioning substantially parallel to a vector representing the acceleration due to gravity. In other embodiments the shafts 1280 can be angled relative to the vertical orientation and the ladder structure 2110 can be modified so that the dipping cups or scoops 1256b are maintained vertically, or close enough to vertical to avoid spilling the contained liquid, until reaching a designated position for tipping and releasing the contained liquid.

Figure 22:
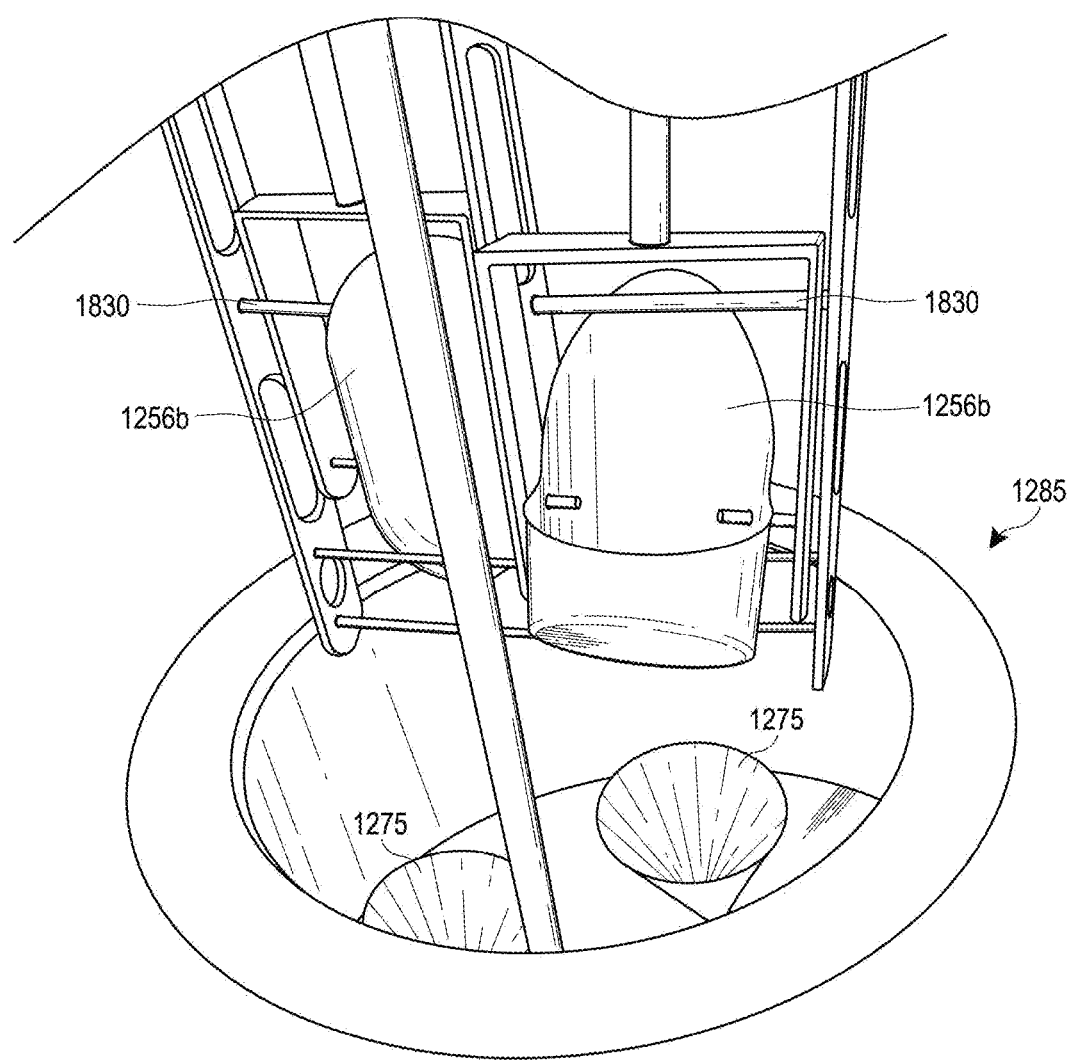
FIG. 22 illustrates another view of the kettle of FIGS. 20A-20B in the open state, showing the dipping cups, dipping mechanisms, level sensor, and funnels, each funnel having associated tubing to provide a liquid to one of the two mixers illustrated in FIGS. 20A-20B.

FIGS. 21 and 22 illustrate a side view and a perspective view of a doser 1110 in an open state. Although FIGS. 21 and 22 depict two adjacent scooping mechanisms, it will be understood that the present embodiment could just as easily be implemented with one or more scooping mechanisms. Further, for clarity, when referring to FIGS. 21 and 22 only one scooping mechanism will be described. Referring to FIG. 21, in some embodiments the doser 1110 comprises a reservoir 1285, a cover 1115, a scoop 1256b, a ladder structure 2110, a cam 1830, and a lifting mechanism (not shown) mechanically connected to scoop 1256b via a rod, shaft, chain, belt, and/or wire, etc. 1280. The cover 1115 may be configured to close and/or seal the reservoir 1285 from the ambient atmosphere. The lifting mechanism may be configured to raise and lower scoop 1256b via the rod 1280. In some embodiments, the rod 1280 and the scoop 1256b are configured to pivot relative to one another. For instance, the rod 1280 may be coupled to the scoop 1256b with a hinge such that the scoop 1256b can rotate from a substantially vertical orientation to a substantially horizontal orientation. In some embodiments, the scoop 1256b is predisposed to orient in a substantially vertical orientation. Cam 1830 may include a fixed bar, rod, tab, gear, etc. positioned on the ladder structure 2110. In some embodiments the cam 1830 may be a fixed bar 1830 that is perpendicular to the transit path 1810 (FIG. 18) of the scoop 1256b. The cam 1830 may further be positioned in the transit path 1810 of scoop 1256b such that as the scoop 1256b is raised, at least a portion of the scoop 1256b comes into contact with the cam 1830. In some embodiments, the scoop 1256b may comprise a curved shape such that as the scoop 1256b is raised and comes into contact with the cam 1830, the scoop 1256b is forced to rotate from a substantially vertical orientation to a substantially horizontal orientation. The curved shape of the scoop 1256b may further allow the liquid nitrogen to flow out of the scoop 1256b in a controlled manner.

In some embodiments, the reservoir 1285 contains liquid nitrogen. The scoop 1256b may be lowered via the lifting mechanism down into the reservoir 1285 below a liquid level of the liquid nitrogen. As described in greater detail with reference to FIGS. 17A-18, the scoop 1256b may then collect liquid nitrogen and be raised by the lifting mechanism. In some embodiments, as scoop 1256b is raised, it contacts cam 1830, causing the scoop 1256b to rotate to a substantially horizontal orientation. As the scoop 1256b rotates to a substantially horizontal orientation, the liquid nitrogen contained therein flows out of the scoop 1256b in a controlled manner. In some embodiments, an angular position of the scoop 1256b is controlled incrementally so as to deliver cryogenic liquid in volumes that are small fractions of the volume of each scoop. In other words, scoop 1256b may dispense the cryogenic liquid incrementally so as to not deliver substantially all of the contents of the scoop 1256b at once. The rate at which the cryogenic liquid is delivered may correspond to an operating speed of the beaters 2 and/or a recipe selection.

Referring to FIG. 22, the doser 1110 may further include one or more outputs or funnels 1275. As discussed in greater detail with reference to FIGS. 12-14, 18, and 23, the funnel 1275 may be configured to receive cryogenic liquid from the scoop 1256b and to transfer the received cryogenic liquid out of the reservoir 1285. In some embodiments the funnel 1275 is positioned such that as scoop 1256b rotates from a substantially vertical orientation to a substantially horizontal orientation, cryogenic liquid within the scoop 1256b flows out of the scoop 1256b and into the funnel 1275. The top or upper rim of the funnel 1275 may be disposed at a height within the reservoir 1285 such that it is above a normal operational liquid level 1290 of the cryogenic liquid contained in the reservoir 1285. In some embodiments, the funnel 1275 is connected to output pipe 1125 (FIG. 20B) such that liquid nitrogen introduced into the funnel 1275 flows through the output pipe 1125 to the container 3. In this manner, a controlled quantity of cryogenic liquid may be transported to funnel 1275. As is discussed in greater detail with reference to FIGS. 12-14, the level of liquid nitrogen inside the reservoir 1285 can be monitored to ensure that the level does not go above or below predetermined thresholds. For instance, the level of liquid nitrogen may be maintained as to no go above the top of the funnel 1275 or below a lowest position of the scoop 1256*b*. In embodiments with more than one funnel 1275, each funnel 1275 may be in fluid communication with its own output pipe 1125 (FIG. 11) that leads to the same or different containers 3. In some embodiments, each scoop 1256*b*, funnel 1275 and output pipe 1125 services a single mixing machine 100. Thus, the dosing system 1110 may be configured to independently service multiple mixing machines 100.

FIG. 23 illustrates another view of the kettle of FIGS. 20A-20B in the open state, showing the funnels 1275. As illustrated, each funnel 1275 may comprise an upper portion 2310 and a lower portion 2320, the upper portion 2310 comprising a funnel-shaped receiver and the lower portion 2320 comprising a pipe. Each funnel 1275 is positioned to direct received liquid into a conduit extending generally vertically from an aperture in the bottom surface of the reservoir 1285. In other embodiments these conduits and their corresponding apertures can be positioned in different locations within the kettle, for example with the aperture positioned in a cylindrical side wall and the conduit extending at an angle from the aperture to the funnel. FIGS. 22 and 23 illustrate the reservoir 1285 of the kettle in an empty state. It will be appreciated that an upper rim of each funnel 1275 can be positioned at a height above the level of liquid in the kettle when filled such that only liquid poured into the funnels 1275 from scoops 1256*b* travels into the conduit and through the aperture toward a mixing bowl.

Although FIGS. 20-23 illustrate embodiments of a kettle having a liquid dosing system using scoops or dipping cups, in other embodiments such scoops can be omitted. For example, an actuator can cause a displacement body to be lowered down into the cryogenic fluid, displacing it in controlled volumes so that the liquid level rises above the lip of an exit tube and drains out of the reservoir.

Several embodiments are specifically illustrated and/or described herein. However, it will be appreciated that modifications and variations are covered by the above teachings and within the scope of the appended claims without departing from the spirit and intended scope thereof. For example, while ice cream is discussed herein, alternative embodiments of the invention may be applied to frozen yogurt or other frozen foods. In some embodiments one of the interlocking beaters is held stationary while the other is rotated. The use of gravity fed cryogenic liquids to freeze ingredients of frozen food products enables more reproducible dosing of liquid coolants, and thus a more reproducible product, relative to systems in which cryogenic liquids are provided at unpredictable pressures.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of making a frozen confection during a mixing process controlled by a controller configured to separately control the direction of rotation, and the duration of rotation, of (a) a container mount coupled to a container and (b) at least one beater extending into the container, the method comprising:
   placing ingredients for the frozen confection in the container;
   rotating the container via rotation of the container mount in a first direction, and rotating the at least one beater in a second direction for a first period of the mixing process to mix ingredients in the container to form a mixture, wherein the first direction and the second direction are opposite directions, and wherein the duration of the first period is controlled by the controller;
   dosing the ingredients with a controlled amount of coolant from a coolant dosing system intermittently to cool the mixture within the container;
   once a predetermined viscosity is reached to form a frozen or semi-frozen mixture of the ingredients, changing the direction of the container mount or the at least one beater to rotate both the container mount and the at least one beater in the same direction momentarily to cause pillars of the ingredient mixture, that have risen up inside portions of the container due in part to interactions of the mixture with the sides of the container and the at least one beater, to be pulled back down into the container to aid in the formation of a smooth and consistent frozen confection;
   rotating the container mount and/or the at least one beater, whichever has switched direction, in its original rotation direction; and
   this counter-to-uniform rotation cycle is continued throughout the mixing process to avoid re-emergence of the pillars and to create a seamlessly frozen confection automatically without the need for human intervention.

2. The method of claim 1, wherein the container mount is rotated in a clockwise direction during the first period, and wherein the at least one beater is rotated in a counter-clockwise direction during the first period.

3. The method of claim 1, wherein the container mount is rotated in a counter-clockwise direction during the first period and the at least one beater is rotated in a clockwise direction during the first period.

4. The method of claim 1, further comprising dosing the ingredients with a controlled amount of coolant from the coolant dosing system after the first period, wherein the at least one beater includes a first beater and a second beater.

5. The method of claim 1, wherein during the mixing process, the method further comprises rotating the at least one beater and the container mount in the same direction at least once every two minutes during a portion of the mixing process.

6. The method of claim 1, wherein during the mixing process, the method further comprises rotating the at least one beater and the container mount in opposite directions at least once every two minutes during a portion of the mixing process.

7. The method of claim 1, further comprising performing a purge operation of the dosing system during a startup operation.

8. The method of claim 1, further comprising performing a calibration of the resistance of the rotation of the at least one beater during a startup operation.

9. The method of claim 1, further comprising receiving an input from a user interface indicative of viscosity, and performing a mixing process and/or coolant dosing process controlled by the controller to mix the ingredients based at least in part on the viscosity level input.

10. The method of claim 9, further comprising receiving an input from the user interface indicative of a size input of a quantity of the ingredients used for a specific batch of ingredients, and performing a mixing process and/or coolant dosing process controlled by the controller to mix the ingredients based at least in part on the size input.

11. The method of claim 1, wherein the counter-to-uniform cycle occurs within two minutes.

12. The method of claim 1, wherein the at least one beater extends from above the container downward into the container.

13. The method of claim 1, wherein the container mount is driven by a motor to rotate in a clockwise or counter-clockwise direction.

14. The method of claim 1, wherein the container includes an open top, a bottom and sides, and wherein the at least one beater extends into the container through the open top.

15. The method of claim 1, further comprising sensing the viscosity of the ingredients during the mixing process, and changing the dosing based on the sensed viscosity.

16. The method of claim 1, further comprising sensing the viscosity of the ingredients during the mixing process and changing the direction of the container or the at least one beater and/or setting a duration of a change to the direction of the container mount or the at least one beater based on the sensed viscosity.

17. A method of making a frozen confection during a mixing process controlled by a controller configured to separately control the direction of rotation, and the duration of rotation, of (a) a container mount coupled to a container and (b) and at least one beater extending into the container, the method comprising:

placing ingredients for the frozen confection in the container;

rotating the container via rotation of the container mount in a first direction, and rotating the at least one beater in a second direction for a first period of the mixing process to mix ingredients in the container to form a mixture, wherein the first direction and the second direction are opposite directions are controlled by the controller;

dosing the ingredients with an amount of coolant from a coolant dosing system;

once a predetermined viscosity is reached to form a frozen or semi-frozen mixture of the ingredients, changing the direction of the container mount or the at least one beater to rotate both the container mount and the at least one beater in the same direction momentarily to cause pillars of the ingredient mixture, that have risen up inside portions of the container due in part to interactions of the mixture with the sides of the container and the at least one beater, to be pulled back down into the container to aid in the formation of a smooth and consistent frozen confection;

rotating the container mount and/or the at least one beater, whichever has switched direction, in its original rotation direction; and this counter-to-uniform rotation cycle is continued throughout the mixing process to avoid re-emergence of the pillars and to create a seamlessly frozen confection automatically without the need for human intervention.

* * * * *

UNITED STATES PATENT AND TRADEMARK OFFICE
CERTIFICATE OF CORRECTION

| | | |
|---|---|---|
| PATENT NO. | : 12,207,668 B2 | Page 1 of 2 |
| APPLICATION NO. | : 17/195326 | |
| DATED | : January 28, 2025 | |
| INVENTOR(S) | : Robyn Sue Fisher | |

It is certified that error appears in the above-identified patent and that said Letters Patent is hereby corrected as shown below:

On the Title Page

Item (56) In Other Publications, Under Column no. 2, Line no. 1, delete "Vishay Percision Group," and insert -- Vishay Precision Group, --.

Item (56) In Other Publications, Under Column no. 2, Page 2, Line no. 5, delete "Scientific Amerian, Apr." and insert -- Scientific American, Apr. --.

Item (56) In Other Publications, Under Column no. 2, Page 2, Line no. 11, delete "%20N%20ice" and insert -- %20N2%20ice --.

Item (56) In Other Publications, Under Column no. 2, Page 2, Line no. 12, delete "www.poisci.wvu." and insert -- www.polsci.wvu. --.

Item (56) In Other Publications, Under Column no. 2, Page 2, Line no. 21, delete "htm (Acessed Apr." and insert -- htm (Accessed Apr. --.

Item (56) In Other Publications, Under Column no. 2, Page 2, Line no. 31, delete "Will, lowa State" and insert -- Will, Iowa State --.

In the Drawings

Sheet 18 of 33, FIG. 15B, Ref no. 1530, Line no. 2, delete "ACTUATOR (SOLONOID)" and insert -- ACTUATOR (SOLENOID) --.

In the Specification

Under Column no. 4, Line no. 29, delete "the invention," and insert -- the invention. --.

Signed and Sealed this
Eleventh Day of March, 2025

Coke Morgan Stewart
*Acting Director of the United States Patent and Trademark Office*

Under Column no. 8, Line no. 30, delete "46, 37, 48," and insert -- 46, 47, 48, --.

Under Column no. 8, Line no. 35, delete "46, 37, 48," and insert -- 46, 47, 48, --.

Under Column no. 12, Line no. 8, delete "3 does is" and insert -- 3 dose is --.

Under Column no. 15, Line no. 46, delete "using and embodiment" and insert -- using an embodiment --.

Under Column no. 19, Line no. 40, delete "passes though the" and insert -- passes through the --.

Under Column no. 20, Line no. 60, delete "may can have" and insert -- may have --.

Under Column no. 27, Line no. 4, delete "as to no go" and insert -- as not to go --.

Under Column no. 27, Line no. 58, delete "methods and or specific" and insert -- methods and/or specific --.